United States Patent
Hies et al.

(10) Patent No.: US 10,551,405 B2
(45) Date of Patent: Feb. 4, 2020

(54) SIGNAL TRAVEL TIME FLOW METER

(71) Applicant: GWF MessSysteme AG, Lucerne (CH)

(72) Inventors: Thomas Werner Hies, Singapore (SG); Trung Dung Luong, Singapore (SG); Claus-Dieter Ohl, Singapore (SG); Juergen Heinz-Friedrich Skripalle, Irsee (DE)

(73) Assignee: GWF MESSSYSTEME AG, Lucerne (CH)

( * ) Notice: Subject to any disclaimer, the term of this patent is extended or adjusted under 35 U.S.C. 154(b) by 286 days.

(21) Appl. No.: 15/366,823

(22) Filed: Dec. 1, 2016

(65) Prior Publication Data
US 2017/0082650 A1   Mar. 23, 2017

Related U.S. Application Data

(63) Continuation of application No. PCT/IB2015/055724, filed on Jul. 29, 2015.

(30) Foreign Application Priority Data

Jul. 29, 2014 (WO) .................. PCT/IB2014/063502

(51) Int. Cl.
G01P 5/24 (2006.01)
G01F 25/00 (2006.01)
G01F 1/66 (2006.01)

(52) U.S. Cl.
CPC .............. *G01P 5/245* (2013.01); *G01F 1/667* (2013.01); *G01F 25/0007* (2013.01)

(58) Field of Classification Search
CPC ...................................... G01P 5/245
See application file for complete search history.

(56) References Cited

U.S. PATENT DOCUMENTS 4,462,261 A * 7/1984 Keyes ...................... G01F 1/86
                                                                                    73/861.02
4,545,244 A * 10/1985 Yasuda ................... G01F 1/663
                                                                                    73/195

(Continued)

FOREIGN PATENT DOCUMENTS

CN     102116777 A    7/2011
WO   2004102499 A1   11/2004

(Continued)

OTHER PUBLICATIONS

Zimmermann et al. (Flow Rate Estimation Using Acoustic Field Distortions Caused by Turbulent Flows: Time-Reversal Approach, J. Phys.: Conf. Sser. 296 012010, 2011) (Year: 2011).*

(Continued)

*Primary Examiner* — Manuel L Barbee
*Assistant Examiner* — Raymond L Nimox
(74) *Attorney, Agent, or Firm* — Myers Wolin, LLC

(57) ABSTRACT

A method for determining a flow speed of a liquid in a fluid conduit is provided. During a signal-generating phase, an impulse signal is applied to a first ultrasonic transducer. A response signal is then received at a second ultrasonic transducer. A measuring signal is later derived from the response signal, wherein the derivation comprises reversing a signal portion with respect to time. During a measurement phase, a liquid moves with respect to the fluid conduit. The measuring signal is then applied to one of the two transducers and a response signal of the measuring signal is measured at the other transducer. A flow speed is derived from the response signal of the measuring signal.

17 Claims, 34 Drawing Sheets

(56) References Cited

U.S. PATENT DOCUMENTS

| | | | | |
|---|---|---|---|---|
| 4,787,252 | A * | 11/1988 | Jacobson | G01F 1/66 73/861.28 |
| 4,882,934 | A * | 11/1989 | Leffert | G01F 1/665 73/861.04 |
| 5,117,698 | A * | 6/1992 | Baumoel | G01F 1/667 73/861.28 |
| 5,650,571 | A * | 7/1997 | Freud | G01F 1/667 73/861.06 |
| 6,769,293 | B2 | 8/2004 | Zanker | |
| 9,383,237 | B2 * | 7/2016 | Wiklund | G01F 1/34 |
| 2002/0078737 | A1 | 6/2002 | Zanker | |
| 2011/0231137 | A1 | 9/2011 | Funck et al. | |
| 2011/0271769 | A1 * | 11/2011 | Kippersund | G01F 1/42 73/861.28 |
| 2012/0055239 | A1 * | 3/2012 | Sinha | G01N 29/024 73/61.79 |
| 2012/0271568 | A1 | 10/2012 | Wilson | |
| 2012/0271569 | A1 * | 10/2012 | Wilson | G01F 1/66 702/48 |
| 2014/0012518 | A1 * | 1/2014 | Ramamurthy | G01F 1/66 702/48 |
| 2015/0127275 | A1 * | 5/2015 | Hies | G01F 25/0007 702/48 |

FOREIGN PATENT DOCUMENTS

| | | | |
|---|---|---|---|
| WO | 2013164805 | A1 | 11/2013 |
| WO | 2014016159 | A1 | 1/2014 |
| WO | 2014116682 | A1 | 7/2014 |

OTHER PUBLICATIONS

Extended European search report including the European search opinion dated Jun. 21, 2017 for corresponding European Patent Application No. EP 15828038.8.

Extended European search report including the European search opinion completed Dec. 14, 2017 for corresponding European Patent Application No. EP 17190281.0.

European Office Action dated Apr. 4, 2018 issued by the European Patent Office for corresponding European Patent Application No. EP 15828038.8.

Zimmermann, N Perez and J C Adamowski; "Flow rate estimation using acoustic field distortions caused by turbulent flows: time-reversal approach"; Published under licence by IOP Publishing Ltd Journal of Physics: Conference Series, vol. 296, No. 1; (2011) 012010; doi:10.1088/1742-6596/296/1/012010.

Decision to Grant and Search Report issued by Federal Service for Intellectual Property for corresponding Russian Patent Application No. 2016145626/28 (073296), dated Mar. 21, 2018 with an English translation.

Office Action dated Jul. 5, 2018 to the parallel patent application in Kazakhstan (application No. 2017/0066.1) with an English Summary of the Office Action and Recommendation by the Kazakhstan.

International Search Report with Written Opinion, dated Dec. 18, 2015, for corresponding international application PCT/IB2015/055724.

Chilean Office Action dated Jul. 18, 2018 by the Instituto Nacional de Propiedad Industrial (INAPI) Chile, for corresponding Chile application No. 0181-2017 with an English Summary of the Office Action.

Link: https://dsp.stackexchange.com/questions/2654/what-is-the-difference-between-convolution-and-cross%20-correlation, Jun. 19, 2012.

Examination report issued for corresponding Chilean Patent Application No. 201700181 dated Jan. 16, 2019 with an English translation.

First Office Action issued for corresponding Chinese Application No. 201580027388.7 dated Jan. 23, 2019 with an English translation.

Zimmermann et al., "Flow rate estimation using acoustic field distortions caused by turbulent flows: time-reversal approach," Journal of Physics: Conference Series vol. 296, Issue 1, IOP Publishing, May 25, 2011.

Notification of Reasons for Refusal issued by the Japan Patent Office for corresponding Japanese Patent Application No. 2017-503164, dated Jun. 4, 2019, with an English translation.

Office Action issued for corresponding Egyptian Patent Application No. 2017/138, dated May 20, 2019, with an English translation.

* cited by examiner

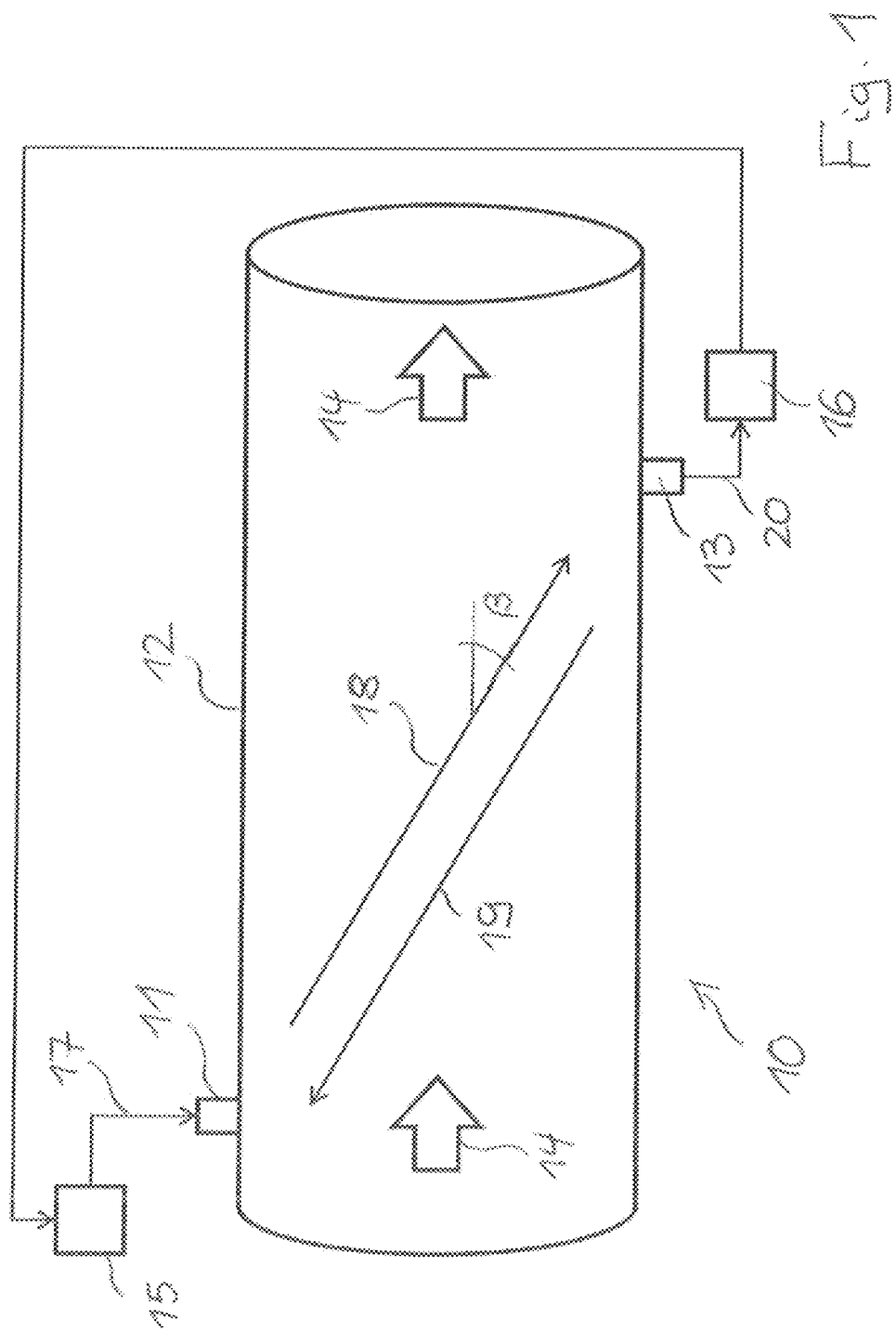

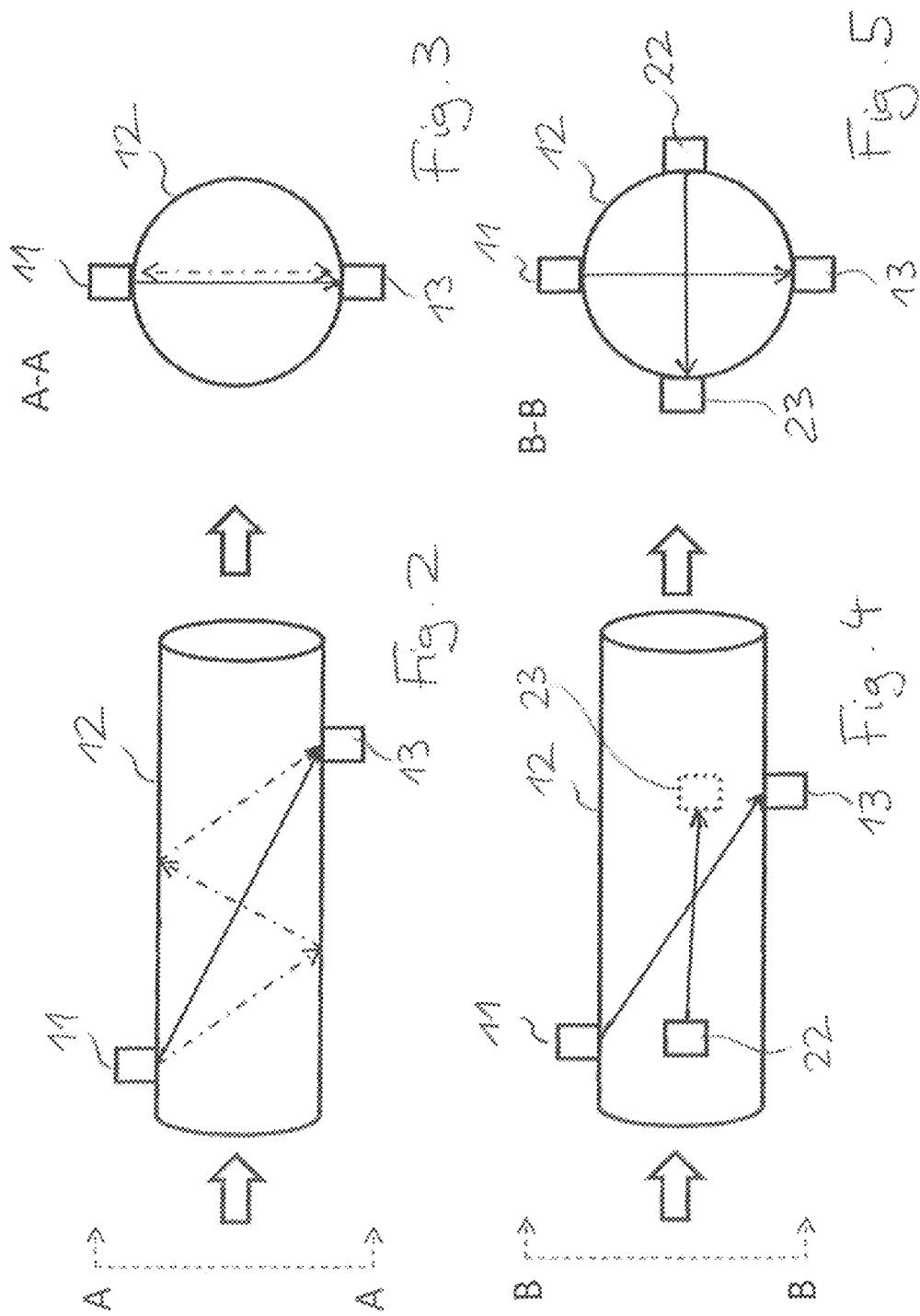

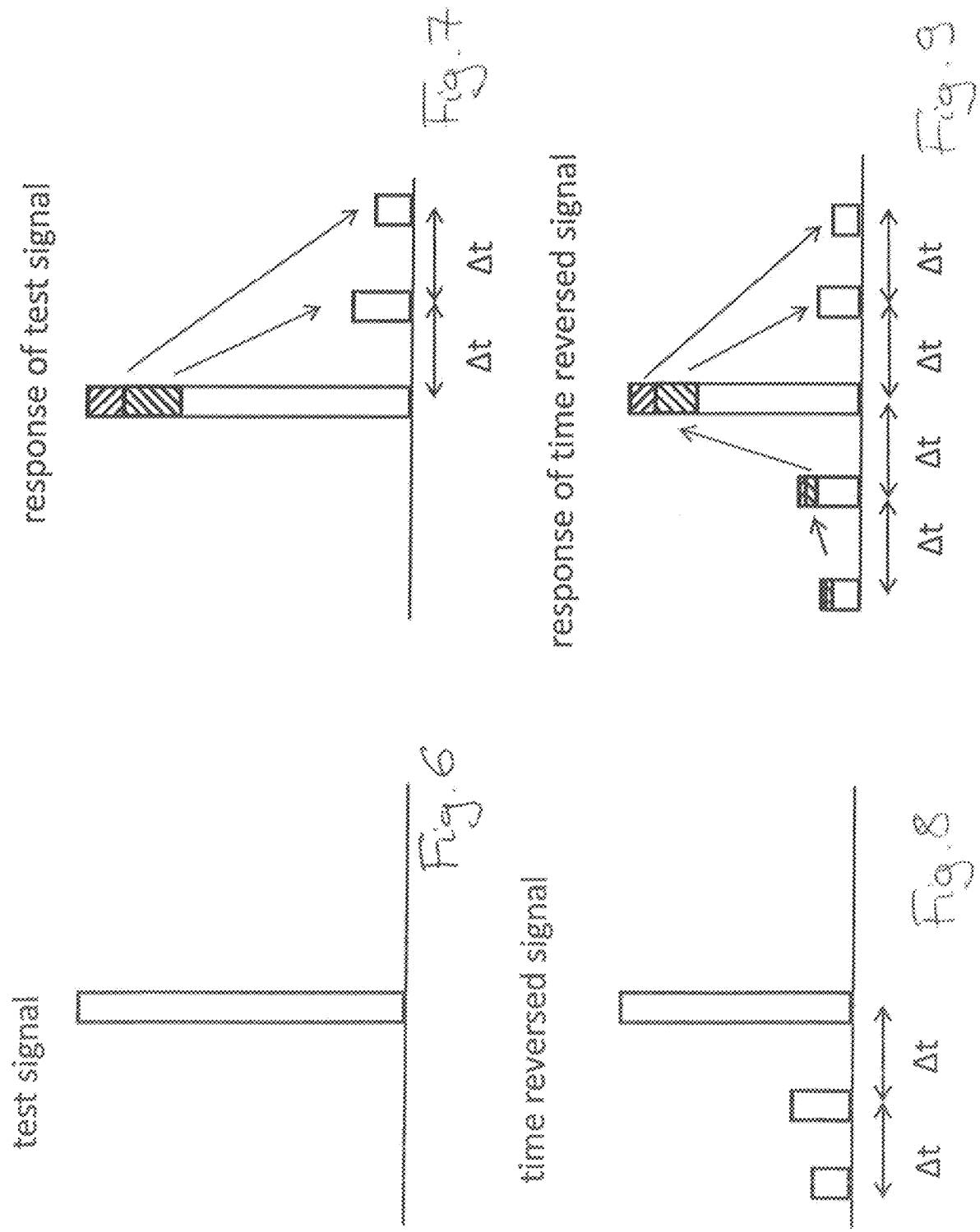

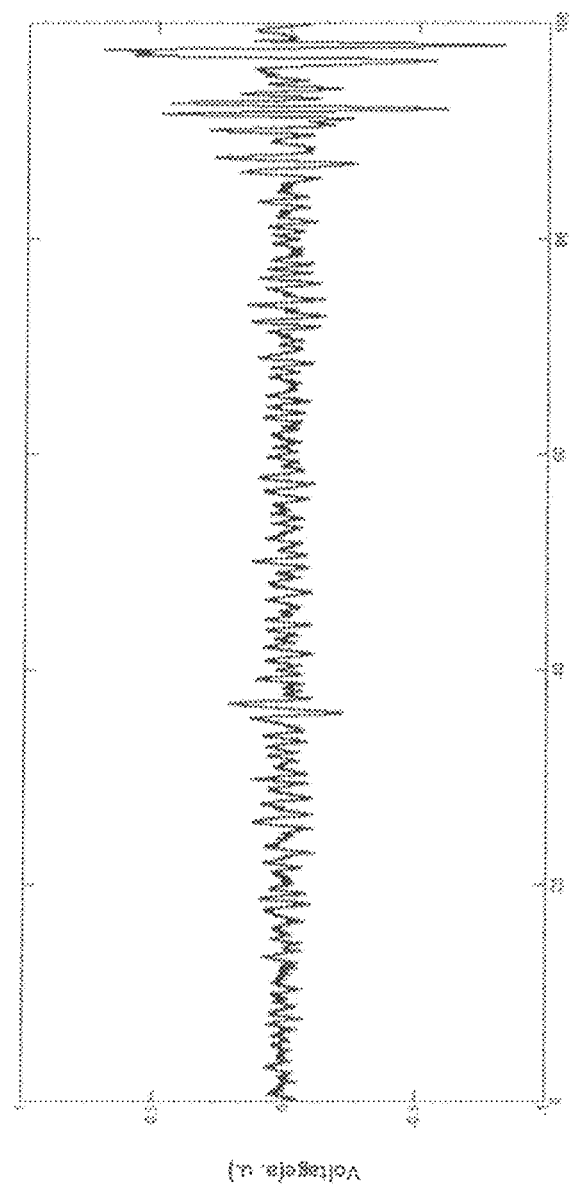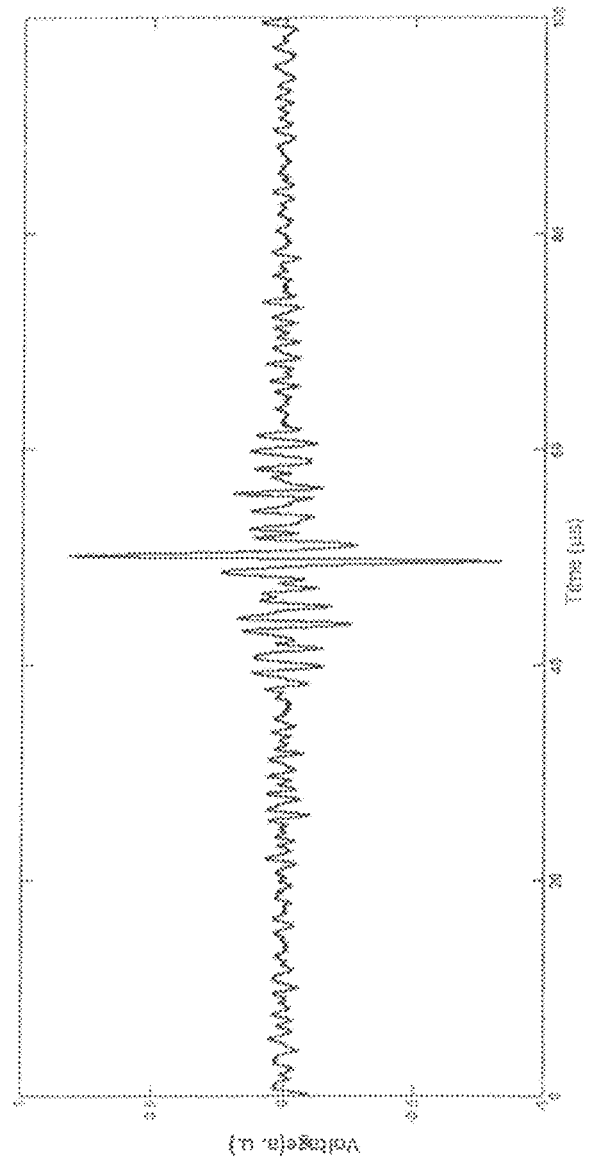

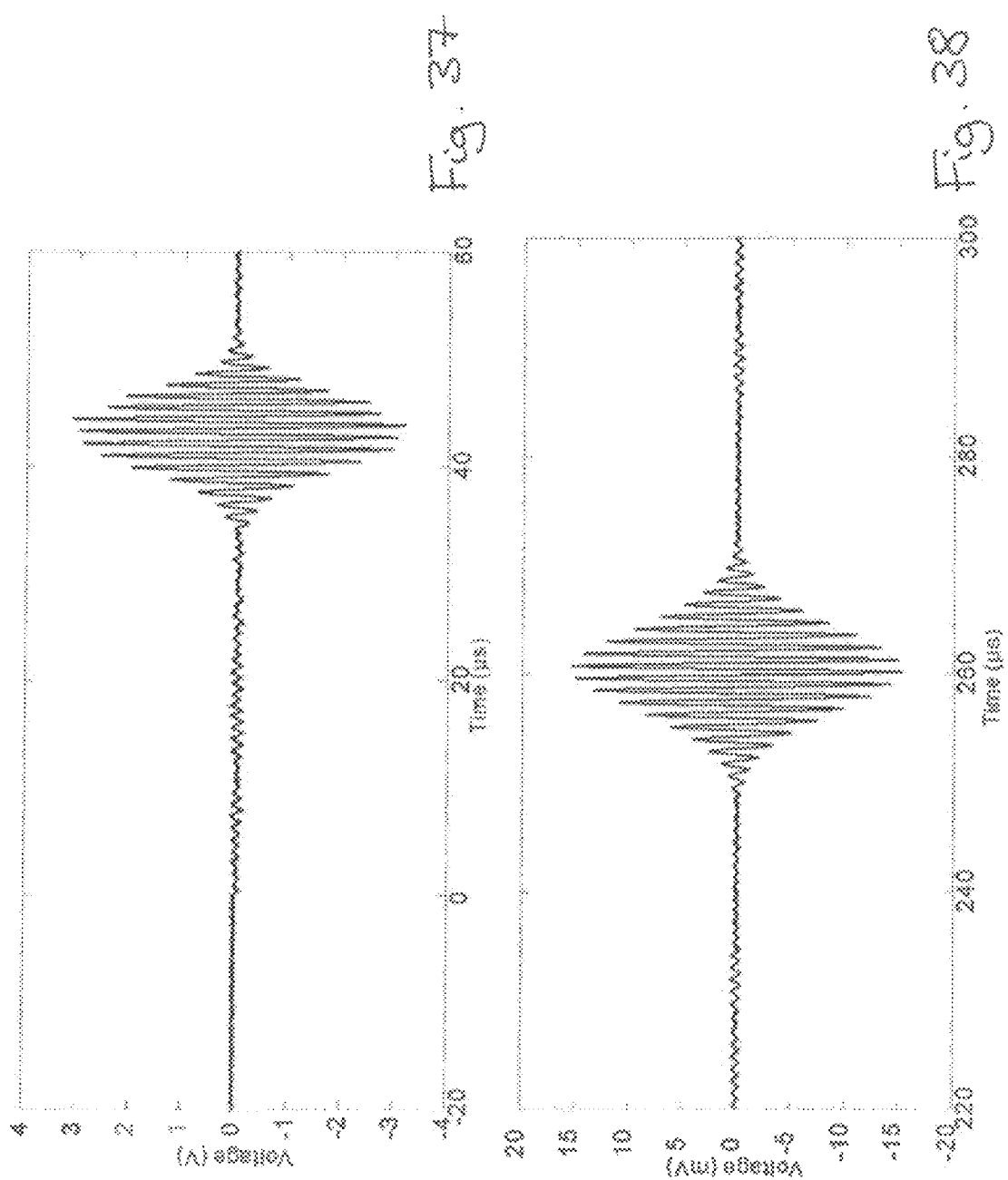

SIGNAL TRAVEL TIME FLOW METER

CROSS-REFERENCE TO RELATED APPLICATIONS

This application is a continuation under 35 U.S.C. § 120 of International Application No. PCT/IB2015/055724, filed Jul. 29, 2015, which claims priority to International Application No. PCT/IB2014/063502, filed Jul. 29, 2014, the contents of each are hereby incorporated by reference in their entirety.

FIELD OF THE INVENTION

The current application relates to flow meters, and in particular to ultrasound travel time flow meters.

BACKGROUND

Various types of flow meters are currently in use for measuring a volume flow of a fluid, such as a liquid or a gas, through a pipe. Ultrasonic flow meters are either Doppler flow meters, which make use of the acoustic Doppler effect, or travel time flow meters, sometimes also called transmission flow meters, which make use of a propagation time difference caused by the relative motion of source and medium. The travel time is also referred to as time of flight or transit time.

An ultrasonic travel time flow meter evaluates the difference of propagation time of ultrasonic pulses propagating in and against flow direction. Ultrasonic flow meters are provided as in-line flow meters, also known as intrusive or wetted flow meters, or as clamp-on flow meters, also known as non-intrusive flow meters. Other forms of flow meters include Venturi channels, overflow sills, radar flow meters, Coriolis flow meters, differential pressure flow meters, magnetic inductive flow meters, and other types of flow meters.

When there are irregular flow profiles or open channels, more than one propagation path may be necessary to determine the average flow speed. Among others, multipath procedures are described in hydrometry standards such as IEC 41 or EN ISO 6416. As a further application, ultrasonic flow meters are also used to measure flow profiles, for example with an acoustic Doppler current profiler (ADCP). The ADCP is also suitable for measuring water velocity and discharge in rivers and open waters.

It is an object of the present specification to provide an improved transit time flow meter and a corresponding method for measuring an average flow speed or a flow profile of a fluid in general, and in particular for liquids such as water, oil or for gases.

SUMMARY OF INVENTION

In a flow measurement device according to the present specification, sound transducers, e.g. in the form of piezoelectric elements, also known as piezoelectric transducers, are used to generate and to receive a test signal and a measuring signal.

Alternative sound transmitters comprise lasers that excite a metal membrane to vibrations, or simple loudspeakers. One can also produce pressure waves in other ways. The receiver side can also be represented by other means that are different from piezoelectric transducers, but detect ultrasonic waves.

Although the term "piezoelectric transducer" is used often in the present description, it stands also for other sound wave transducers that produce or detect ultrasonic waves.

A measuring signal according to the present specification can be modelled by a matched filter. If a sharply peaked impulse is used as a probe or test signal, the received signal at the transducer is the impulse response of a conduit or channel of the fluid. According to the present application, an inverted version of the impulse response with respect to time is sent back through the same channel as a measuring signal, either in the reverse direction or in the same direction. This results in a signal with a peak at the origin, where the original source was, or in a signal with a peak at the original receiver, respectively.

The inversion with respect to time can be achieved in several ways. If analogue means are used for recording the response signal, one could play the recorded response signal in a reverse mode. If digital means are used for recording samples of the response signal, then the order of the recorded samples is reversed in order to obtain the inverted signal. This can be achieved by inverting the values of the time stamps of each recorded sample, by multiplying the respective time value with (−1). If played according to an ascending order of the time stamp values, the recorded samples are played in a reverse order. In other words, the inverted response signal is the recorded response signal, but played backwards.

An ultrasonic flow meter according to the present specification provides a focusing property by using the above mentioned inverted signal, or a similarly shaped signal, for an ultrasonic flow meter to form a response signal, which is both concentrated in space and time. This in turn leads to a higher amplitude at a receiving piezoelectric element and a better signal to noise ratio.

With an ultrasonic flow meter according to the present specification, focusing can be obtained under very general conditions. For example, a focusing property is obtained even when only one ultrasound transmitter is excited and even when the inverted signal is reduced to a signal that is only coarsely digitized in the amplitude range, if the time resolution of the inverted signal is sufficient. Furthermore, a flow meter according to the present specification can be used with clamp-on transducers, which are easy to position on a pipe and do not require modifications of the pipe.

In a flow measurement method according to the present specification, a bit resolution with respect to an amplitude of the measurement signal can be adjusted. In particular, the bit-resolution can be adjusted to obtain a high amplitude of a response signal.

According to one embodiment, the bit resolution is increased for increasing an amplitude of a response signal to the measuring signal. In one embodiment, the bit resolution is increased in pre-determined steps, the bit resolution which produces the response signal with the highest amplitude is selected and a corresponding representation of a measurement signal is stored in computer memory.

According to another embodiment, the bit resolution is decreased for increasing an amplitude of a response signal to the measuring signal. In one embodiment, the bit resolution is decreased in pre-determined steps, the bit resolution which produces the response signal with the highest amplitude is selected and a corresponding representation of a measurement signal is stored in computer memory.

In particular, the bit resolution may be a low bit resolution, such as a resolution that is stored in one digit or in two digits, in particular in one or two binary digits. According to other embodiments, the low bit resolution comprises at least a 1 bit resolution and at most a 64 bit resolution.

According to a further embodiment, the first response signal is processed for determining or deriving a change in the wall thickness of the conduit or for determining or deriving material characteristics of the conduit wall by determining longitudinal and transversal sound wave characteristics. For example, the transverse and longitudinal waves characteristics may be derived from corresponding portions of the receiving or response signal, which corresponds to different times of arrival of the acoustic waves.

According to this embodiment, the same response signal is used for the determination of the flow speed and for the detection of the abovementioned properties. Thereby it is no longer necessary to use a separate signal or a separate arrangement to detect effects such as contaminations and material faults, although a separate signal or a separate arrangement may be used. Furthermore, the derived channel properties can be used to obtain a more accurate estimate of the flow speed.

In an ultrasonic flow meter according to the present specification, technical features that ensure a good coupling and directionality of clamp-on transducers and to reduce scattering may not be necessary or, on the contrary, it may even improve the focusing. In order to provide an increased scattering, a coupling material may be selected that is adapted to a refractive index of the liquid or transducers and transducer couplings may be used which provide more shear waves.

Preferentially, the frequency of sound waves that are used in a flow meter according to the specification is between >20 kHz and 2 MHz, which corresponds to an oscillation period of 0.5 microseconds (μs) but it may even be as high as 800 MHz. In many cases, ultrasonic flow meters operate far above the hearing threshold with frequencies of several hundred kHz or higher. The frequency of transit time ultrasonic flow meters is typically in the kHz or in the MHz range.

According to one aspect, the current specification discloses a computer implemented method for determining a flow speed of a fluid in a fluid conduit or channel using a transmission time ultrasonic flow meter. In particular, the method can be used for a pipe or tube, but also for open channel applications, such as applications for drainage or irrigation channels. In a preferred embodiment, "computer implemented" refers to an execution on small scale electronic components such as microprocessors, ASICs, FPGAs and the like, which can be used in portable or in compact stationary digital signal processing devices, which are generally of a smaller size than workstations or mainframe computers and which can be placed at a required location along a fluid pipe.

In the following, the terms "channel", "conduit", "passage", "pipe", etc. are used as synonyms. The subject matter of the application can be applied to all types of conduits for fluids independent of their respective shape and independent of whether they are open or closed or fully filled or partially filled. The subject matter of the application can also be applied to all types of fluids or gases, whether they are gases or liquids, or a mixture of both.

During a measuring signal generating phase, the fluid conduit is provided with a fluid at a predetermined velocity with respect to the fluid conduit, especially with a fluid that is essentially at rest with respect to the fluid conduit. The measuring signal is generated from a response signal, which the transmission channel generates in response to an initially applied impulse signal.

An impulse signal is applied to a first ultrasonic transducer, such as piezoelectric transducer, wherein an impulse signal refers to a signal, which has a signal energy that is concentrated over a short period of time in particular In a specific embodiment, the impulse signal extends over only a few oscillation periods of a carrier, such as 10-20 oscillations periods or less. In particular, an envelope of the impulse signal may have a rectangular shape, but other shapes are possible as well. For example, the impulse signal may correspond to a one-time peak or a single impulse, a short rectangular burst or to any other signal shape, such as a saw-tooth shape, a rectangular wave, a chirp, a sine wave or a pre-determined noise burst, such as a white noise or a pink noise, which is also known as 1/f noise. The method works with almost any signal shape of the impulse signal.

The signal generating phase does not need to be repeated for each measurement. For example, it may be carried out before a first measurement and at later times when the conditions in the fluid conduit change, for example due to sediments, corrosions and thermal stress.

Sometimes, the term "calibration phase" is used when referring to the measuring signal generating phase. This is not entirely correct. For flow meters, it is typical that the flowmeter is placed at a calibration rig where the measured values and the target values for flow rates are compared. The linking factor between these two values is called calibration factor and it incorporates hardware and software errors of the flow measurement which cannot be specified. For the subject matter of the application, it is more appropriate to discern between the measuring signal generating phase and the calibration phase. The measuring signal generating phase provides a measuring signal that—when used—delivers a relatively sharp peak in the response signal to the measuring signal, while the calibration phase provides a flow meter that provides a precise flow rate measurement.

The following steps of the method according to the specification:

providing an impulse signal to a first ultrasonic transducer, the first ultrasonic transducer being located at the fluid conduit at a first location, providing a response signal of the impulse signal at a second ultrasonic transducer, the second ultrasonic transducer being located at the fluid conduit at a second location, deriving a measuring signal from the response signal, the derivation of the measuring signal comprising selecting a signal portion of the response signal or of a signal derived therefrom and reversing the signal portion with respect to time, can be provided by applying and measuring real actual signals to a real conduit. It turned out that the steps of providing a response signal of the impulse signal at a second ultrasonic transducer and of deriving a measuring signal can be obtained by a numerical or analog simulation, once the impulse signal is provided as a digital or analog signal. Finite element software can be used for this purpose.

The piezoelectric transducers are located at the fluid conduit. In particular, they can be located at respectively mounted to the fluid conduit. The first piezoelectric transducer is located at respectively mounted to a perimeter of the fluid conduit at a first location. In one particular embodiment, it is clamped onto the perimeter of the fluid conduit. A response signal of the impulse signal is received at a second piezoelectric transducer.

The second ultrasonic transducer, such as piezoelectric transducer is located at respectively mounted to the fluid conduit at a second location, which is offset along a longitudinal direction of the fluid conduit with respect to the first location and along a cross-section which goes through the center of the conduit axis, wherein the longitudinal direction corresponds to a direction of average flow through the channel. The fluid conduit can be completely filled with the fluid if reflections at the fluid surface and other effects are not wanted.

A measuring signal is derived from the response signal, which is a response of the transmission channel to an initial impulse signal, with analog means or also digitally. The derivation of the measuring signal comprises selecting a signal portion of the response signal or of a signal derived therefrom and reversing the signal portion with respect to time, and it may comprise the step of storing measuring signal, e.g. in its digitized form in a computer readable memory for later use. Herein, different sequences of the method steps are possible. For example, the signal may be inverted with respect to time after storing it.

During a measurement phase, in which the fluid moves with respect to the fluid conduit according to external conditions such as pressure, gravity, inclination of the pipe etc., the measuring signal is applied to one of the first and the second ultrasonic transducers, such as piezoelectric transducers. More particular, an electric signal, which can be derived from a stored measuring signal, can be applied to the transducer.

A first response signal of the measuring signal is measured at the other ultrasonic transducer, such as piezoelectric transducer, a flow speed of the fluid is derived from at least the first response signal. In particular this comprises measuring a downstream or upstream time of flight. An estimate of the velocity may be obtained by comparing the measured time of flight with a time of flight under calibration taking into account the velocity of sound under the current conditions, for example by measuring a temperature of the fluid. In further steps, a volumetric flow or a mass flow may be derived from the flow speed or from a flow speed profile.

In order to obtain a more accurate estimate, measurements may be carried out in both directions, from the first to the second ultrasonic transducer, such as piezoelectric transducer and in reverse direction. In particular, this allows to eliminate the speed of sound in a time of flight measurement or it can provide a reliable estimate of the current speed of sound.

A flow measurement according to the present specification can be used in to arrangements with only two transducers and also in multi-transducer arrangements, such as the arrangements of FIGS. 43 and 44 or the arrangement of FIGS. 4 and 5. In particular, the flow measurement can be obtained by a pair of transducers of a multi-transducer arrangement, which are arranged opposite to each other. The pair of transducers may be arranged in a plane through a central axis of the conduit, as shown in FIG. 43 or they can be arranged in a plane that is offset with respect the central axis of the conduit, as shown in FIG. 44. The arrangement of FIG. 44 can be used to determine the fluid velocity in a fluid layer at a predetermined distance to the central axis.

Accordingly, the steps of applying the measuring signal and measuring the response signal are repeated in the reverse direction. In other words, the previous receiver is used as a sender and the previous sender is used as receiver and a signal is sent from the respective other ultrasonic transducer, such as piezoelectric transducer to the respective first one of the two transducers in order to obtain a second response signal. A flow speed of the fluid is derived from the first response signal and the second response signal. In particular, the derivation comprises deriving a downstream and an upstream time of flight.

Although one can send a measuring signal from one ultrasonic transducer, such as piezoelectric transducer to another ultrasonic transducer, such as piezoelectric transducer, it is also beneficial to execute this forward and reverse when a velocity or flow measurement is done.

In other words, the procedure can be done the following way.

Forward Direction:
  Sending an impulse signal from a first ultrasonic transducer to a second ultrasonic transducer,
  Receiving a response signal of the impulse signal at the second ultrasonic transducer,
  Inverting the received response signal at the second ultrasonic transducer with respect to time, thereby obtaining a measuring signal,
  Sending the measuring signal from the first ultrasonic transducer to the second ultrasonic transducer,
  Receiving a response signal of the measuring signal at the second ultrasonic transducer.

Reverse Direction:
  Sending an impulse signal from the second ultrasonic transducer to the first ultrasonic transducer, such as piezoelectric transducer,
  Receiving a response signal of the impulse signal at the first ultrasonic transducer,
  Inverting the received response signal of the impulse signal from the first ultrasonic transducer with respect to time, thereby obtaining a measuring signal,
  Sending the measuring signal from the second ultrasonic transducer to the first ultrasonic transducer,
  Receiving a response signal to the measuring signal at the first ultrasonic transducer,
  Measuring the time difference between the received response signals at the second ultrasonic transducer and the first ultrasonic transducer. This time difference is proportional to the velocity of flow between the two ultrasonic transducers, such as piezoelectric transducers.

Please note that the measuring signal for the forward direction can be different from the measuring signal for the backward direction. The measuring signal has usually a unique shape for each direction of propagation, although for simple configurations identical measuring signals can be used.

Throughout the application, the term "computer" is often used. Although a computer includes devices such as a laptop or a desktop computer, the signal transmission and receiving can also be done by microcontrollers, ACID's, FPGA's, etc.

Furthermore, a thought connection line between the transducers may be geometrically offset with respect to a center of the fluid conduit in order to obtain a flow speed in a predetermined layer and there may be more than one pair of transducers. Furthermore, the measuring signal may be provided by more than one transducer and/or the response signal to the measuring signal may be measured by more than one transducer.

According to a simple embodiment, an average measuring signal is generated by a linear superposition of the response signals from the multitude of receiving transducers and the abovementioned signal processing steps are performed on the average response signal to obtain a measuring signal.

According to yet another embodiment, there is an equal number, say N, of sending and receiving transducers, wherein the relative placements of the sending transducers are equal to the relative placements of the receiving transducers. The N received response signals are then processed individually according to the abovementioned signal processing steps to obtain N individual measuring signals.

These N transducers are typically arranged e.g. as clamp-on transducers, insertion or internal mount transducers. By way of example, FIG. 43 shows an arrangement with 8 clamp on transducers and FIG. 44 shows an arrangement with 8 insertion transducers. The 8 transducers of FIG. 43 are arranged in four respective planes, which are going through the axis center of the conduit.

The 8 insertion transducers of FIG. 44 are arranged in four parallel planes.

The connection lines between the transducers show an operation mode of the transducers. In the operation mode of FIG. 43, signals are sent from a first transducer to a second transducer which is opposite to the first transducer with respect to a centre point on the centre axis of the water duct.

In the operation mode of FIG. 44, signals are sent from a first transducer to a second transducer with respect to a centre point, which is located at the centre of the respective rectangular arrangement and in one of the four parallel planes.

According to one embodiment the signal portion of the response signal that is used to derive the measuring signal comprises a first portion around a maximum amplitude of the response signal and a trailing signal portion, the trailing signal portion extending in time behind the arrival time of the maximum amplitude. The trailing portion provides signals from further reflections apart from the signals in the vicinity of the direct signal and can contribute to a better focusing.

In order to obtain an improved generated measuring signal, the steps of applying an impulse signal and receiving a corresponding response signal may not only be done once but they can be repeated multiple times, at least two times. Thereby, a plurality of response signals is obtained. A measuring signal is then derived from an average of the received response signals.

In one embodiment, the measurements are repeated multiple times but with the ultrasound signal traveling in one direction only. In another embodiment, the measurements are repeated multiple times, the ultrasound signal travelling in both directions. In yet another embodiment, the measurements are repeated multiple times in both directions and separate averages are derived for both directions.

According to a further embodiment, the derivation of a measuring signal form one or more received response signals comprises determining an envelope of the response signal or of a signal derived therefrom. An amplitude modulated oscillating signal is provided which is amplitude modulated according to the envelope. Using an envelope instead of samples, or in addition to it, may provide benefits in terms of storage space and computation speed.

In particular, the modulation amplitude may have the shape of the determined envelope for the measuring signal or for a portion of it. An oscillation frequency of a carrier oscillation is at least 20 kHz. According to further embodiments the frequency is at least 100 kHz, at least 500 kHz, or at least 1 MHz. The choice of frequency affects the scattering process and a higher frequency may provide a finer-grained sampling of a conduit wall, which may in turn allow a more precise shaping of the ultrasound signal.

According to further embodiments, the response signal or a signal derived therefrom is digitized with respect to amplitude, and especially with a resolution between 1 and 8 bit. The present specification shows that even a coarse digitization with respect to amplitude may lead to a sufficient focusing of the ultrasound signal. Using a low resolution saves computing time and memory space, while higher resolutions do not necessarily provide a more precise measurement result of the fluid flow rate through the conduit. It has also turned out that increasing or decreasing the resolution of the response signal or the measuring signal can help to improve the signal-to-noise-ratio and the precision of the time measurement. Reducing the resolution results in a sharper or more characteristic peak in the response to the measuring signal. This means that if there is high SNR, one could decrease the resolution of the measuring signal or the response signal to the measuring signal instead of increasing the transmitting power of the measuring signal.

According to a further aspect the present specification, some methods for determining a flow speed of a fluid in a fluid conduit or pipe may use an amplitude modulated measuring signal or an amplitude modulated response signal of a transmission time ultrasonic flow meter. This method does not necessarily involve a signal generating phase step, although a one-time signal generating phase step may be used to obtain a measuring signal. For example, the method may rely on a pre-generated measuring signal at a factory site, wherein the measuring signal is generated as an with respect to time inverted receive signal of one ultrasonic transducer, such as piezoelectric transducer that has received a series of oscillations sent out by another ultrasonic transducer, such as piezoelectric transducer.

In a first step, the fluid conduit is provided with the fluid, which moves with respect to the fluid conduit according to external conditions such as pressure, gravity, inclination of the pipe etc.

A first piezoelectric transducer is provided at a first location of the fluid conduit. A second ultrasonic transducer, such as piezoelectric transducer at is provided at a second location of the fluid conduit. The second location is offset along a longitudinal direction of the fluid conduit with respect to the first location, the longitudinal direction corresponds to a fluid flow direction of the fluid channel.

A measuring signal is provided and applied to the first or to the second ultrasonic transducers, such as piezoelectric transducers. More particular, an electric signal which is derived from an amplitude modulated signal that can be sent to the transducer.

A first response signal of the measuring signal is measured at the other ultrasonic transducer, such as piezoelectric transducer, and a flow speed of the fluid is derived from the first response signal. In particular, this comprises deriving a downstream or an upstream time of flight.

Similar to the abovementioned method, a higher precision may be achieved by repeating the measurement in the reverse direction to obtain a downstream and an upstream time of flight. As shown in FIGS. 43 and 44, N pairs of transducers can be utilized, for example for obtaining a more accurate estimate of the average flow or for obtaining an estimate of the flow in a plane at a predetermined distance from the central axis of the liquid duct.

In particular, the steps of applying the measuring signal and measuring the response signal are repeated in the reverse direction to obtain a second response signal, and a flow speed of the fluid is derived from the first response signal and the second response signal, wherein the derivation comprises deriving a downstream and an upstream time of flight.

These steps are very similar to the method steps as described above, with the difference that measurements are done without adjusting the device before each measurement.

The following features apply to both methods, with or without signal generation phase before each measurement.

According to a further embodiment, an amplitude of the measuring signal or an amplitude of the response signal can increase to a maximum amplitude over a predetermined number of oscillations, e.g. five or more oscillation periods of the carrier signal. When the amplitude increases over a period of time, an inertia effect of a reaction time of the ultrasonic transducers, such as piezoelectric transducers on the measurement can be reduced.

In one particular embodiment, the measuring signal or the response signal increases exponentially to a maximum amplitude over at least five oscillation periods of the carrier signal.

According to a further embodiment, the measuring signal comprises a leading portion, the leading portion extending in time over a number of half-widths of a signal maximum of the measuring signal, and the leading portion preceding at least one half-width region of the signal maximum in time.

According to yet another embodiment, the measuring signal comprises a leading portion. The leading portion is derived from a trailing portion of a received signal, which succeeds a signal maximum of the received signal with respect to time. The leading portion extends over at least three times the half-width around the signal maximum of the received signal.

According to further embodiments, the leading portion comprises at least 10% or at least 50% of a signal energy of the measuring signal.

A signal energy E of a signal s(t) in a time interval may be defined in terms of the expression $E=\int_{T1}^{T2} dt |s(t)|^2$ or its discrete version $E=\Sigma_{i=-m}^{n}|s(i)|^2$, wherein the time interval is given by [T1, T2] or [$-m*\Delta t, n*\Delta t$], respectively.

The leading portion of the measuring signal may contribute significantly to the production of a signal which is peaked in space and time.

In some specific embodiments, the measuring signal or the response signal can be provided by an amplitude-modulated oscillating signal, which is digitized with respect to amplitude, e.g. with a resolution between 1 and 8 bit. This may provide benefits in terms of computation velocity and memory space and can even lead to an increased signal peak.

According to a further embodiment, the measuring signal that is applied to a transducer can comprise an oscillating signal that is modulated according to a 0-1 modulation providing either a predetermined amplitude or no amplitude, or, in other words a zero amplitude.

In particular, the amplitude modulated measuring signal may be derived from a measured response signal according to a signal generating phase in which the fluid conduit is provided with a fluid that has a predetermined velocity or is essentially at rest with respect to the fluid conduit.

An impulse signal is applied to the first ultrasonic transducer, such as piezoelectric transducer, and a response signal of the impulse signal is received at a second ultrasonic transducer, such as piezoelectric transducer.

The measuring signal is derived from the response signal. The derivation of the measuring signal comprises selecting a signal portion of the response signal or of a signal derived therefrom and reversing the signal portion with respect to time and a digitized measuring signal can be stored in a computer readable memory for later use.

In one particular embodiment, an amplitude of an envelope of the measuring signal or of a response signal can increase by at least one order of magnitude from a leading signal portion of the measuring signal to a maximum amplitude. The leading signal portion precedes the signal maximum in time. In other words, it is sent out earlier. According to further embodiments, the amplitude increases by at least two or even at least three orders of magnitude.

According to a further aspect, a device for measuring a flow speed in a travel time ultrasonic flow meter is disclosed. The device comprises a first connector for connecting a first piezoelectric element, a second connector for connecting a second piezoelectric element, an optional digital to analog converter (DAC), which is connected to the first connector and an optional analog to digital converter (ADC), which is connected to the second connector.

Furthermore, the device comprises a computer readable memory, an electronic timer or oscillator, a transmitting unit for sending an impulse signal to the first connector and a receiving unit for receiving a response signal to the impulse signal from the second connector.

Moreover, the device comprises means for generating the measuring signal from a received response signal, such as a selection unit for selecting a portion of the received response signal or a signal derived therefrom, and an inverting unit for inverting the selected portion of the response signal with respect to time to obtain an inverted signal. Optionally, a bandpass filter may be provided to remove unwanted signal components. Furthermore, a processing unit is provided for deriving a measuring signal from at least the inverted signal and for storing the measuring signal in the computer readable memory.

Furthermore, the device comprises means for measuring a flow speed. A measuring signal generator, which is connectable to the first connector or to the second connector and a transmitting means, such as the DAC and the connectors, for sending the measuring signal to the first connector are provided at a sending side. A receiving unit for receiving a response signal of the measuring signal from the second connector and a velocity processing unit for deriving a velocity of flow from the received response signal are provided at a receiving side. The terms velocity of flow, flow velocity and flow speed are used as synonyms in the present application.

While the device can be provided as an analog device without A/D and D/A converters and without a computer readable memory unit, it is also possible to provide the device or parts of it with a digital computer system.

In particular, the various signal processing units, such as the velocity processing unit, the selection unit and the inverting unit may be provided entirely or partially by an application specific electronic component or by a program memory with a computer readable instruction set. Similarly, the measuring signal generator and an impulse signal generator of the transmitting unit may be provided entirely or partially by an application specific electronic component which may comprise a computer readable instruction set.

According to a further embodiment, the device comprises a direct digital signal synthesizer (DDS) that comprises the abovementioned ADC. The DDS comprises a frequency control register, a reference oscillator, a numerically controlled oscillator and a reconstruction low pass filter. Furthermore, the ADC is connectable to the first and to the second connector over the reconstruction low pass filter.

Among others, the digital signal synthesizer can be configured to synthesize a signal, such as the measuring signal, by using a pre-determined algorithm or predetermined values which are stored in a memory unit with a computer readable memory. For example, the signal can be generated by direct signal generation or by DDS (direct digital synthesis).

Furthermore, the current specification discloses a flow measurement device with a first piezoelectric transducer that is connected to the first connector, and with a second ultrasonic transducer, such as piezoelectric transducer, that is connected to the second connector. In particular, the ultrasonic transducers, such as piezoelectric transducers may be provided with attachment regions, such as a clamping mechanism for attaching them to a pipe.

Furthermore, the current specification discloses a flow measurement device with a pipe portion. The first ultrasonic transducer, such as piezoelectric transducer is mounted to the pipe portion at a first location and the second ultrasonic transducer, such as piezoelectric transducer is mounted to the pipe portion a second location. In particular, the transducers may be clamped to the pipe portion. Providing the device with a pipe portion may provide benefits when the device is pre-calibrated with respect to the pipe portion.

The device can be made compact and portable. A portable device according to the present specification, which is equipped with surface mountable transducers, such as clamp-on transducers, can be used to check a pipe on any accessible location. In general, the device may be stationary or portable. Preferentially, the device is sufficiently compact to be placed at a required location and sufficiently protected against environmental conditions, such as humidity, heat and corrosive substances.

Moreover, the current specification discloses a computer readable code for executing a flow measurement method according to the present specification, a computer readable memory comprising the computer readable code and an application specific electronic component, which is operable to execute the method steps of a method according to the current specification.

In particular, the application specific electronic component may be provided by an electronic component comprising the abovementioned computer readable memory, such as an EPROM, an EEPROM a flash memory or the like. According to other embodiments, the application specific electronic component is provided by a component with a hard-wired or with a configurable circuitry such as an application specific integrated circuit (ASIC) or a field programmable gate array (FPGA).

In a further embodiment, an application specific electronic component according to the current specification is provided by a plurality of interconnected electronic components, for example by an FPGA, which is connected to a suitably programmed EPROM in a multi-die arrangement. Further examples of an application specific electronic component are programmable integrated circuits such as programmable logic arrays (PLAs) and complex programmable logic devices (CPLDs).

It is helpful to determine whether an off-the-shelf test device is measuring a flow speed of a fluid in a fluid conduit according to present application. To this purpose one provides the fluid conduit with a fluid that has a pre-determined velocity with respect to the fluid conduit. A test impulse signal is applied to a first ultrasonic transducer, such as piezoelectric transducer of the test device, the first piezoelectric transducer being mounted to the fluid conduit at a first location, followed by receiving a test response signal of the test impulse signal at a second piezoelectric transducer of the test device, the second ultrasonic transducer, such as piezoelectric transducer being mounted to the fluid conduit at a second location.

A test measuring signal is then derived from the response signal, the derivation of the test measuring signal comprising reversing the signal with respect to time, followed by comparing the test measuring signal with a measuring signal that is emitted at the other one of the first and the second ultrasonic transducer, such as piezoelectric transducer. The measuring signal is a signal that is provided by the test device when supplied by the manufacturer, based on a one-time generated factory measuring signal after manufacturing the test device, often mounted to a piece of tube.

In a case where the test device is using a method to determine a flow speed of a fluid in a fluid conduit according to the application, the test measuring signal and the measuring signal are similar. In other words, reverse engineering of the subject matter of the application is provided by choosing a test signal and repeating the signal generating phase of the application until the test measuring signal and the measuring signal are similar. The term "similar" means that there is significant correlation between the test measuring signal and the measuring signal.

The method may also comprise selecting a signal portion of the test response signal or of a signal derived therefrom and storing the test measuring signal for later use.

Accordingly, a device for measuring a flow speed in a travel time ultrasonic flow meter as defined by functional features comprises a first connector for a first piezoelectric element, a second connector for a second piezoelectric element, a transmitting unit for sending an impulse signal to the first connector, a receiving unit for receiving a response signal to the impulse signal from the second connector, an inverting unit for inverting the response signal with respect to time to obtain an inverted signal, a processing unit for deriving a measuring signal from the inverted signal. When using the device for determining a flow speed of a fluid in a fluid conduit, one will provide the fluid conduit with a fluid that has a velocity with respect to the fluid conduit. This is followed by applying a measuring signal to one of the first and the second ultrasonic transducer, such as piezoelectric transducer, and by measuring a first response signal of the measuring signal at the other one of the first and the second ultrasonic transducer, such as piezoelectric transducer. One can then derive a flow speed of the fluid from the first response signal. Reverse engineering of the device will reveal that, when applying a test impulse signal to a first ultrasonic transducer, such as piezoelectric transducer of the test device, receiving a test response signal of the test impulse signal at a second piezoelectric transducer of the test device, the second ultrasonic transducer, such as piezoelectric transducer being mounted to the fluid conduit at a second location, deriving a test measuring signal from the response signal, the derivation of the test measuring signal comprising reversing the signal with respect to time, wherein the test measuring signal and a measuring signal that is emitted at the first or the second ultrasonic transducer, such as piezoelectric transducer are similar. This functional description helps to characterize the device of the application without describing the structure and shape of the emitted signals.

It is clear that the device can have a D/A converter, the D/A converter being connected to the first connector, an A/D converter, the A/D converter being connected to the second connector, and a computer readable memory. It can further comprise a selection unit for selecting a portion of the received response signal or a signal derived therefrom, wherein the evaluations above are done with the selected portion of the received response signal or a signal derived therefrom.

BRIEF DESCRIPTION OF THE DRAWINGS

The subject matter of the present specification is now explained in further detail with respect to the following Figures, wherein:

FIG. 1 shows a first flow meter arrangement with two piezoelectric elements.

FIG. 2 shows the flow meter arrangement of FIG. 1 with one direct signal.

FIG. 3 shows the flow meter arrangement of FIG. 2 in the viewing direction A-A.

FIG. 4 shows a second flow meter arrangement with four piezoelectric elements and four direct signals.

FIG. 5 shows the flow meter arrangement of FIG. 4 in the viewing direction B-B.

FIG. 6 shows a schematic diagram of a test signal.

FIG. 7 shows a schematic diagram of a test signal response.

FIG. 8 shows a schematic diagram of an inverted signal.

FIG. 9 shows a schematic diagram of a response from the inverted signal.

FIG. 16 shows a further inverted signal in high resolution.

FIG. 17 shows a response of the inverted signal of FIG. 16.

FIG. 32 shows a further inverted signal in 2-bit resolution.

FIG. 33 shows a response of the signal of FIG. 32.

FIG. 37 shows a signal of a piezoelectric element of the flow meter of FIG. 1, which is derived from the inverted response of the signal of FIG. 36.

FIG. 38 shows a response of the signal of FIG. 37.

DETAILED DESCRIPTION OF THE PREFERRED EMBODIMENTS

Figure 10:
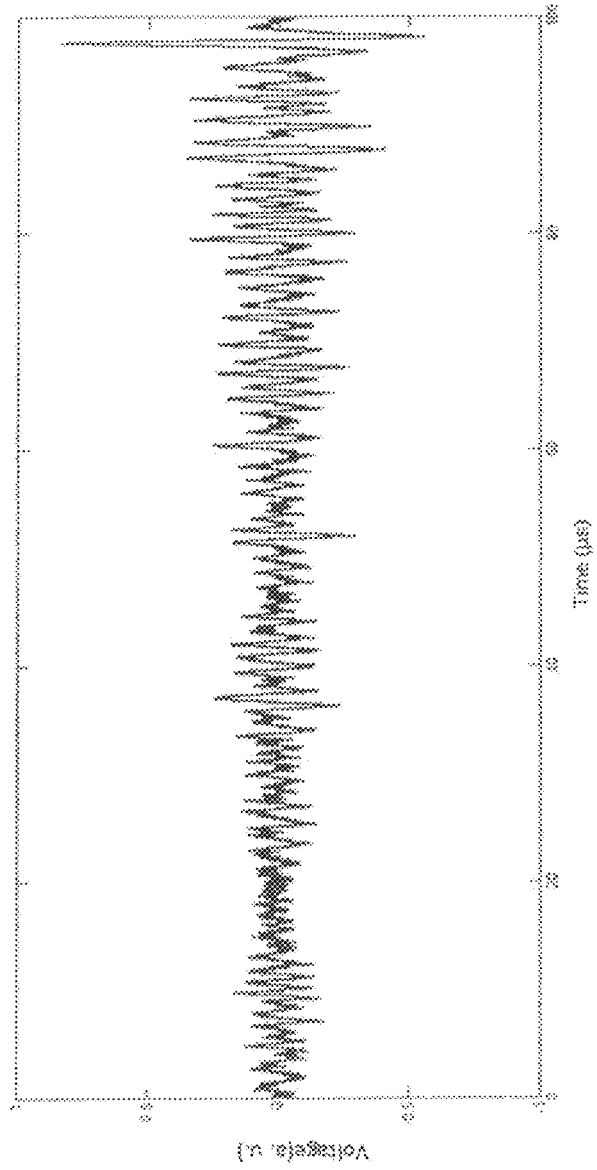
FIG. 10 shows a first inverted signal in high resolution.
Figure 11:
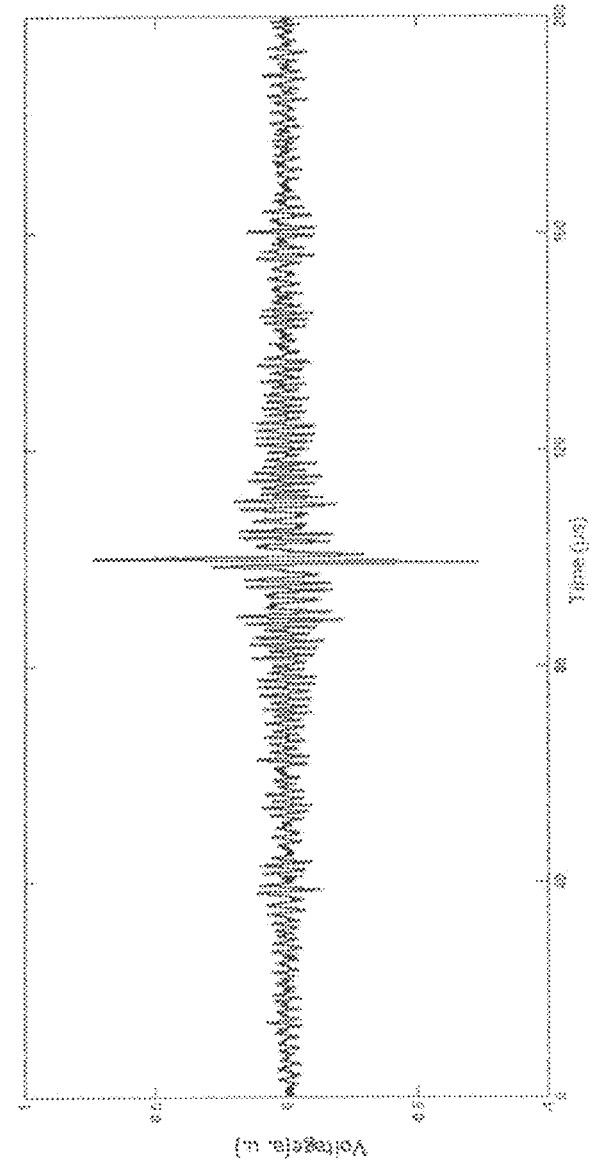
FIG. 11 shows a response of the inverted signal of FIG. 10.
Figure 12:
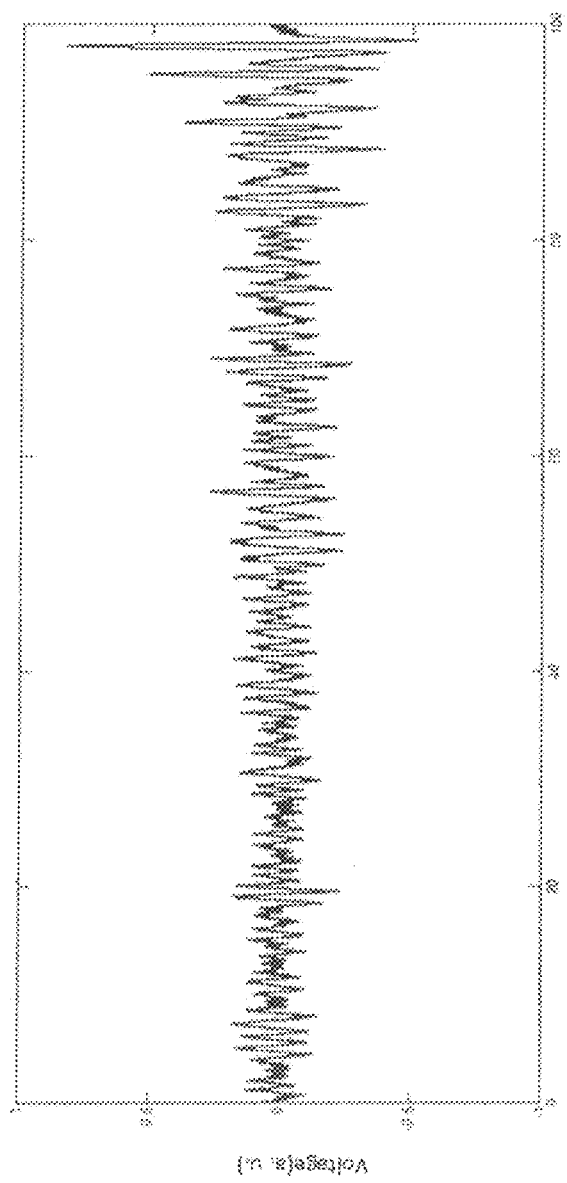
FIG. 12 shows a further inverted signal in high resolution.
Figure 13:
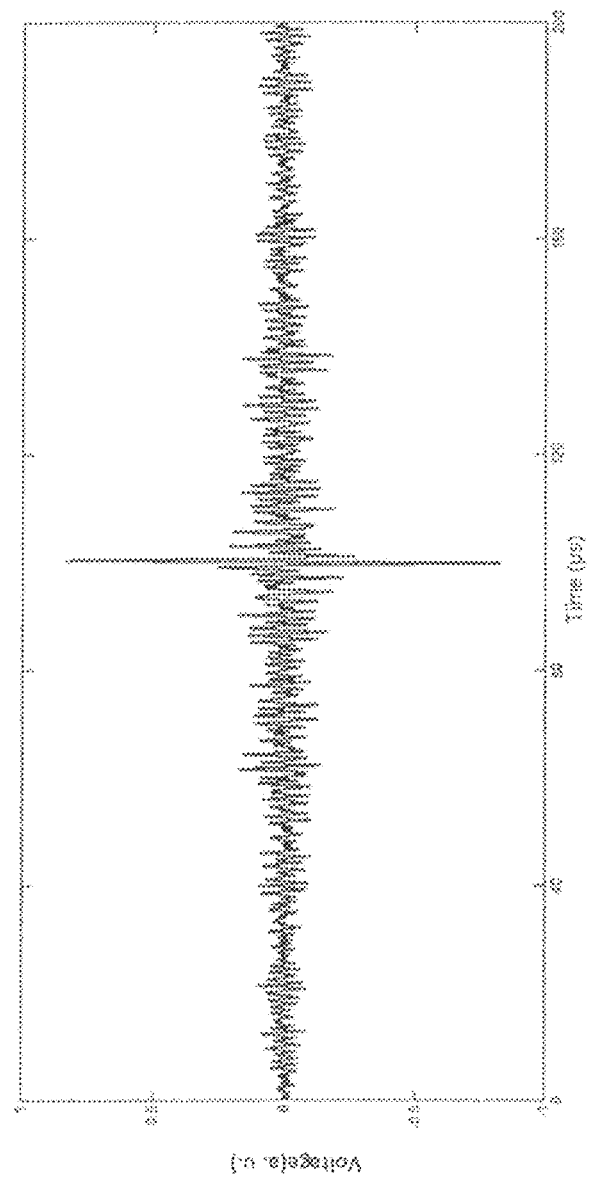
FIG. 13 shows a response of the inverted signal of FIG. 12.
Figure 14:
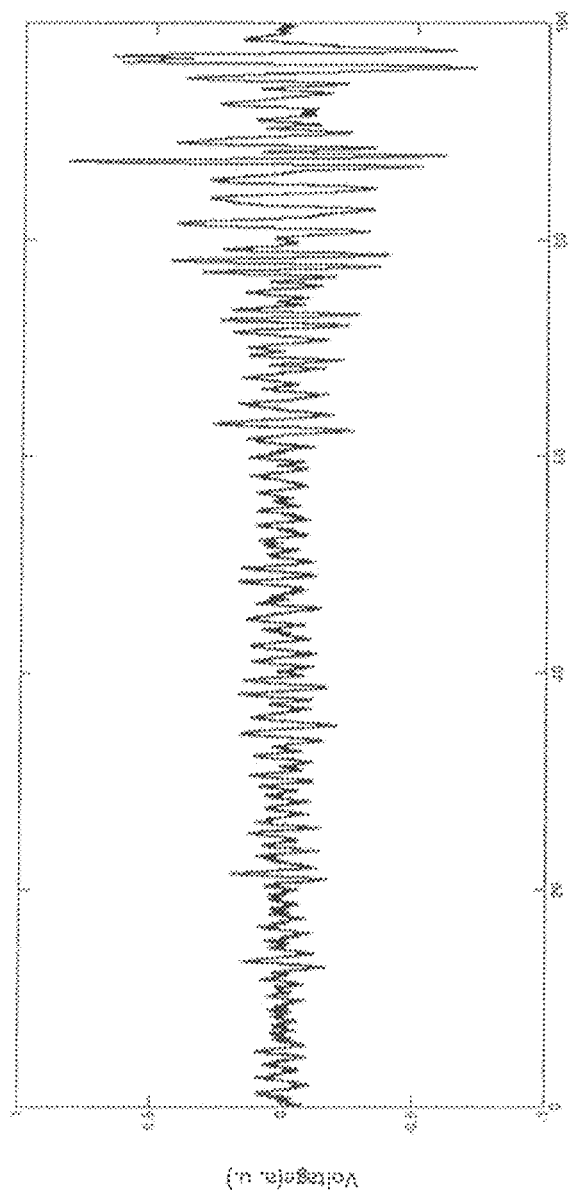
FIG. 14 shows a further inverted signal in high resolution.
Figure 15:
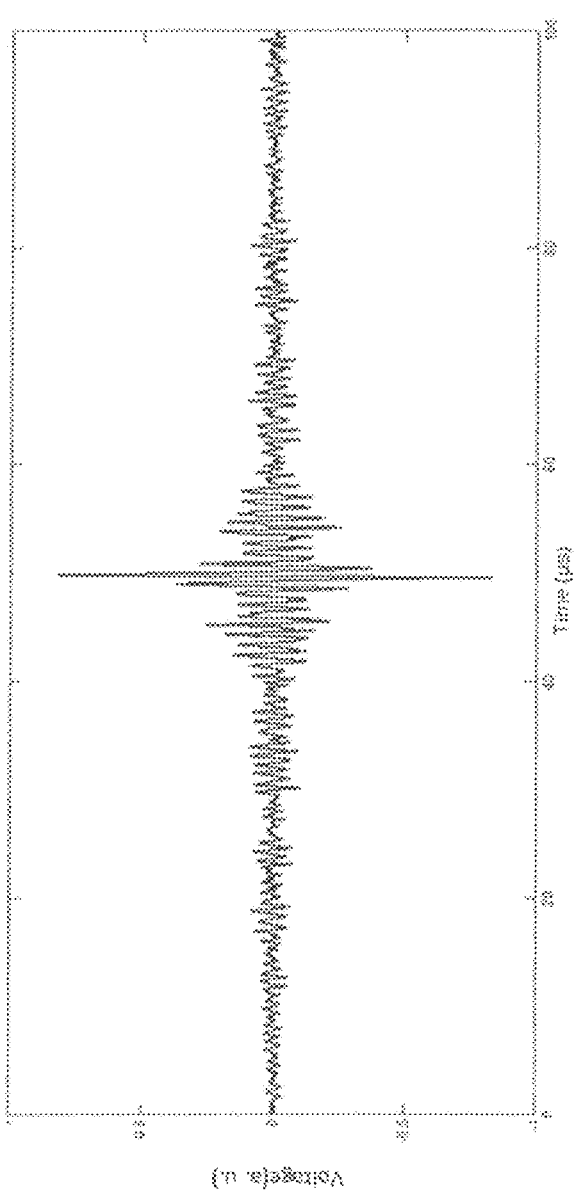
FIG. 15 shows a response of the inverted signal of FIG. 14.
Figure 18:
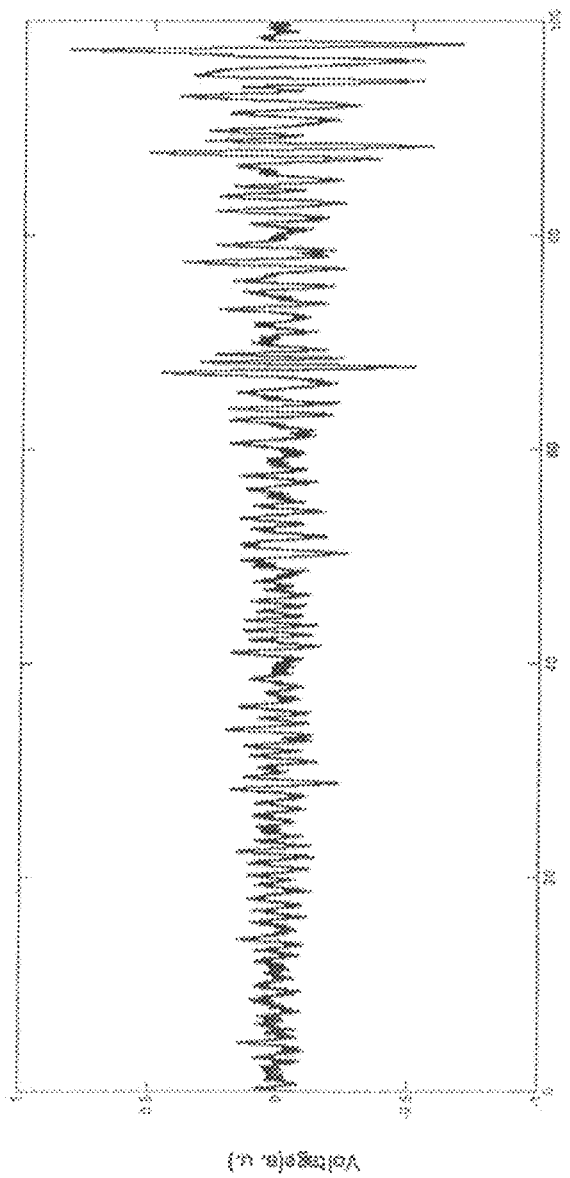
FIG. 18 shows a further inverted signal in high resolution.
Figure 19:
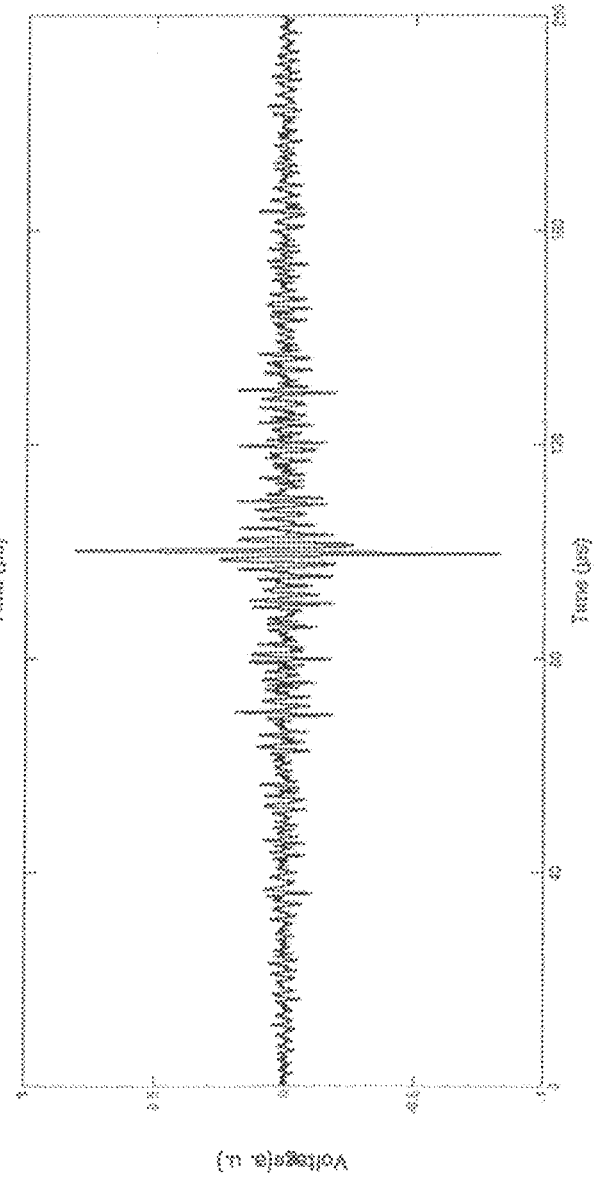
FIG. 19 shows a response of the inverted signal of FIG. 18.
Figure 20:
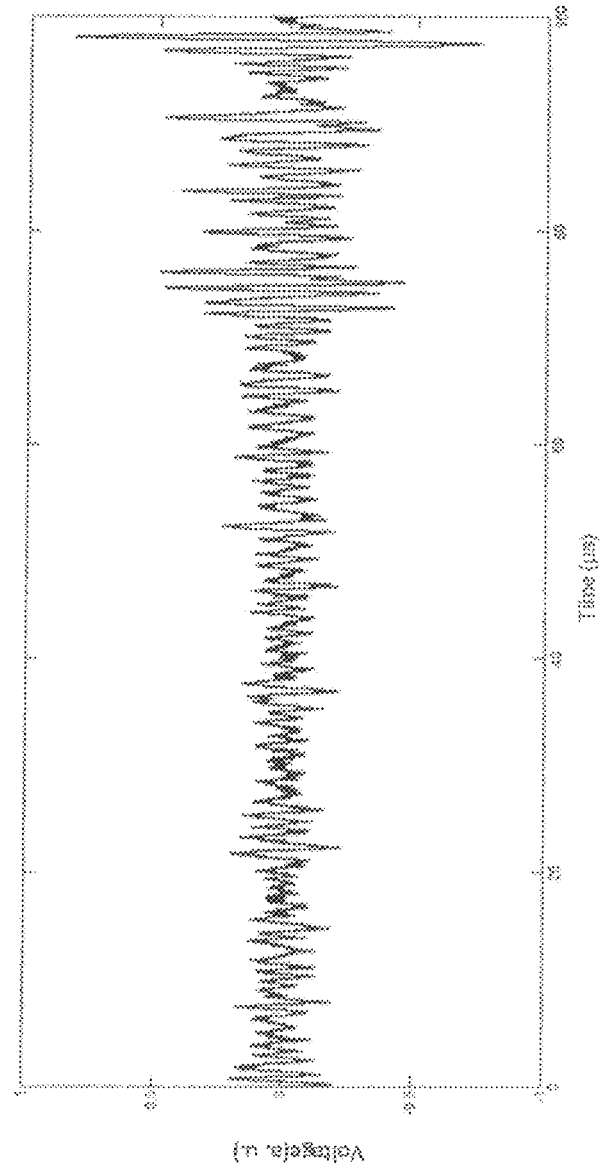
FIG. 20 shows a further inverted signal in high resolution.
Figure 21:
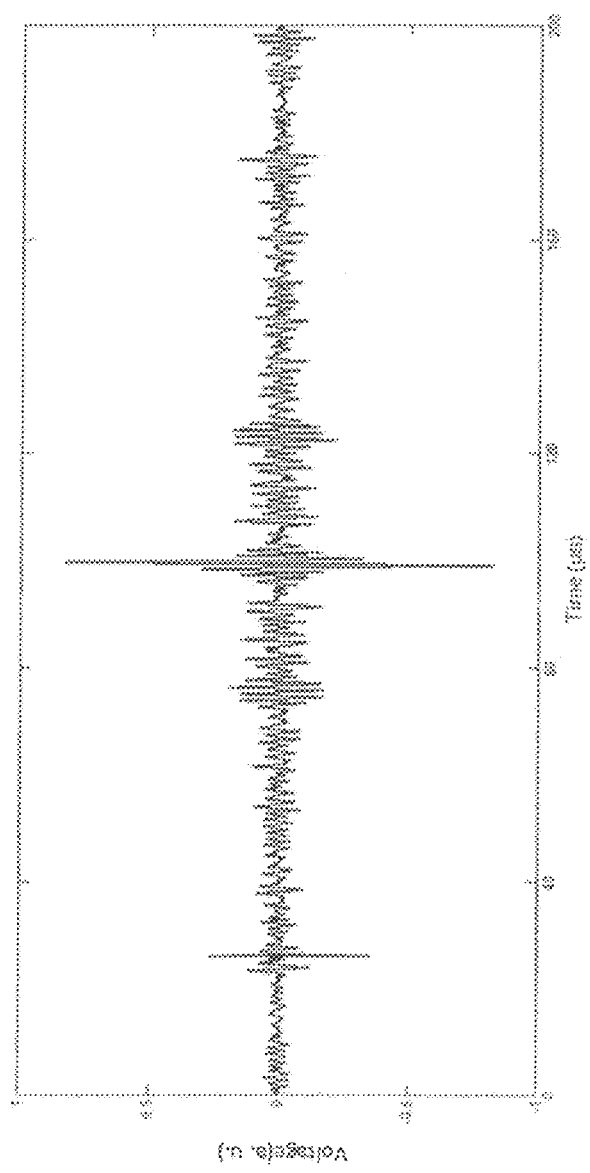
FIG. 21 shows a response of the inverted signal of FIG. 20.
Figure 22:
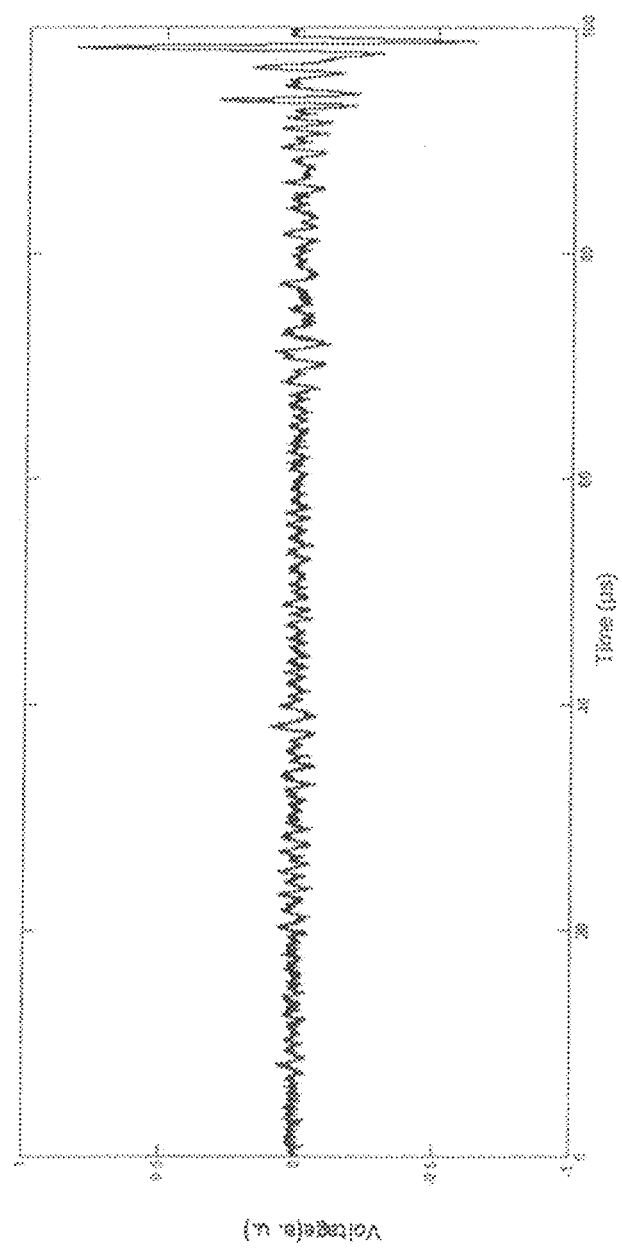
FIG. 22 shows a further inverted signal in high resolution.
Figure 23:
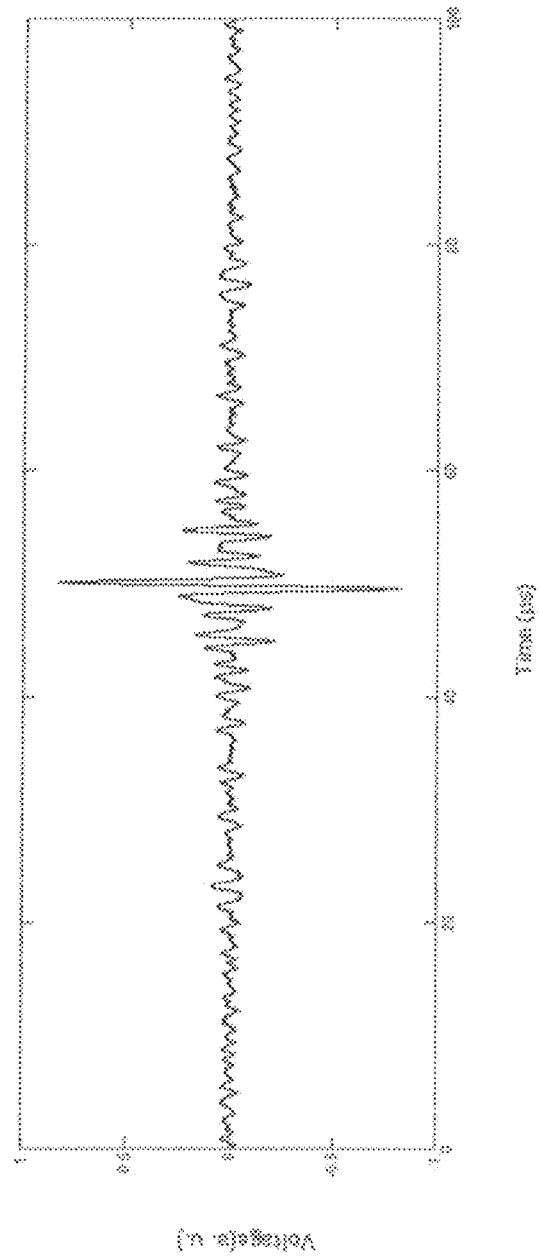
FIG. 23 shows a response of the inverted signal of FIG. 22.
Figure 24:
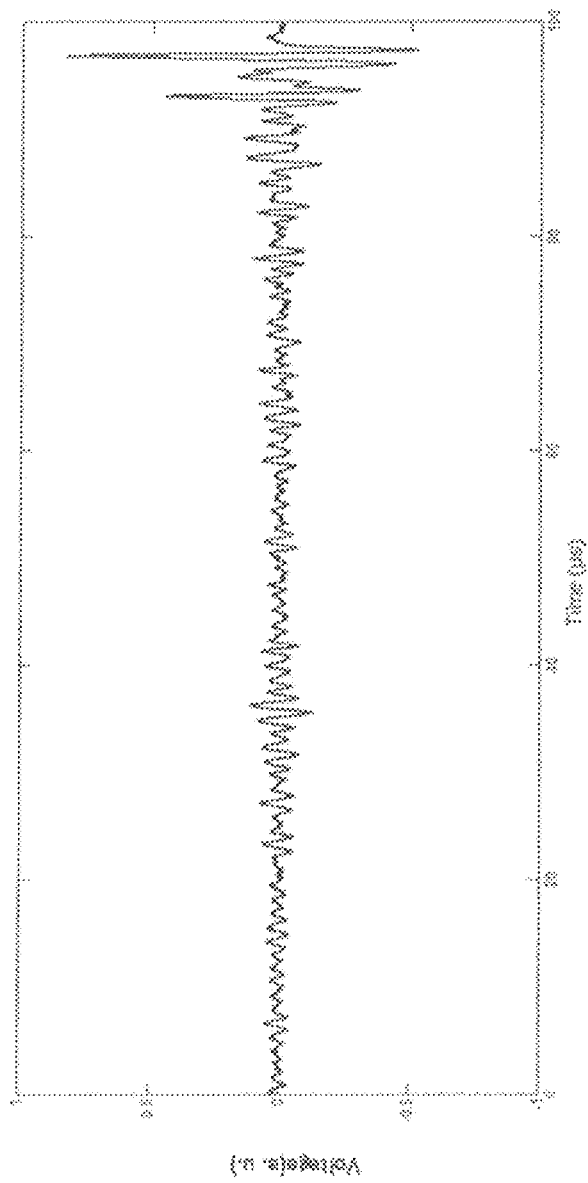
FIG. 24 shows a further inverted signal in high resolution.
Figure 25:
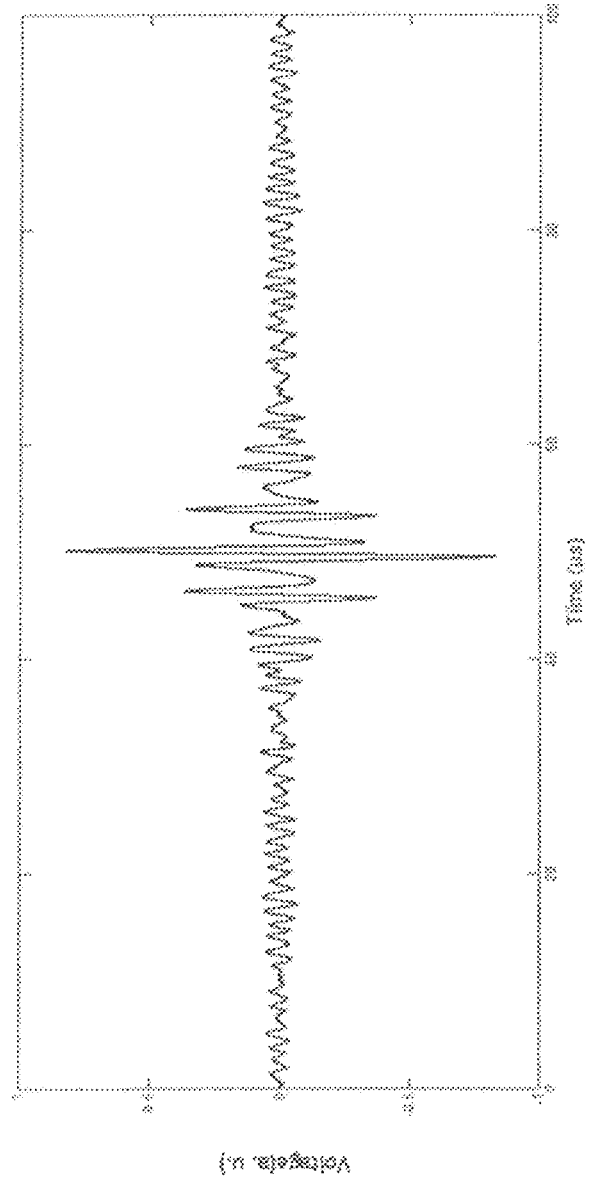
FIG. 25 shows a response of the inverted signal of FIG. 24.
Figure 26:
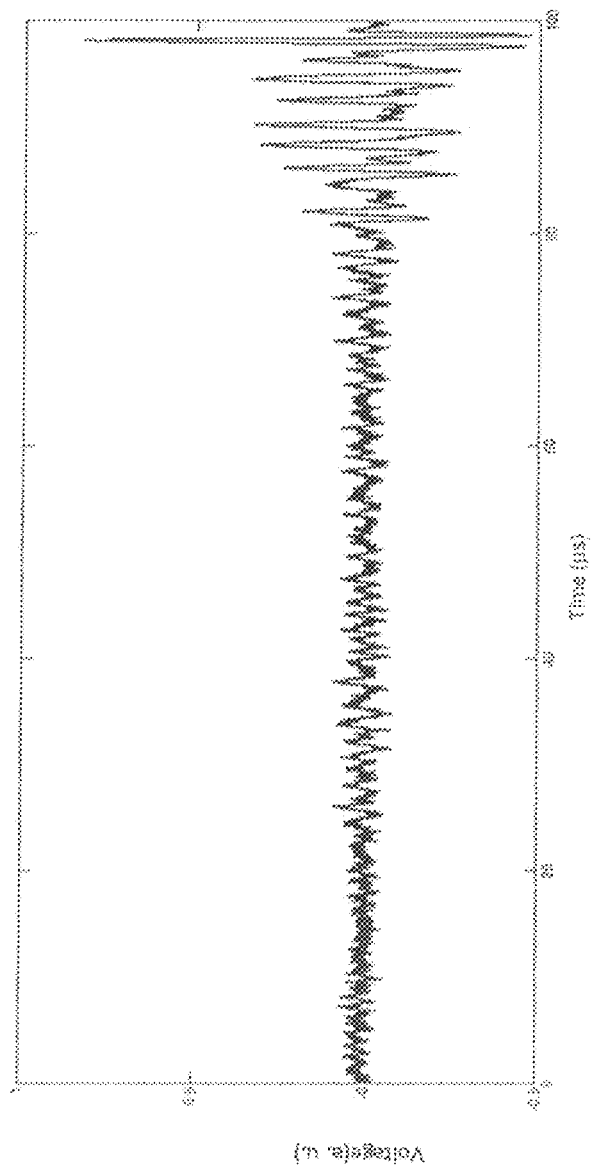
FIG. 26 shows a further inverted signal in high resolution.
Figure 27:
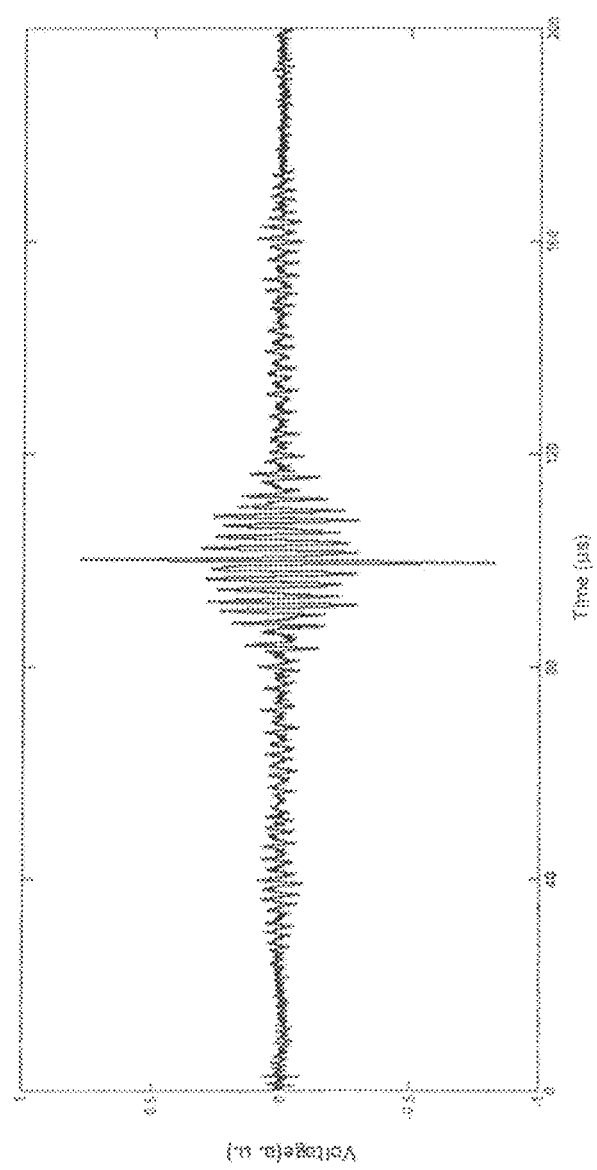
FIG. 27 shows a response of the inverted signal of FIG. 26.
Figure 28:
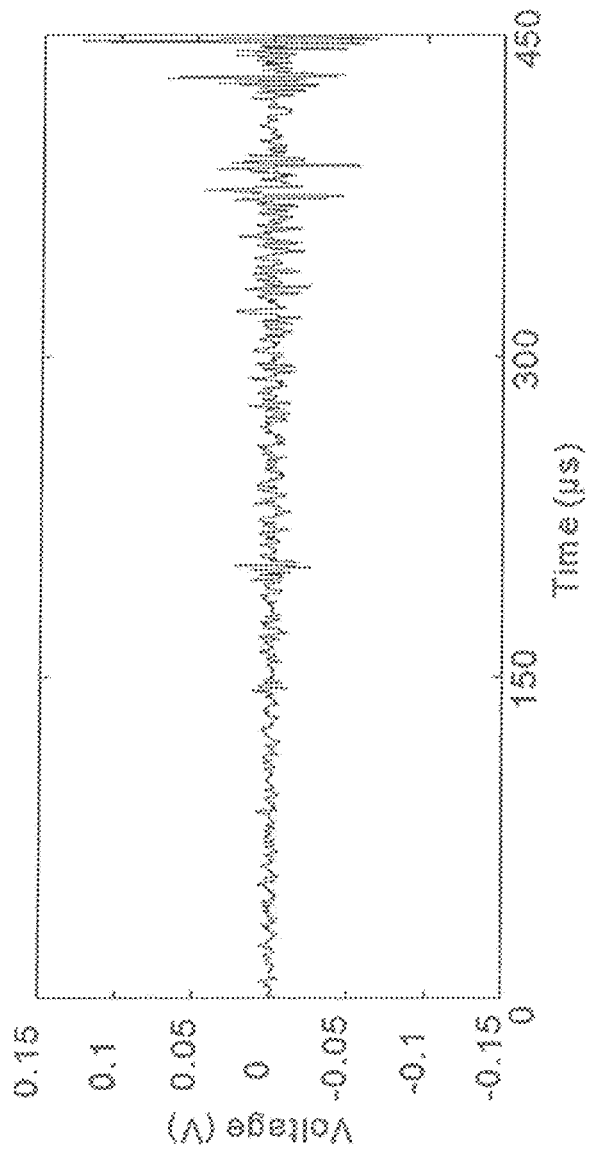
FIG. 28 shows a further inverted signal in 12-bit resolution.
Figure 29:
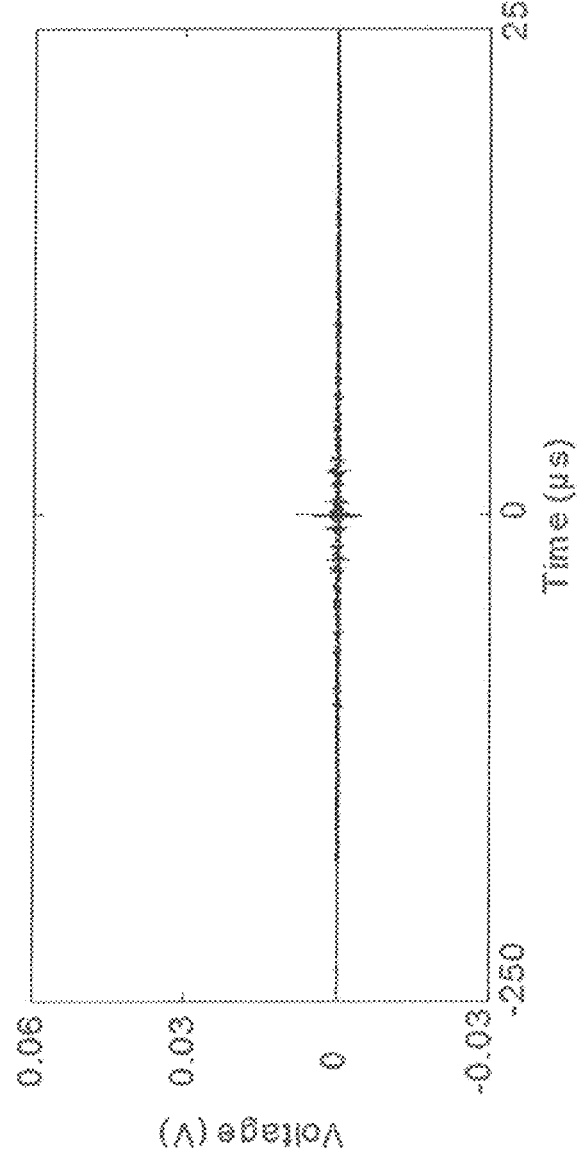
FIG. 29 shows a response of the signal of FIG. 28.
Figure 30:
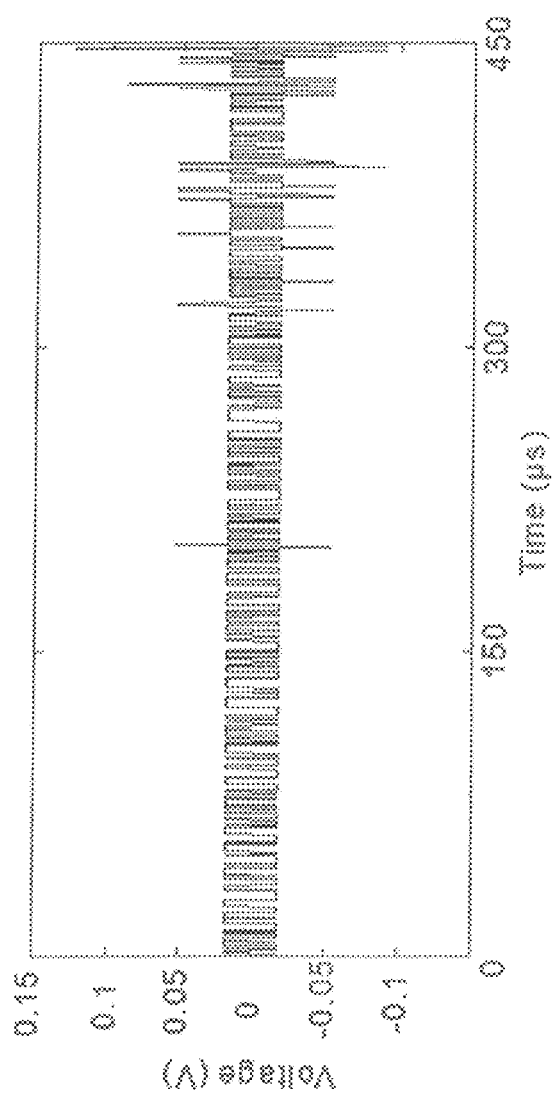
FIG. 30 shows a further inverted signal in 3-bit resolution.
Figure 31:
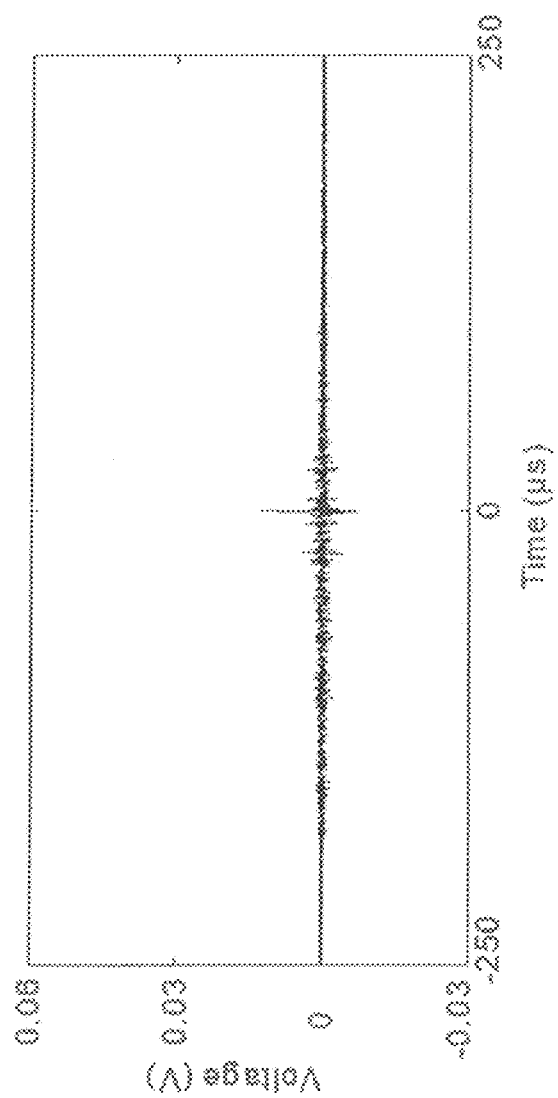
FIG. 31 shows a response of the signal of FIG. 30.
Figure 22:
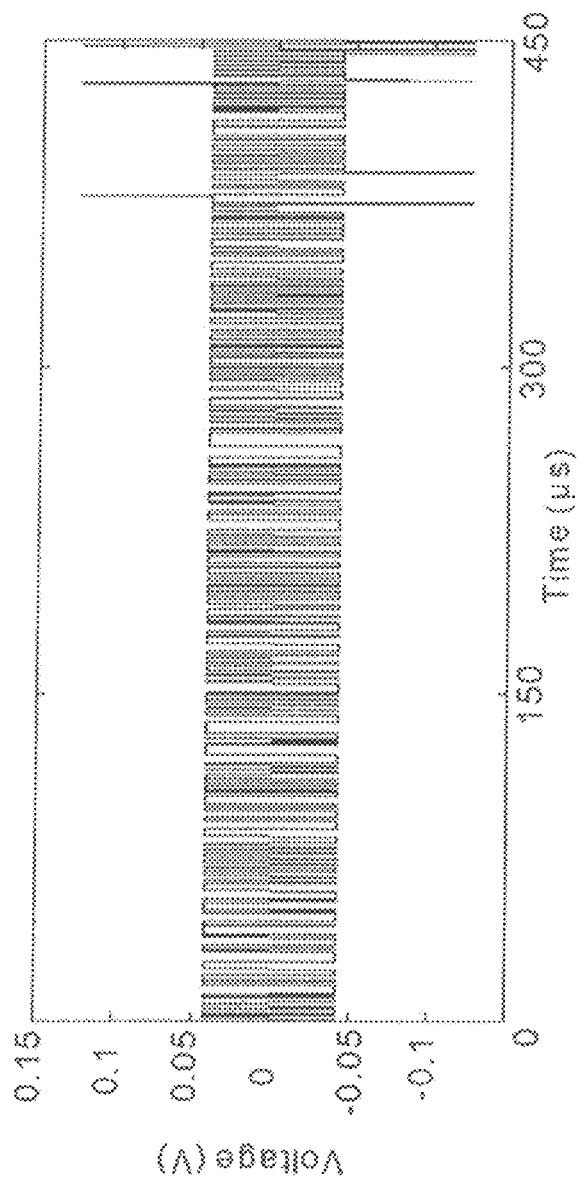
Figure 23:
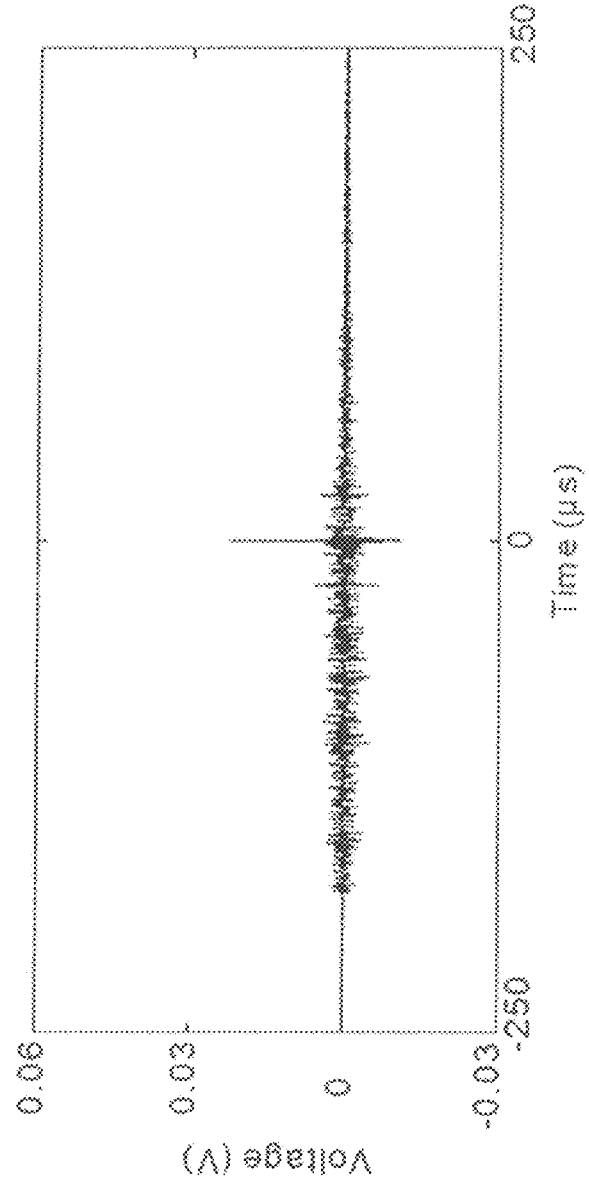
Figure 34:
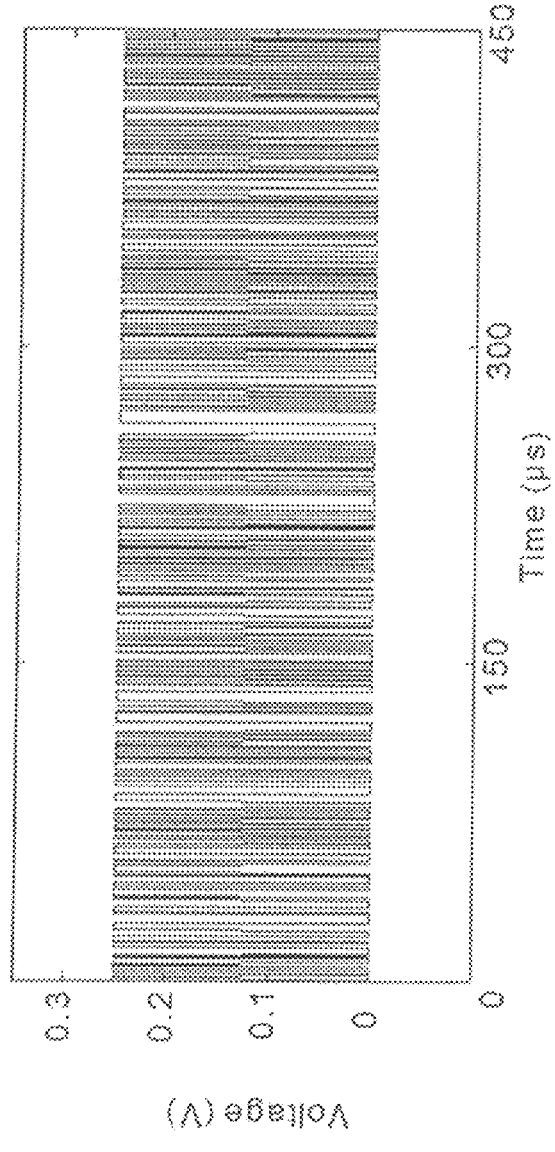
FIG. 34 shows a further inverted signal in 1-bit resolution.
Figure 35:
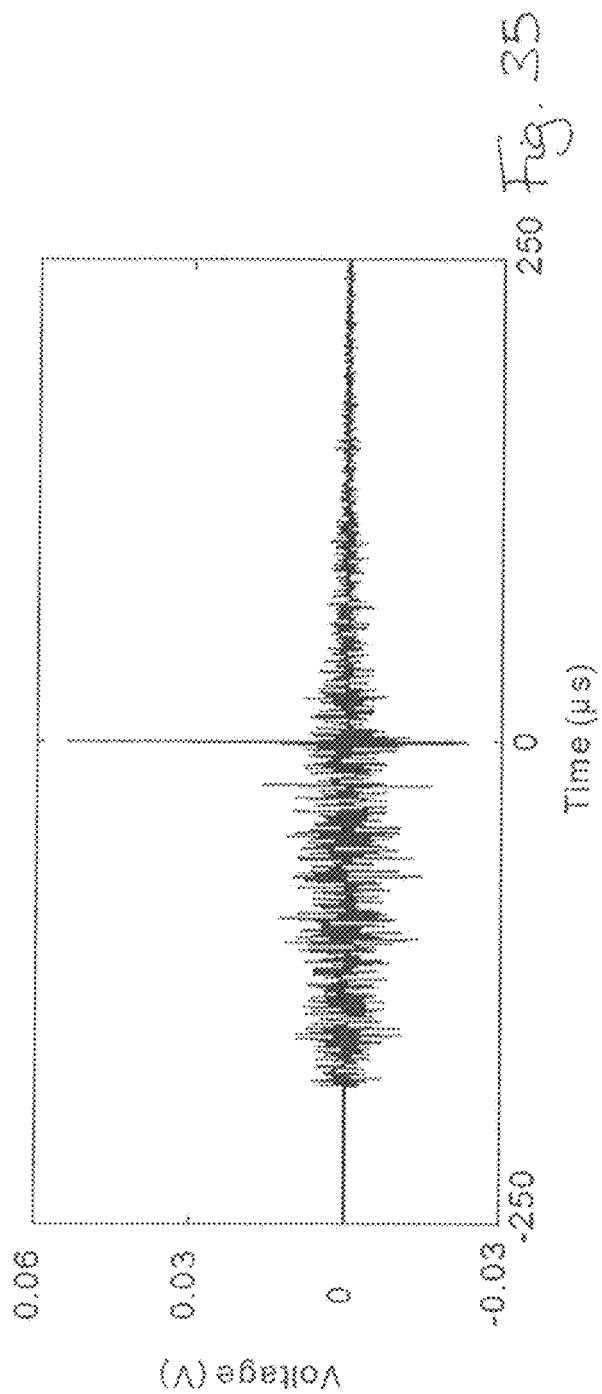
FIG. 35 shows a response of the signal of FIG. 34.

In the following description, details are provided to describe the embodiments of the present specification. It shall be apparent to one skilled in the art, however, that the embodiments may be practised without such details.

FIG. 1 shows a first flow meter arrangement 10. In the flow meter arrangement, a first piezoelectric element 11 is placed at an outer wall of a pipe 12, which is also referred as a tube 12. A second piezoelectric element 13 is placed at an opposite side of the pipe 12 such that a direct line between the second piezoeloelectric element 11 and the downstream piezoelectric element 13 is oriented at an angle β to the direction 14 of average flow, which is at the same time also the direction of the pipe's 12 symmetry axis. The angle β is chosen to be approximately 45 degrees in the example of FIG. 1 but it may also be steeper, such as for example 60 degrees, or shallower, such as for example 30 degrees.

A piezoelectric element, such as the piezoelectric elements 11, 13 of FIG. 1 may in general be operated as an acoustic transmitter and as an acoustic sensor. An acoustic transmitter and an acoustic sensor may be provided by the same piezoelectric element or by different regions of the same piezoelectric element. In this case, a piezoelectric element or transducer is also referred to as piezoelectric transmitter when it is operated as transmitter or sound source and it is also referred to as acoustic sensor or receiver when it is operated as acoustic sensor.

When a flow direction is as shown in FIG. 1, the first piezoelectric element 11 is also referred to as "upstream" piezoelectric element and the second piezoelectric element 13 is also referred to as "downstream" piezoelectric element. A flow meter according to the present specification works for both directions of flow in essentially the same way and the flow direction of FIG. 1 is only provided by way of example.

FIG. 1 shows a flow of electric signals of FIG. 1 for a configuration in which the upstream piezoelectric element 11 is operated as a piezoelectric transducer and the downstream piezoelectric element 13 is operated as an acoustic sensor. For the purpose of clarity, the application works upstream and downstream, i.e. the position of the piezoelectric elements can be interchanged.

A first computation unit 15 is connected to the upstream piezoelectric element 11 and a second computation unit 16 is connected to the downstream piezoelectric element 13. The first computation unit 15 comprises a first digital signal processor, a first digital analog converter (DAC) and a first analog digital converter (ADC). Likewise, the second computation unit 16 comprises a second digital signal processor, a second digital analog converter (DAC) and a second analog digital converter (ADC). The first computation unit 15 is connected to the second computation unit 16.

The arrangement with two computation units 15, 16 shown in FIG. 1 is only provided by way of example. Other embodiments may have different numbers and arrangements of computation units. For example, there may be only one central computation unit or there may be two AD/DC converters and one central computation unit, or there may be two small-scale computation units at the transducers and one larger central computation unit.

A computation unit or computation units can be provided by microcontrollers or application specific integrated circuits (ASICs), ACIDs or field programmable gate arrays (FPGAs), for example. Specifically, the synthesis of an electrical signal from a stored digital signal may be provided by a direct digital synthesizer (DDS), which comprises a digital to analog converter (DA, DAC).

A method for generating a measuring signal according to the present specification comprises the following steps.

A pre-determined digital test signal is generated by synthesizing an acoustic signal with the digital signal processor of the first computation unit 15. The digital test signal is sent from the first computation unit 15 to the piezoelectric transducer 11 along signal path 17. The piezoelectric transducer 11 generates a corresponding ultrasound test signal. Units 15 and 16 can also be provided in one single unit.

The test signal is provided as a short pulse, for example by a single 1 MHz oscillation or by 10 such oscillations. In particular, the test signal may be provided by a small number of oscillations with constant amplitude, thereby approximating a rectangular signal. The oscillation or the oscillations may have a sinusoidal shape, a triangular shape, a rectangular shape or also other shapes.

The ultrasound test signal travels through the liquid in the pipe 12 to the piezoelectric sensor 13. In FIG. 1, a direct signal path of the ultrasound signal is indicated by an arrow 18. Likewise, a direct signal path of the ultrasound signal in the reverse direction is indicated by an arrow 19. A response signal is picked up by the piezoelectric sensor 13, sent to the second computation unit 16 along signal path 20, and digitized by the second computation unit 16.

In a further step, a digital measuring signal is derived from the digitized response signal. The derivation of the measurement a reversal of the digitized response signal with respect to time. According to further embodiments, the derivation comprises further steps such as a conversion to a reduced resolution in the amplitude range, a bandwidth filtering of the signal to remove noise, such as low frequency noise and high frequency noise. In particular, the step of bandwidth filtering may be executed before the step of reversing the signal with respect to time.

The signal reversal may be carried out in various ways, for example by reading out a memory area in reverse direction or by reversing the sign of sinus components in a Fourier representation.

In one embodiment, a suitable portion of the digitized response signal is selected that contains the response from the direct signal. The portion of the response signal is then turned around, or inverted, with respect to time. In other words, signal portions of the response signal that are received later are sent out earlier in the inverted measuring signal. If a signal is represented by a time ordered sequence of amplitude samples, by way of example, the abovementioned signal inversion amounts to inverting or reversing the order of the amplitude samples.

The resulting signal, in which the direction, or the sign, of time has been inverted, is also referred to as an "inverted signal". The expression "inverted" in this context refers to an inversion with respect to the direction of time, and not to an inversion with respect to a value, such as the amplitude value.

FIGS. 10 to 19 show, by way of example digital signals according to the present specification.

In a flow meter according to one embodiment of the present specification, the same measuring signal is used for both directions 18, 19, the downstream and the upstream direction, providing a simple and efficient arrangement. According to other embodiments, different measuring signals are used for both directions. In particular, the measuring signal may be applied to the original receiver of the test signal. Such arrangements may provide benefits for asymmetric conditions and pipe shapes.

A method of measuring a flow speed of a liquid through a pipe, which uses the abovementioned inverted signal as a measuring signal, comprises the following steps.

The abovementioned measuring signal is sent from the first computation unit 15 to the piezoelectric transducer 11 along signal path 17. The piezoelectric transducer 11 generates a corresponding ultrasound measuring signal. Examples for such a measuring signal are provided in FIGS. 10, 12, 14, 16, 18, 20, 22, 24, 26, 28, 30, 32, 34, 37 and 38.

The ultrasound measuring signal travels through the liquid in the pipe 12 to the piezoelectric sensor 13. A response signal is picked up by the piezoelectric sensor 13, sent to the second computation unit 16 along signal path 20, and digitized by the second computation unit 16.

The second computation unit 16 sends the digitized response signal to the first computation unit 15. The first computation unit 15 determines a time of flight of the received signal, for example by using one of the methods described further below.

A similar process is carried out for a signal travelling in the reverse direction 19, namely the abovementioned measuring signal is applied to the downstream piezoelectric element 13 and a response signal is measured by the upstream piezoelectric element 11 to obtain an upstream time of flight TOF_up in the reverse direction 19. The first computation unit 15 determines a velocity of flow, for example according to the formula $$v = \frac{c^2}{2 \cdot L \cdot \cos\beta} \cdot (TOF_{up} - TOF_{down}),$$

wherein L is the length of the direct path between the piezoelectric elements 11, 13, β is the angle of inclination of the direct path between the piezoelectric elements 11, 13 and the direction of the average flow, and c is the velocity of sound in the liquid under the given pressure and temperature conditions.

The squared velocity of sound c^2 can be approximated to second order by the expression $$c^2 \approx \frac{L^2}{TOF_{up} * TOF_{down}}$$

which leads to the formula $$v = \frac{L}{2*\cos\beta} \cdot \frac{TOF_{up} - TOF_{down}}{TOF_{up} * TOF_{down}}$$

Thereby, it is not necessary to determine temperature or pressure, which in turn determine the fluid density and the sound velocity, or to measure the sound velocity or the fluid density directly. By contrast, the first order of the error does not cancel out for only one measurement direction.

Instead of using a factor 2·L·cos β, a proportionality constant can be derived from a calibration measurement with a known flow speed. The proportionality constant of the calibration takes into account further effects such as flow profiles and contributions from sound waves that were scattered and did not travel along a straight line.

According to a further embodiment, the process of generating an impulse signal, recording a response signal and deriving an inverted measuring signal from the response signal is simulated in a computer. Relevant parameters, such as the pipe diameter of the pipe 12 and the sensor placements are provided as input parameters to the simulation.

According to yet another embodiment, the measuring signal, which is to be supplied to a transmitting piezoelectric element, is synthesized using a shape of a typical response signal to an impulse signal, such as the signal shapes shown in FIGS. 37 and 38. For example, the measuring signal may be provided by a 1 MHz sinusoidal oscillation, which is amplitude modulated with an envelope according to a Gaussian probability function having a half width of 10 microseconds. The half-width may be chosen as an input parameter, which depends on the actual arrangement, such as the pipe diameter and the sensor placement.

A flow meter according to the present specification may also be provided as a pre-defined flow meter in which the measuring signal is generated during a test run at a factory site, in particular when the flow meter is supplied together with a pipe section.

According to a simple embodiment of the present specification, a time of flight in upstream and in downstream direction is determined by evaluating a time of a peak amplitude of a received signal with respect to a sending time of the measuring signal. To achieve a higher precision, the maximum may be determined using an envelope of the received signal. According to a further embodiment, the measurement is repeated multiple times and an average time of flight is used.

According to a further embodiment of the present specification, the time of flight of a signal is evaluated using a cross-correlation technique. In particular, the respective time shifts can be evaluated by cross-correlating the received downstream or upstream signal with the received signal at zero flow speed according to the formula:

$$CCorr(\tau) = \sum_{t=-\infty}^{\infty} Sig_{Flow}(t) \cdot Sig_{NoFlow}(t+\tau),$$

wherein Sig_Flow represents an upstream or downstream signal under measurement conditions, when there is a fluid flow through the pipe, and wherein Sig_NoFlow represents a signal under calibration conditions at zero flow. The infinite sum limits represent a sufficiently large time window [−T1, +T2]. In more general words, −T1 and +T2 do not need to be same and for practical reasons this can be advantageous for the flow meter.

The time shift TOF_up–TOF_down is then obtained by comparing the time of the maximum of the upstream correlation function with the time of the maximum of the downstream correlation function. The envelope of the correlation function may be used to determine the location of the maximum more accurately.

In a further embodiment, a separate evaluation unit is provided between the first computation unit 15 and the second computation unit 16, which performs the calculation of the signal arrival times and the flow speed.

In general, the measured signal of the acoustic sensor results from a superposition of scattered signals and a direct signal. The scattered signals are scattered from the walls of the pipe once or multiple times. This is shown, by way of example, in FIGS. 2 and 3.

The transducer configuration of FIG. 1 is a direct-line or "Z" configuration. Other arrangements, which make use of reflections on an opposite side of the pipe, are possible as well, such as the "V" and the "W" configuration. V and W configuration work based on reflections on the pipe wall which induce more scatterings than the Z configuration. The subject matter of the application will benefit from these configurations as long as the paths are understood properly.

In a V-configuration, the two transducers are mounted on the same side of the pipe. For recording a 45 degree reflection they are placed about a pipe diameter apart in the direction of the flow. The W-configuration makes use of three reflections. Similar to the V-configuration, the two transducers are mounted on the same side of the pipe. For recording a signal after two 45 degree reflections they are placed two pipe diameters apart in the direction of the flow.

Figure 45:
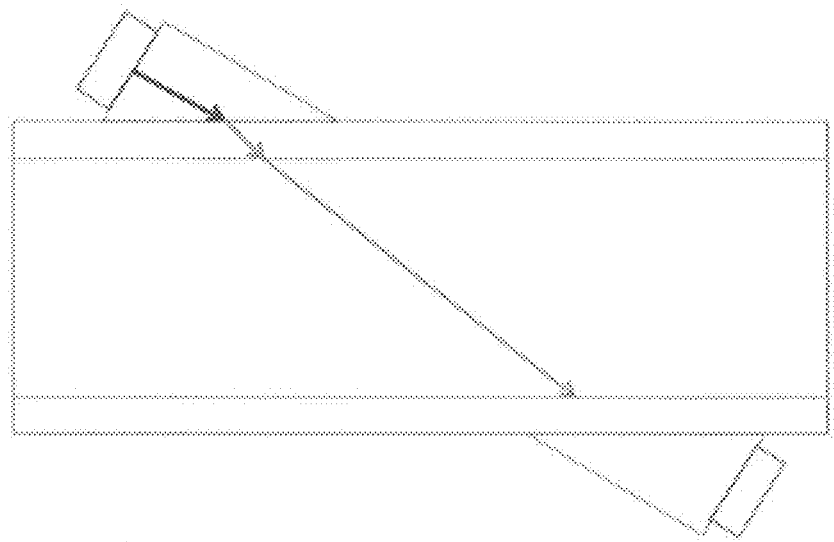
FIG. 45 shows a Z-configuration of clamp-on transducers.
Figure 46:
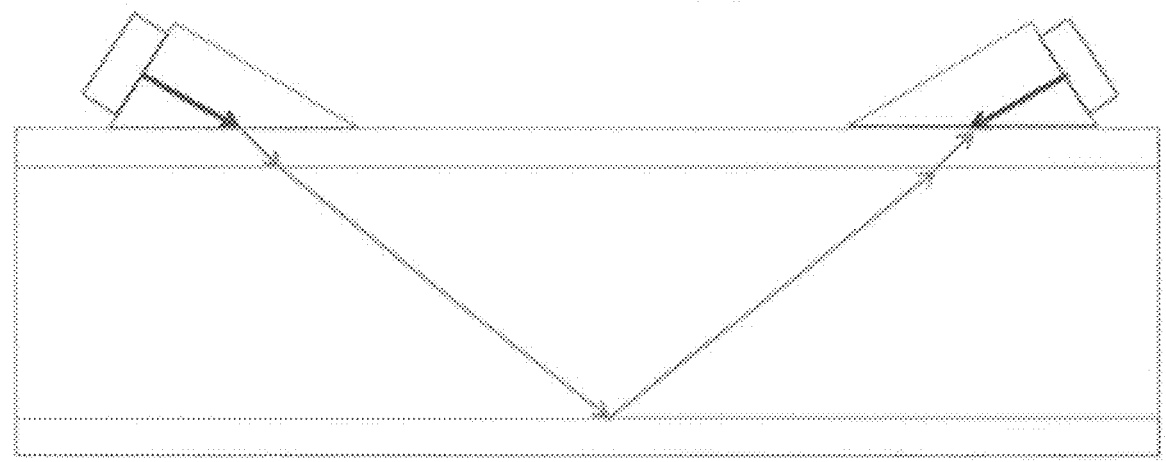
FIG. 46 shows a V-configuration of clamp-on transducers.
Figure 47:
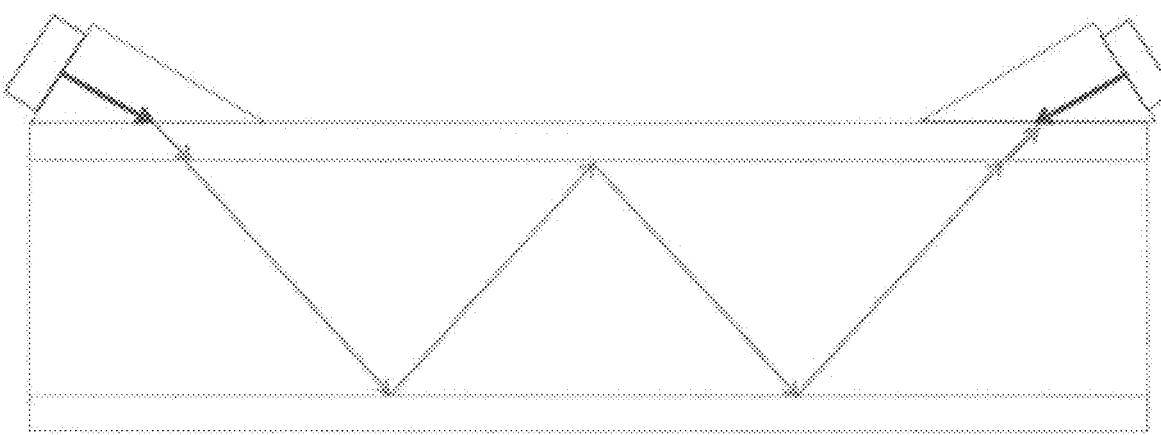
FIG. 47 shows a W-configuration of clamp-on transducers.

FIG. 2 shows, by way of example a first acoustic signal which travels directly from the piezoelectric element 11 to the piezoelectric element 13, For simplicity, the scattering events are shown as reflections in FIGS. 2 to 5 but the actual scattering process can be more complicated. In particular, the most relevant scattering occurs typically on the pipe wall or at material that is mounted in front of the piezoelectric transducers. The received scattering also depends on the sensor arrangement. By way of example, FIGS. 45, 46, and 47 show Z, V, and W sensor arrangements. FIG. 3 shows a view of FIG. 2 in flow direction in the viewing direction A-A.

FIGS. 4 and 5 show a second sensor arrangement in which a further piezoelectric element 22 is positioned at a 45 degree angle to the piezoelectric element 11 and a further piezoelectric element 23 is positioned at a 45 degree angle to the piezoelectric element 13.

Furthermore, FIGS. 4 and 5 show direct, or straight line, acoustic signal paths for a situation in which the piezoelectric elements 11, 22 are operated as piezo transducers and the piezoelectric elements 13, 23 are operated as acoustic sensors. Piezoelectric element 23, which is on the back of the pipe 12 in the view of FIG. 4 is shown by a dashed line in FIG. 4.

FIGS. 6 to 9 show, in a simplified way, a method of generating a measuring signal from a response of a test signal. In FIGS. 6 to 9, losses due to scattering are indicated by hatched portions of a signal and by arrows.

For the considerations of FIGS. 6 to 9 it is assumed that the acoustic signal only propagates along a straight line path, along a first scattering channel with a time delay of Δt, and along a second scattering channel with a time delay of 2Δt. Signal attenuation along the paths is not considered.

A test signal in the form of a rectangular spike is applied to the piezoelectric element 11. Due to scattering, a first portion of the signal amplitude is lost due to the first scattering path and appears after a time Δt, and a second portion of the signal amplitude is lost due to the second scattering path and appears after a time 2Δt. This yields a signal according to the white columns in FIG. 7, which is recorded at the piezoelectric element 13.

A signal processor inverts this recorded signal with respect to time and it applies the inverted signal to the piezoelectric element 11. The same scattering process as explained before now applies to all three signal components. As a result, a signal according to FIG. 9 is recorded at the piezoelectric element 13, which is approximately symmetric.

In reality, the received signals will be distributed over time and there often is a "surface wave" which has travelled through material of the pipe and arrives before the direct signal. This surface wave is discarded by choosing a suitable time window for generating the inverted measuring signal. Likewise, signals that stem from multiple reflections and arrive late can be discarded by limiting the time window and/or by choosing specific parts of the signal.

The following table shows measured time delays for a direct alignment, or, in other words, for a straight line connection between clamped-on piezoelectric elements on a DN 250 pipe in a plane perpendicular to the longitudinal extension of the DN 250 pipe. The flow rate refers to a flow of water through the DN 250 pipe.

Figure 36:
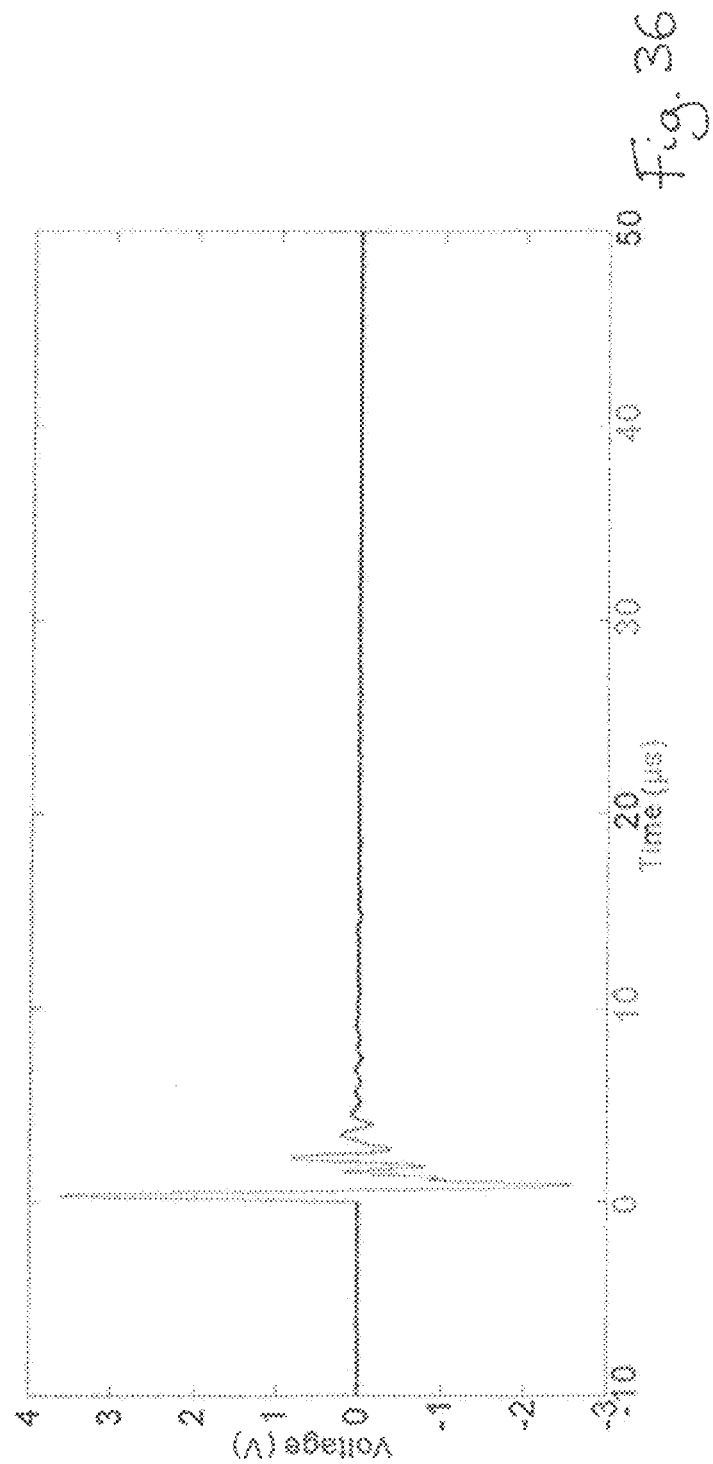
FIG. 36 shows a short impulse at a piezoelectric element of the flow meter of FIG. 1.

Herein "TOF 1 cycle" refers to an impulse such as the one shown in FIG. 36, that is generated by a piezoelectric element, which is excited by an electric signal with 1 oscillation having a 1 μs period. "TOF 10 cycle" refers to a signal that is generated by a piezoelectric element, which is excited by an electric signal with 10 sinusoidal oscillations of constant amplitude having a 1 μs period.

| Flowrate/Method | 21 m³/h | 44 m³/h | 61 m³/h |
| --- | --- | --- | --- |
| TOF 1 cycle | 7 ns | 18 ns | 27 ns |
| TOF 10 cycle | 9 ns | 19 ns | 26 ns |
| Time reversal | 8 ns | 18 ns | 27 ns |

FIGS. 10-27 show high resolution inverted signals and their respective response signals. The voltage is plotted in arbitrary units over the time in microseconds.

The time axes in the upper Figures show a transmitting time of the inverted signal. The transmitting time is limited to the time window that is used to record the inverted signal. In the example of FIGS. 10-27 the time window starts shortly before the onset of the maximum, which comes from the direct signal and ends 100 microseconds thereafter.

The time axes in the lower Figures are centered around the maximum of the response signals and extend 100 microseconds, which is the size of the time window for the inverted signal, before and after the maximum of the response signals.

FIGS. 28-35 show digitized inverted signals in a high resolution and in 12, 3, 2 and 1 bit resolution in the amplitude range and their respective response signals. The voltage is plotted in Volt over the time in microseconds. The signals of FIG. 28-35 were obtained for a water filled DN 250 pipe.

The length of the time window for the inverted signal is 450 microseconds. Hence, the time window of FIGS. 28-35 is more than four times larger than in the preceding FIGS. 90-27.

In FIGS. 28-35 it can be seen that even a digitization with 1 bit resolution produces a sharp spike. It can be seen that the spike becomes even more pronounced for the lower resolutions. A possible explanation for this effect is that in the example of FIGS. 28-35 the total energy of the input signal is increased by using a coarser digitization in the amplitude range while the response signal remains concentrated in time.

FIG. 36 shows a signal that is generated by a piezoelectric element after receiving an electric pulse that lasts for about 0.56 microseconds, which is equivalent to a frequency of 3.57 MHz. Due to the inertia of the piezoelectric element, the maximum amplitude for the negative voltage is smaller than for the positive voltage and there are multiple reverberations before the piezoelectric element comes to rest.

FIG. 37 shows an electric signal that is applied to a piezoelectric element, such as the upstream piezoelectric element 11 of FIG. 1. The signal of FIG. 37 is derived by forming an average of ten digitized response signals to a signal of the type shown in FIG. 36 and time reversing the signal, wherein the response signals are received by a piezoelectric element such as the downstream piezoelectric element 13 of FIG. 1.

In the example of FIG. 37, the digitized signals are obtained by cutting out a signal portion from the response signal that begins approximately 10 microseconds before the onset of envelope of the response signal and that ends approximately 55 microseconds behind the envelope of the response signal. The envelope shape of the response signal of FIG. 37 is similar to the shape of a Gaussian probability distribution, or, in other words, to a suitable shifted and scaled version of $\exp(-x^2)$.

FIG. 38 shows a portion of a response signal to the signal shown in FIG. 37, wherein the signal of FIG. 37 is applied to a first piezoelectric element, such as the upstream piezoelectric element 11, and received at a second piezoelectric element, such as the downstream piezoelectric element 13 of FIG. 1.

Figure 39:
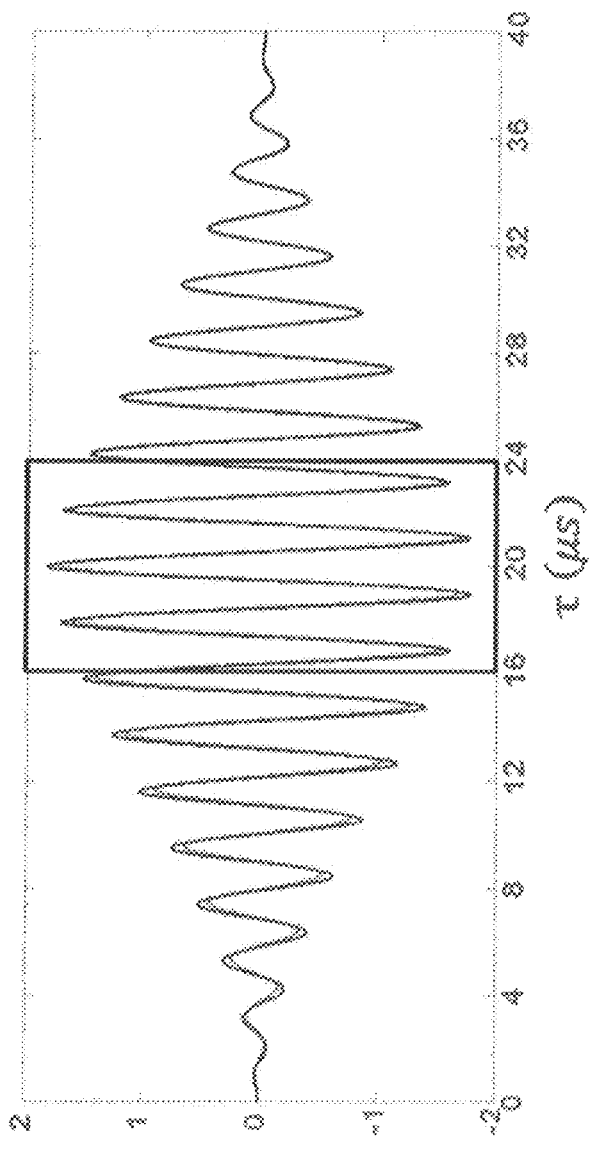
FIG. 39 shows an upstream and a downstream cross correlation function.

FIG. 39 shows a an upstream cross correlation function and a downstream cross correlation function, which are obtained by cross correlating the upstream signal and the downstream signal of the arrangement of FIG. 1 with a signal obtained at zero flow, respectively.

Figure 40:
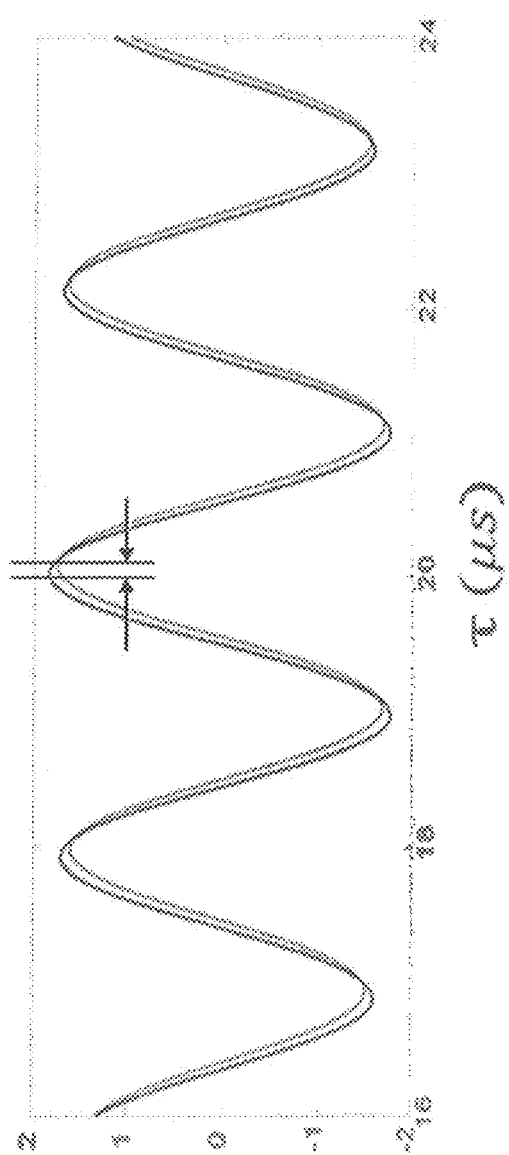
FIG. 40 shows a sectional enlargement of FIG. 39.

FIG. 40 shows a sectional enlargement of FIG. 39. Two position markers indicate the positions of the respective maxima of the upstream and downstream cross correlation function. The time difference between the maxima is a measure for the time difference between the upstream and the downstream signal.

Figure 48:
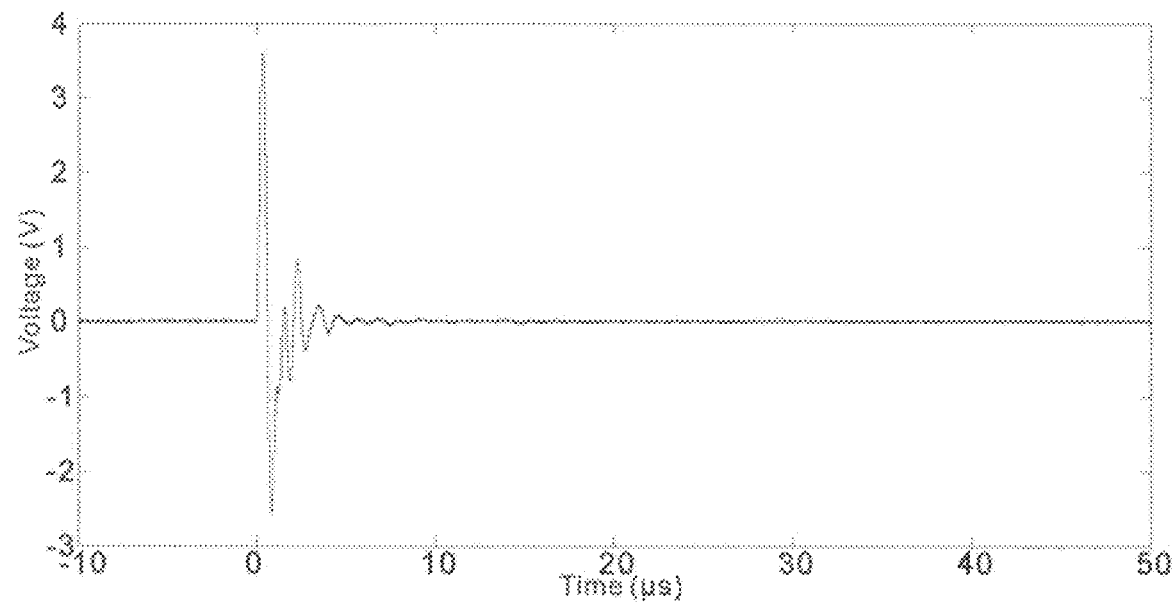
FIG. 48 shows a one-cycle sending signal.
Figure 49:
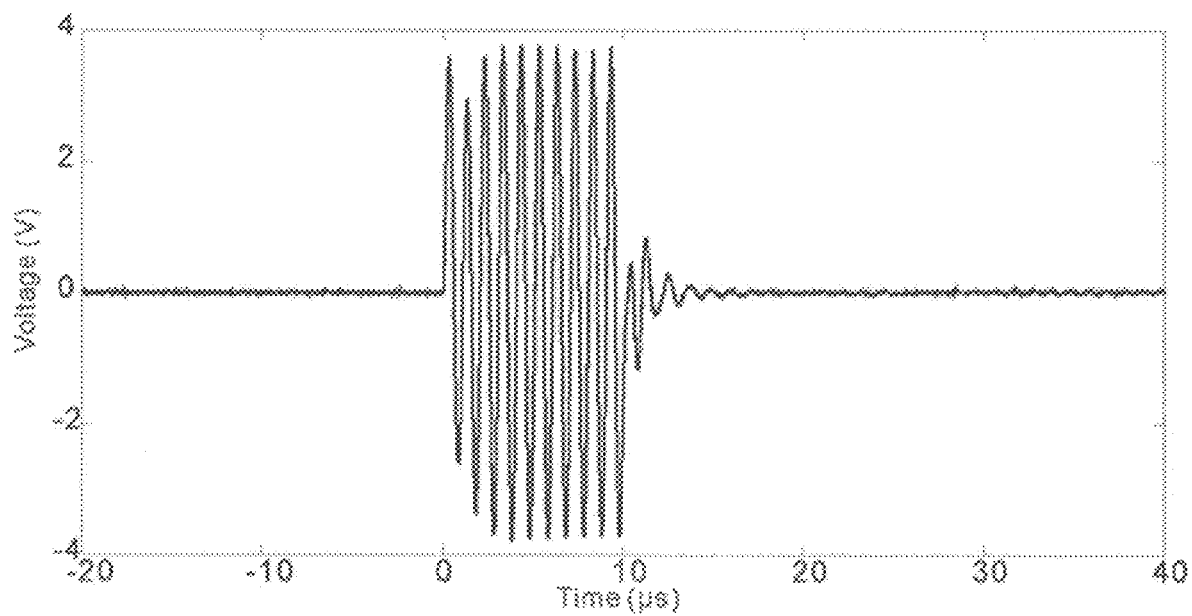
FIG. 49 shows a ten cycle sending signal.
Figure 50:
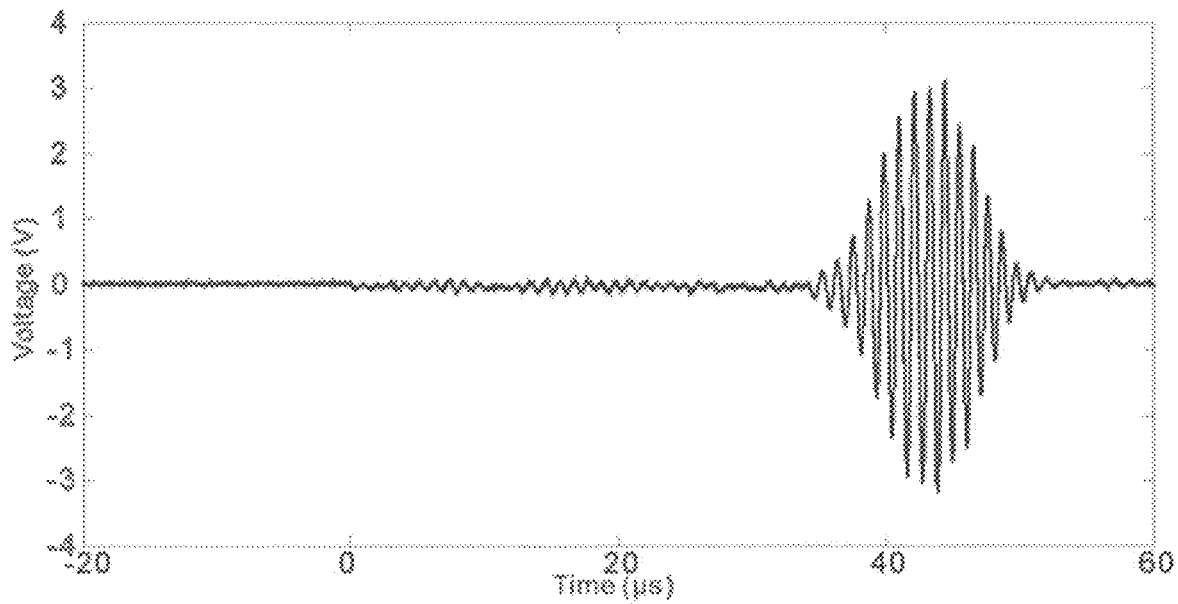
FIG. 50 shows a TRA sending signal.

FIGS. 48, 49 and 50 show three different sending signals: FIG. 48 shows a conventional pulse (1 cycle) and FIG. 48 shows a 10 cycles pulse compared to the measuring signal generated by as described above, such as the signal of FIG. 50. The transducers have been clamped onto a DN250 pipe.

Figure 51:
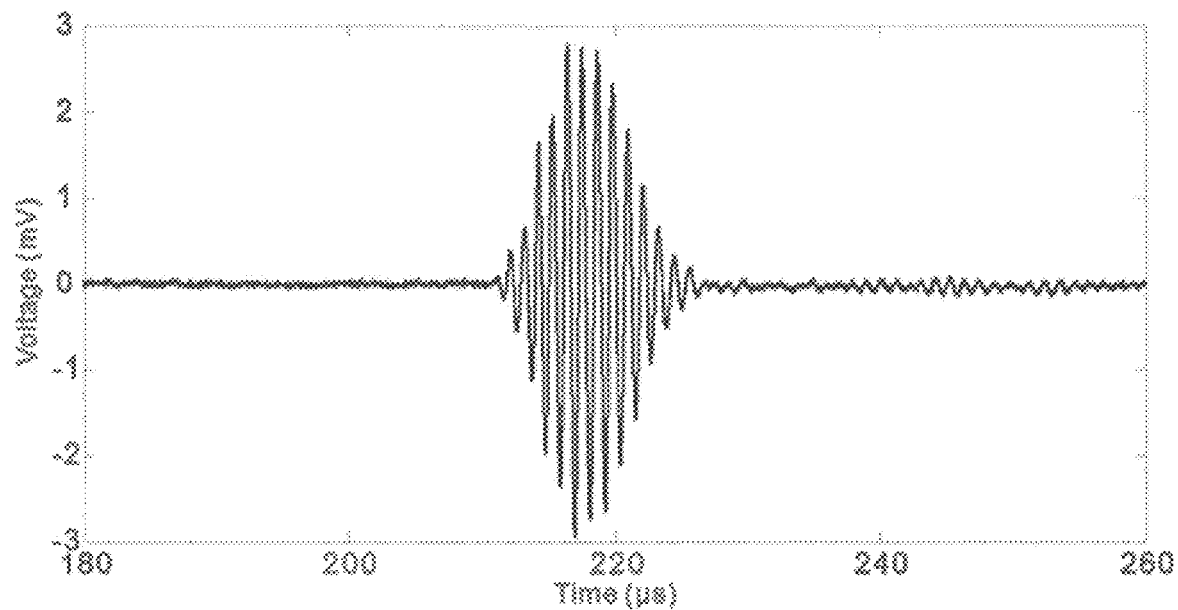
FIG. 51 shows a response signal to the one-cycle sending signal of FIG. 48.
Figure 52:
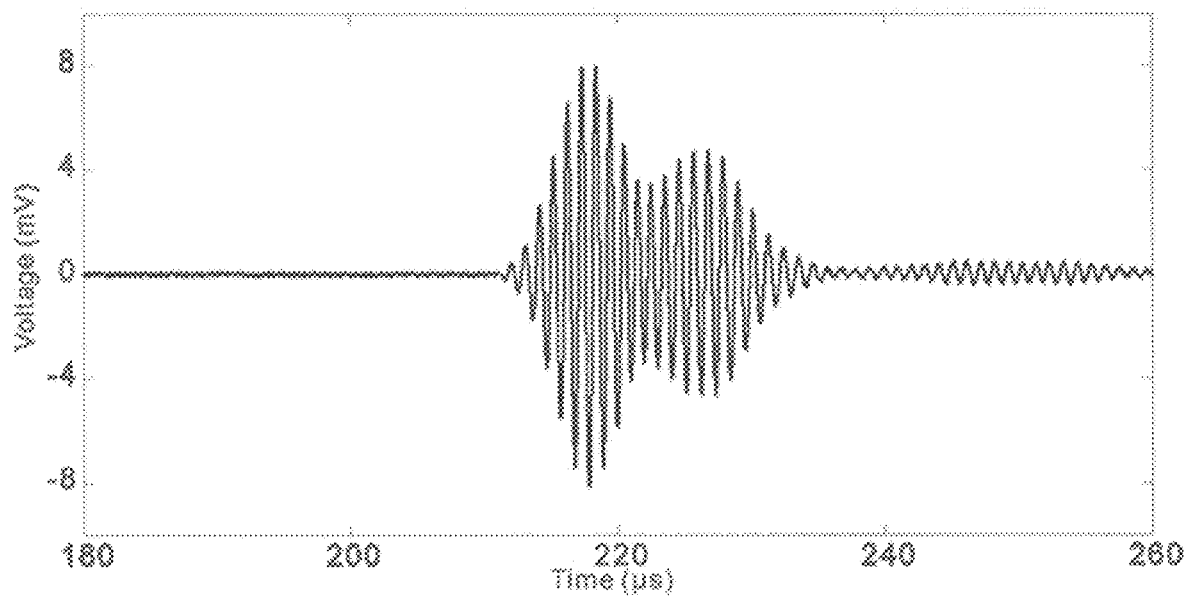
FIG. 52 shows a response signal to the ten cycle sending signal of FIG. 49.
Figure 53:
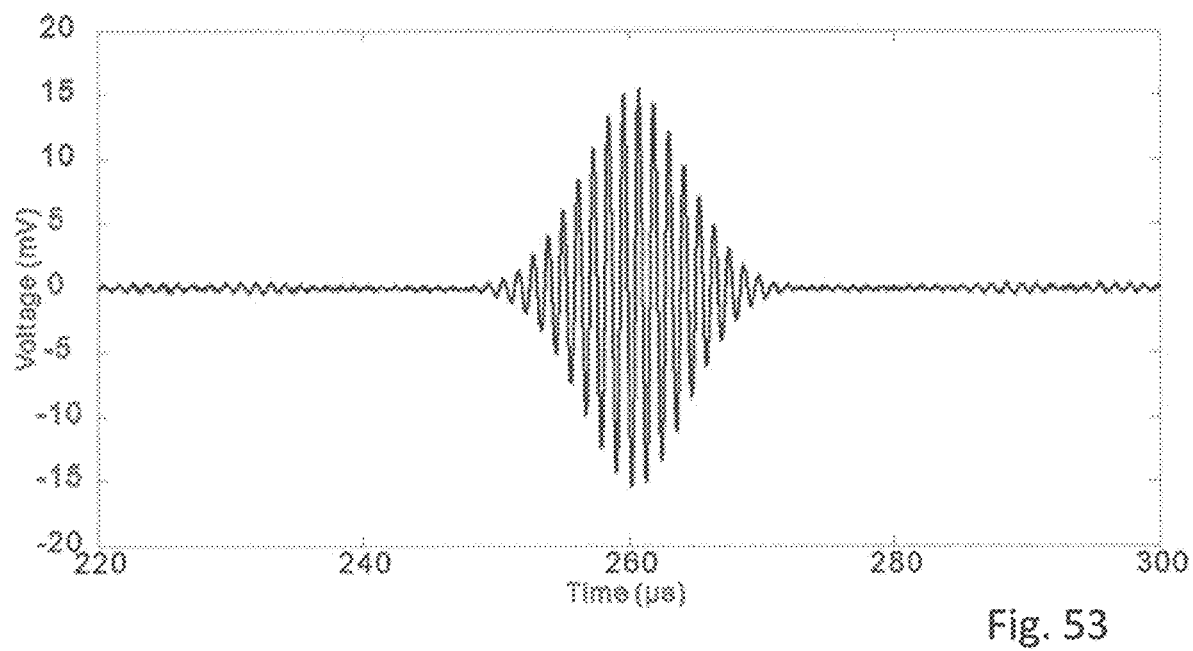
FIG. 53 shows a response signal to the TRA sending signal of FIG. 50.
Figure 59:
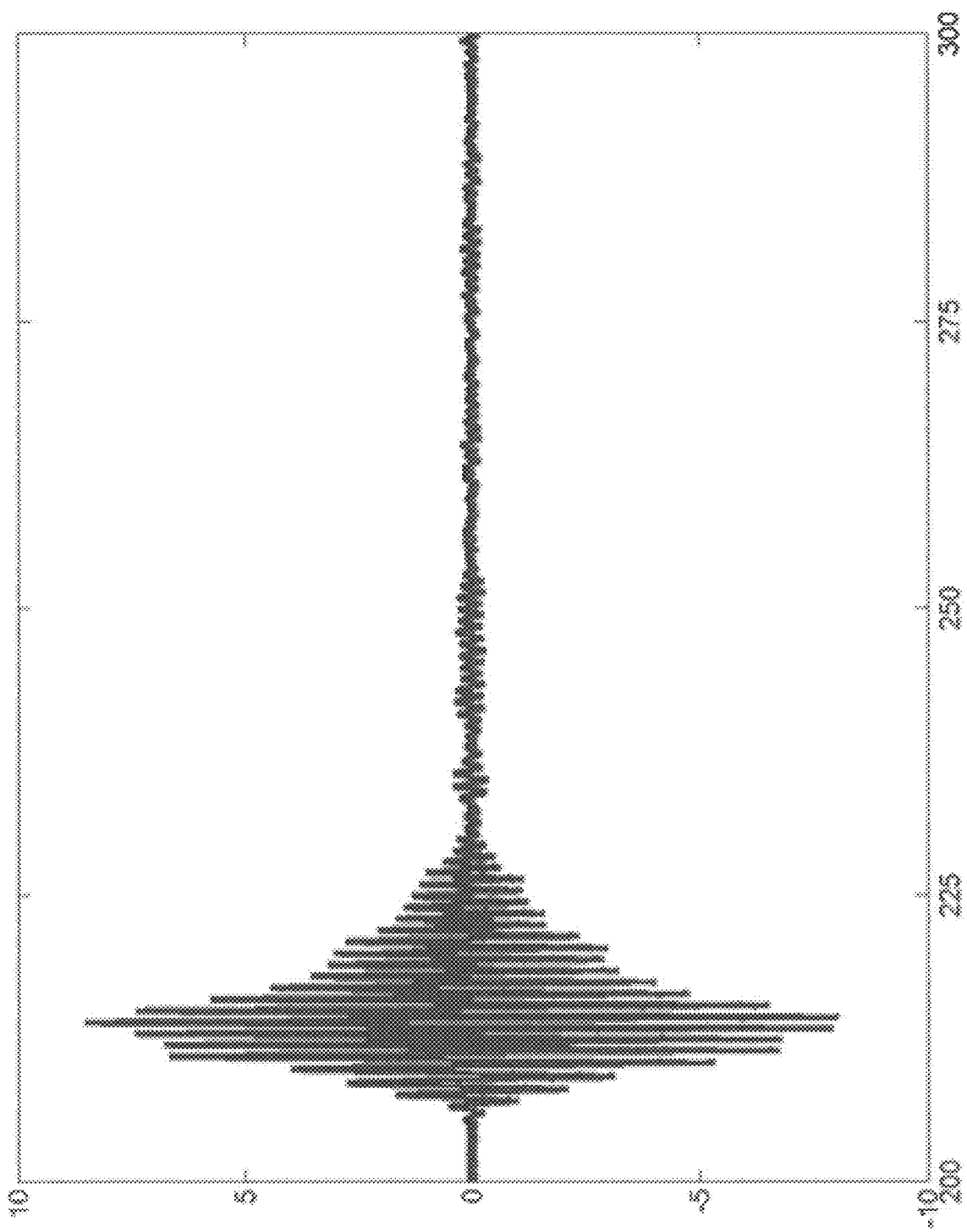
FIG. 59 shows a further response signal.

FIGS. 51, 52 and 53 show the corresponding received signals after sending the signals of illustrated in the respective FIGS. 48, 59 and 50. By comparison it can be easily seen that measuring signal focus the energy and generates a more than two times larger amplitude of the receiving signal compared to the receiving signals in response to the conventional pulses (e.g. 1 or 10 cycles) of FIGS. 48 and 49.

Figure 41:
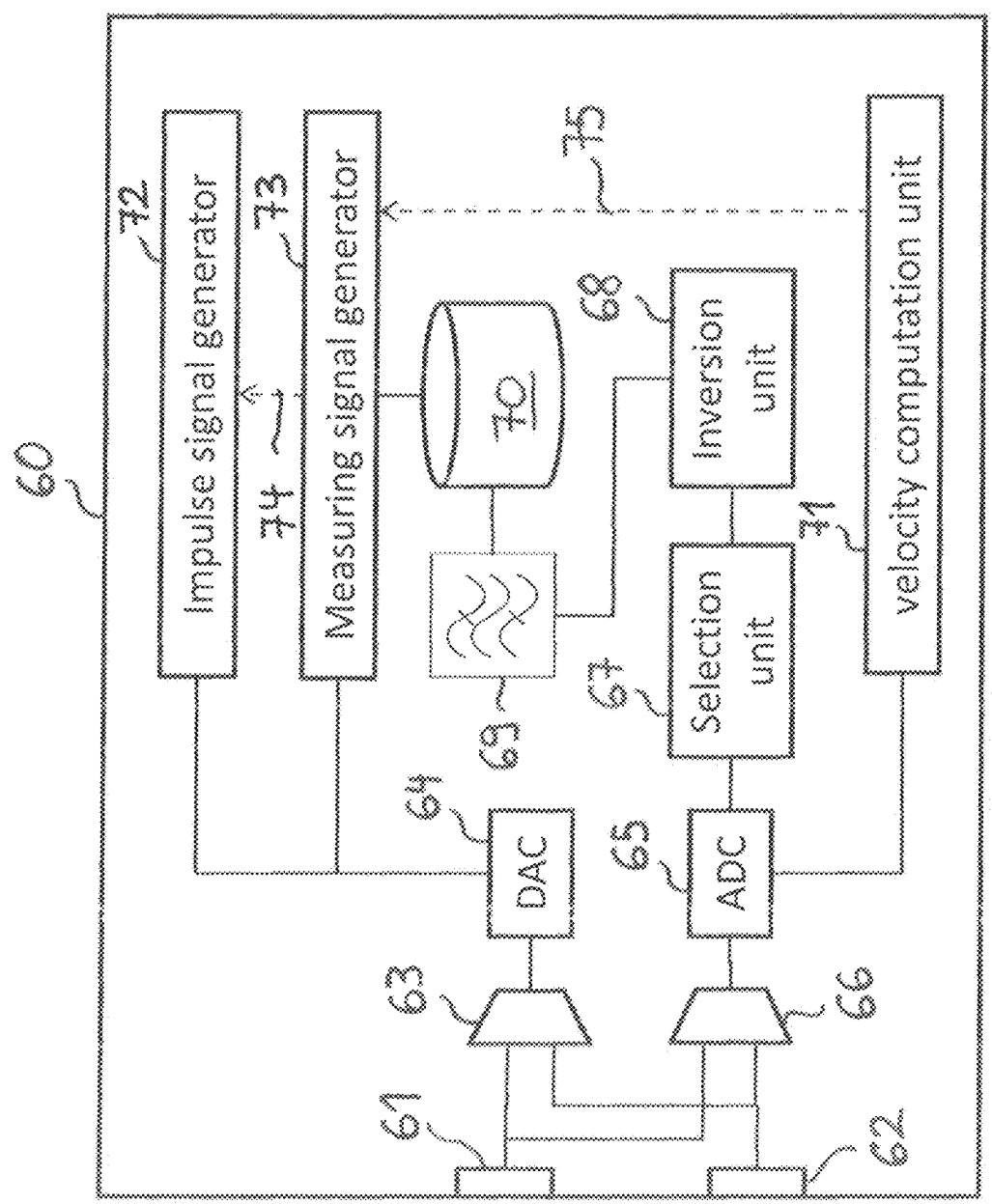
FIG. 41 shows a schematic diagram of a device for measuring a flow speed according to the present specification.

FIG. 41 shows, by way of example, a flow measurement device 60 for measuring a flow in the arrangement in FIG. 1 or other arrangements according to the specification. In the arrangement of FIG. 1, the flow measurement device 60 is provided by the first and second computation units 15, 16.

The flow measurement device 60 comprises a first connector 61 for connecting a first piezoelectric transducer and a second connector 62 for connecting a second piezoelectric transducer. The first connector 61 is connected to a digital to analog converter (DAC) 64 over a multiplexer 63. The second connector 62 is connected to an analog to digital converter 65 over a demultiplexer 66.

The ADC 65 is connected to a signal selection unit 67, which is connected to a signal inversion unit 68, which is connected to a band pass filter 69, which is connected to a computer readable memory 70. Furthermore, the ADC 65 is connected to a velocity computation unit 71.

The DAC 64 is connected to an impulse signal generator 72 and a measuring signal generator 73. The measuring signal generator is connected to the impulse generator 72 over a command line 74. The velocity computation unit 71 is connected to the measuring signal generator 73 via a second command line 75.

In general, the impulse signal generator 72 and the measuring signal generator comprise hardware elements, such as an oscillator, and software elements, such as an impulse generator module and a measuring signal generator module. In this case, the command lines 74, 75 may be provided by software interfaces between respective modules.

During a signal generating phase, the impulse signal generator sends a signal to the DAC 64, the selection unit 67 receives a corresponding incoming signal over the ADC 65 and selects a portion of an incoming signal. The inversion unit 68 inverts the selected signal portion with respect to time, the optional bandpass filter 69 filters out lower and upper frequencies and the resulting measuring signal is stored in the computer memory 70. When the word "signal" is used with reference to a signal manipulation step, it may in particular refer to a representation of a signal in a computer memory.

In particular, a signal representation can be defined by value pairs of digitized amplitudes and associated discrete times. Other representations comprise, among others, Fourier coefficients, wavelet coefficients and an envelope for amplitude modulating a signal.

Figure 42:
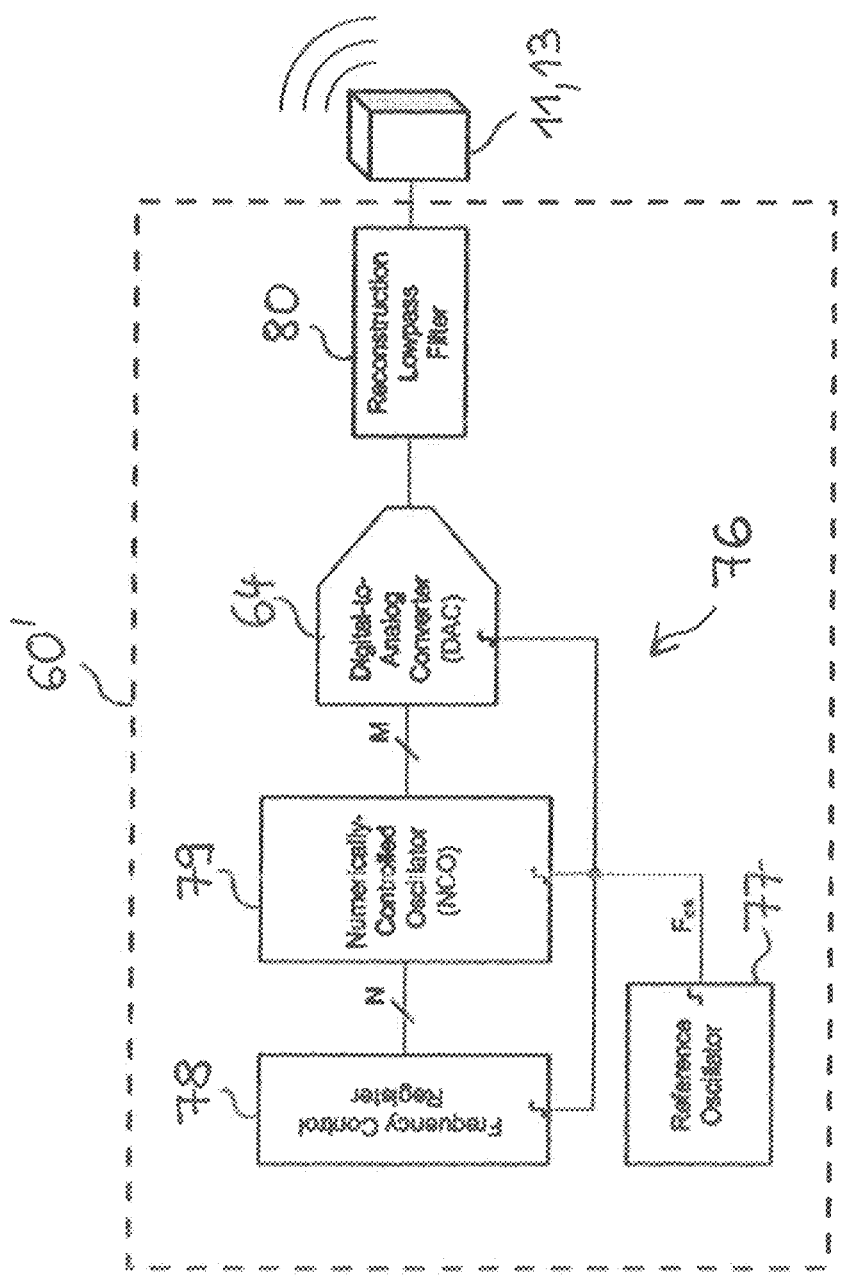
FIG. 42 shows a schematic diagram of a direct digital synthesizer for use in the device of FIG. 41.
Figure 43:
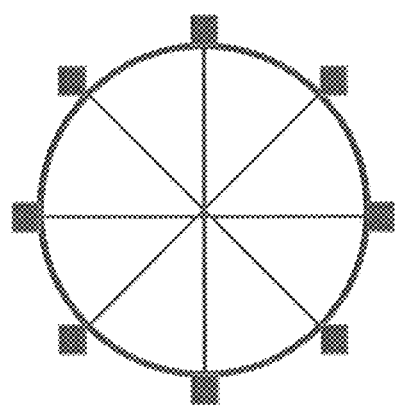
FIG. 43 shows a first multi-transducer arrangement.
Figure 44:
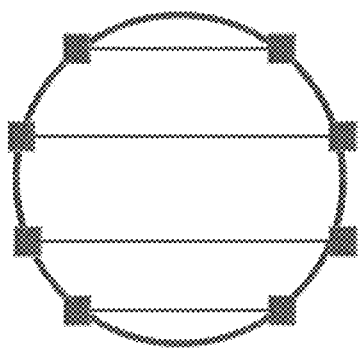
FIG. 44 shows a second multi-transducer arrangement.

FIG. 42 shows a second embodiment of a flow measurement device 60' for measuring a flow in the arrangement in FIG. 1 or other arrangements according to the specification. The flow measurement device 60' comprises a direct digital synthesizer (DDS) 76. For simplicity, only the components of the DDS 76 are shown. The DDS 76 is also referred to as an arbitrary waveform generator (AWG).

The DDS 76 comprises a reference oscillator 77, which is connected to a frequency controller register 78, a numerically controlled oscillator (NCO) 79 and to the DAC 64. An input of the NCO 79 for N channels is connected to an output of the frequency control register 78. An input of the DAC 64 for M channels is connected to the NCO 79 and an input of a reconstruction low pass filter is connected to the DAC 64. By way of example, a direct numerically controlled oscillator 79 with a clock frequency of 100 MHz may be used to generate an amplitude modulated 1 MHz signal.

An output of the reconstruction low pass filter 80 is connected to the piezoelectric transducers 11, 13 of FIG. 1.

Due to the inertia of an oscillator crystal, it is often advantageous to use an oscillator with a higher frequency than that of a carrier wave in order to obtain a predetermined amplitude modulated signal, for example by using a direct digital synthesizer.

FIGS. 45, 47 and 48 illustrate the abovementioned Z, V and W flow measurement configurations. In the examples of FIGS. 45, 47, 48 clamp-on transducers are attached to a conduit via respective coupling pieces.

Figure 54:
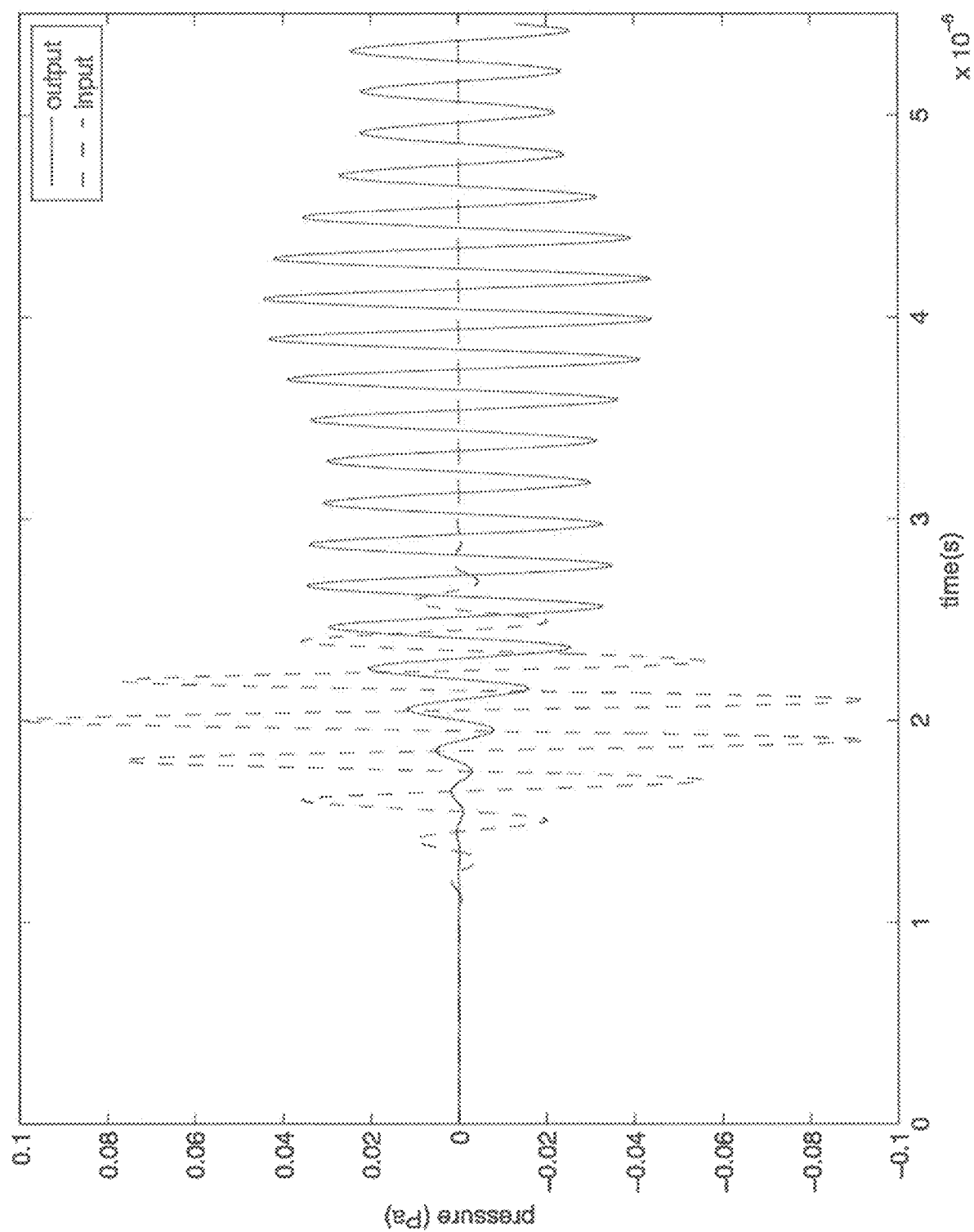
FIG. 54 shows a pressure curve of a TRA sending signal and a response signal to the TRA sending signal.
Figure 55:
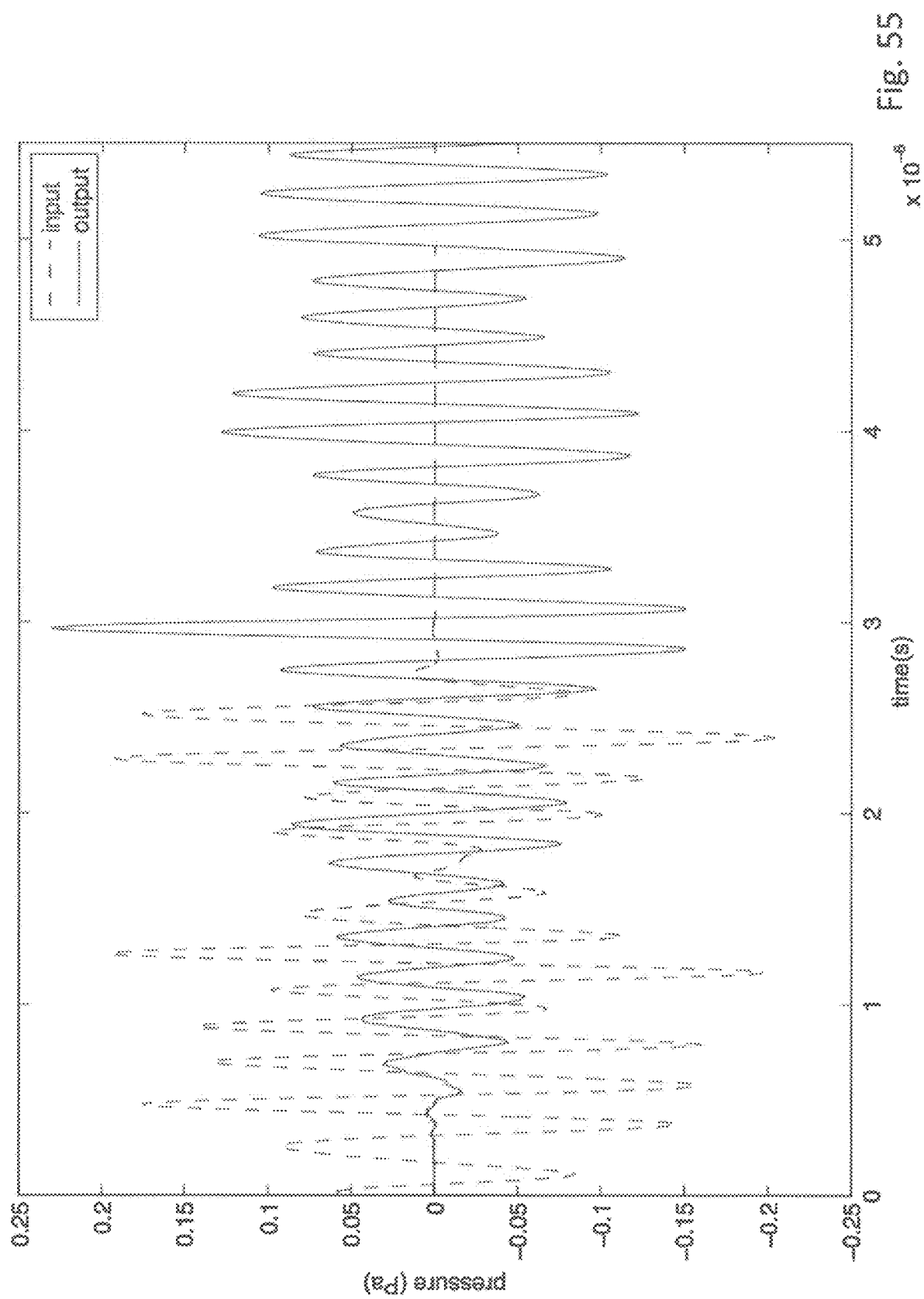
FIG. 55 shows a pressure curve of a TRA sending signal and a response signal to the TRA sending signal.

FIGS. 54 and 55 show a comparison of respective receiving or response signals to respective sending signals that were generated without using a time reversal procedure and with the use of a time reversal procedure.

In the example of FIG. 54, a modulated sine wave with a Gaussian shaped envelope is used as a sending signal. The signal energy of the sending signal is proportional to $1.3 \times 10^{-7}$ $(Pa/m)^2$ s and the signal amplitude is 0.1 Pa. The value is obtained by integrating the squared pressure per unit length over time. The response signal has a peak-to-peak amplitude of the receiving signal of about 0.09 Pa.

Figure 56:
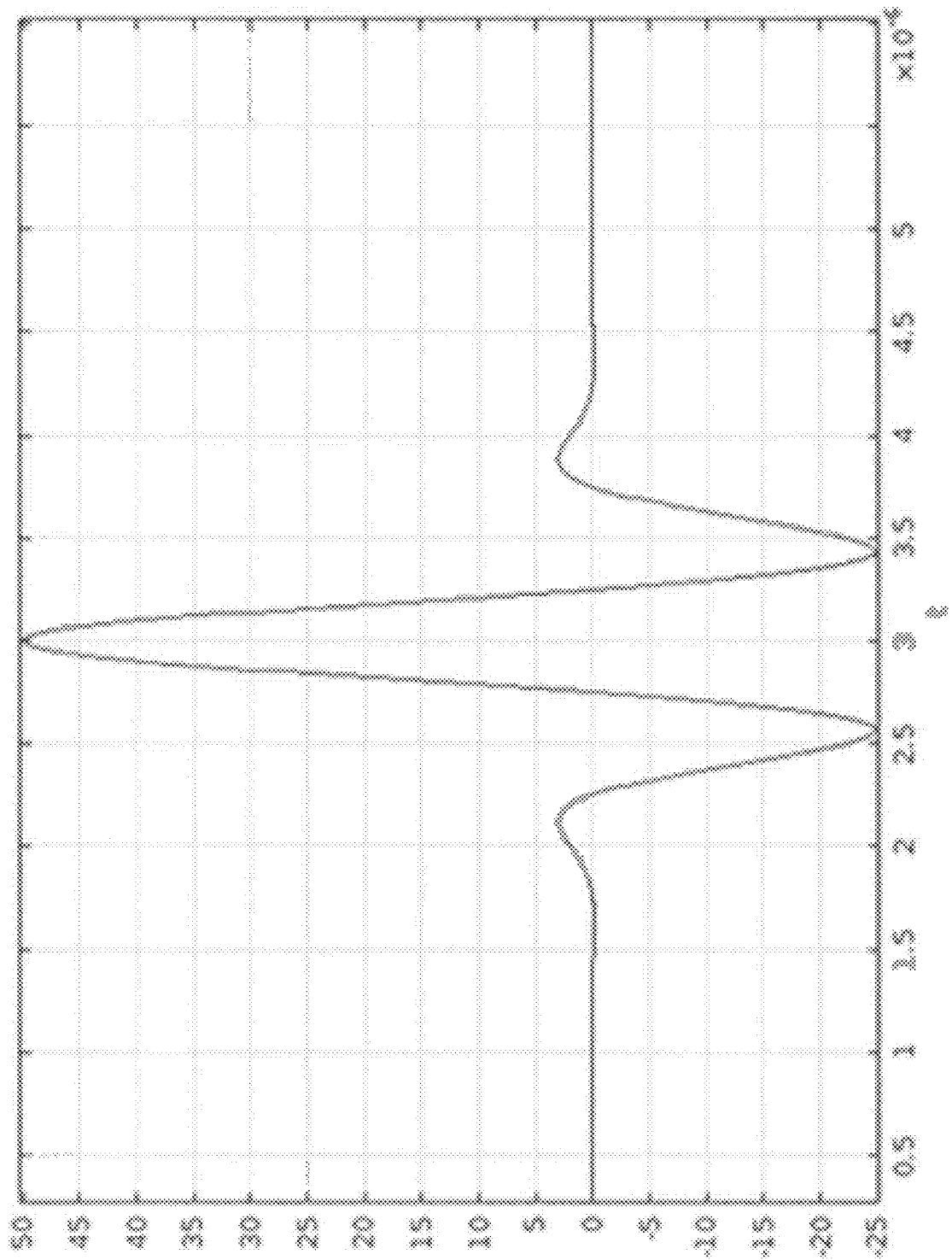
FIG. 56 shows an impulse signal that is used to generate the signal input of FIG. 55.

In the example of FIG. 55, a time reversed signal, which is derived from the response signal to the impulse signal of FIG. 56, is used as a sending signal. The sending signal is adjusted to have the same signal energy of $1.3 \times 10^{-7}$ $(Pa/m)^2$ s as the sending signal of FIG. 54. This yields a peak-to-peak amplitude of the receiving signal which is about 0.375 Pa.

The receiving amplitude of FIG. 55 is more than four times higher than the amplitude of the receiving signal of FIG. 54. The increased amplitude on the receiving side can provide easier and more stable signal recognition. Among others, the increase in amplitude can be adjusted by adjusting the bit resolution of the amplitude of the time reversed signal, in particular by increasing or decreasing the bit-resolution in order to obtain a larger amplitude.

Figure 57:
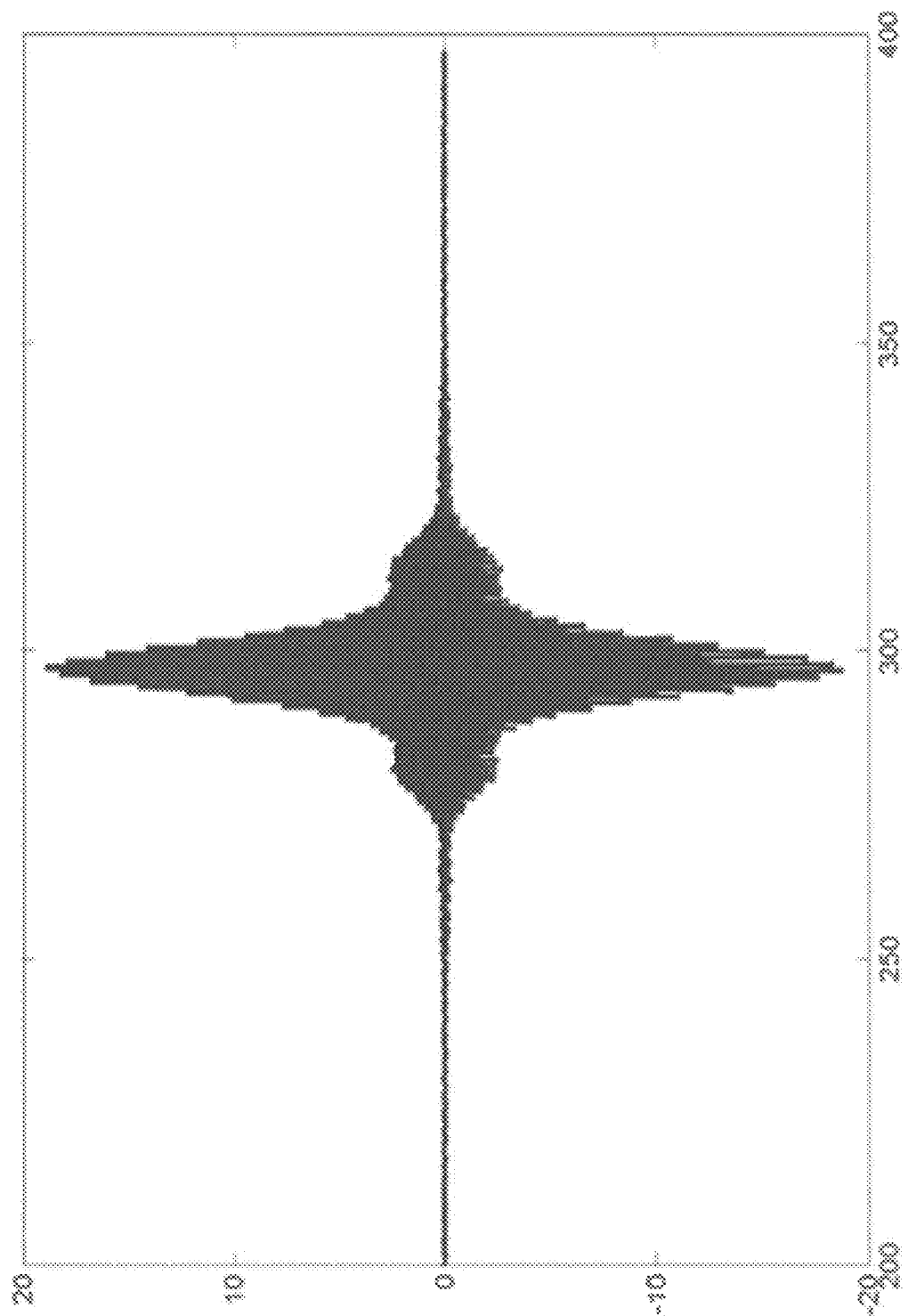
FIG. 57 shows a first response signal indicating channel properties.

FIGS. 56 and 57 illustrate how the receiving signals can be used to derive information about the transmission channel and in particular about the wall thickness of the conduit, deposits on the wall. According to the present specification, a response to the measuring signal, which is the time reversed response signal, can be analysed to allow a determination of property changes of the pipe material, like cracks, crustification, etc. In a flow measurement according to one embodiment of the present specification, these property changes are determined by analysing the same receiving signal that is used for the time of flight measurement.

FIG. 57 shows a first response signal, which contains information about a first transmission channel.

Figure 58:
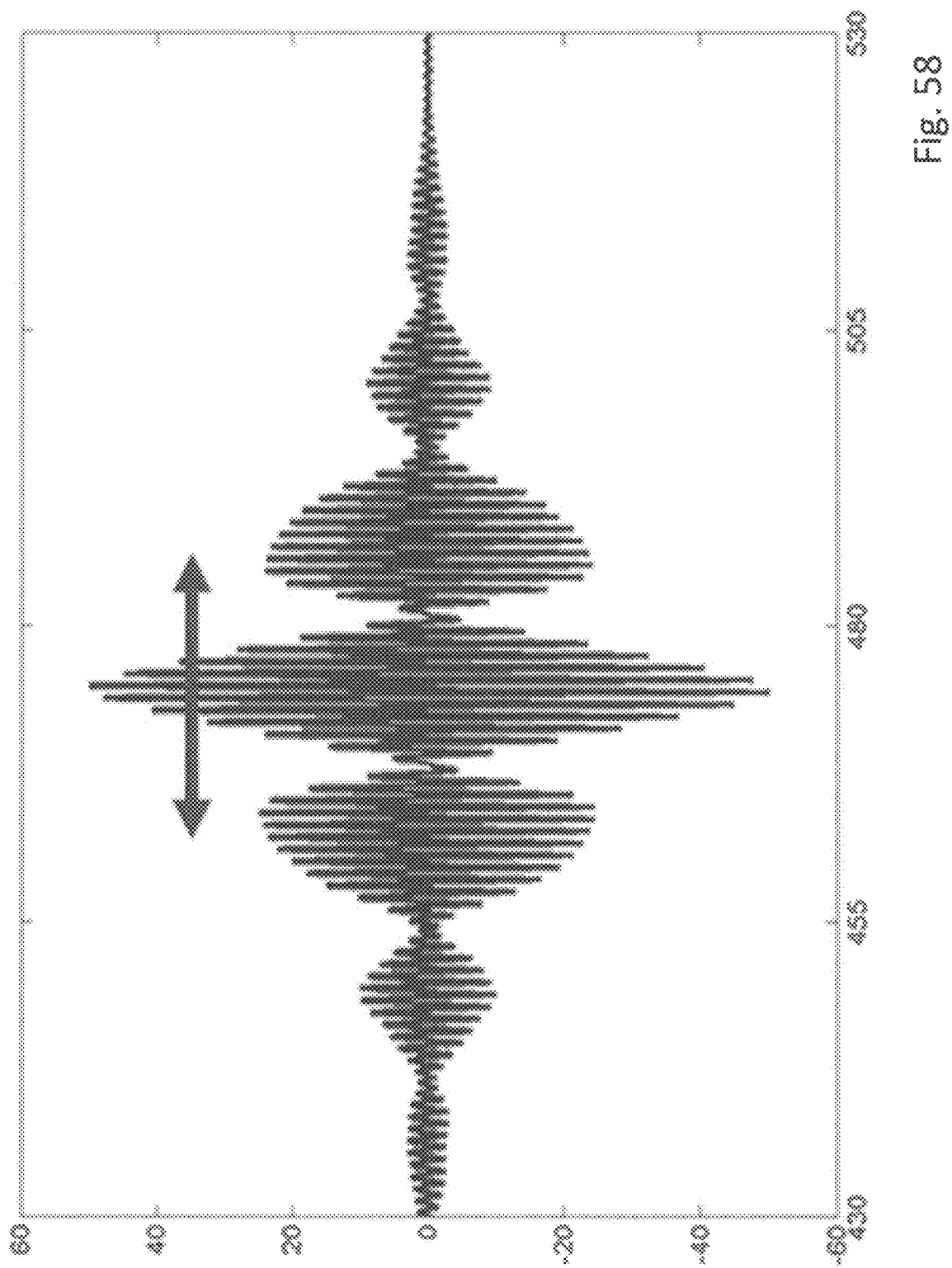
FIG. 58 shows a second response signal indicating channel properties.

FIG. 58 shows a second response signal, which contains information about a second transmission channel. The length of the horizontal arrow on the central main lobe extends between the left side lobe and the right side lobe, which are left and right to the main lobe, respectively. The length of the arrow represents the thickness of a pipe wall if the signal is generated according to the FIG. 46. The measured wall thickness is determined at the location where the wave is reflected at the lower part of the pipe in FIG. 46. If there is a deposit on the pipe wall, the measured wall thickness will increase.

FIG. 59 shows a further response signal. The experimental setup for obtaining the signal of FIG. 59 comprises clamp-on, angle transducers, an acrylic transducer coupling head, a sound velocity of c=2370 m/s, a coupling angle of 40°, a stainless steel wall, a transversal wave velocity of c=3230 m/s, 61.17°, water as fluid, a sound velocity in the fluid of c=1480 m/s, a transversal wave angle axis of 23.67°, and a flow angle of 66.33°, extracted from FIG. 59

Figure 60:
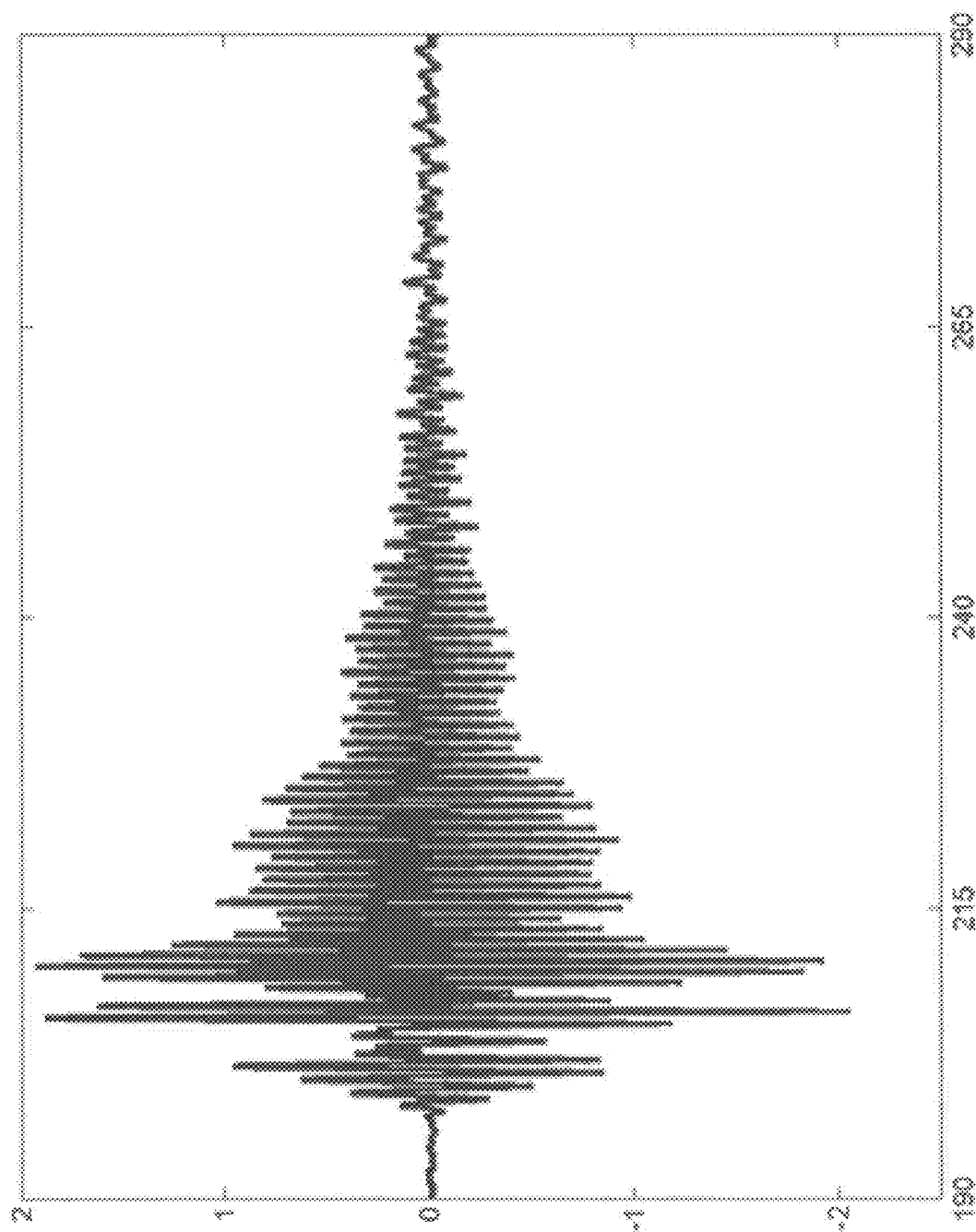
FIG. 60 shows a further response signal.

FIG. 60 shows a further response signal. The experimental setup for obtaining the signal of FIG. 60 comprises an acrylic transducer coupling head, a sound velocity of c=2370 m/s, a coupling angle of 20°, a stainless steel wall, longitudinal wave velocity of c=5790 m/s, 56.68°, transversal wave c=3230 m/s, water as fluid, a sound velocity in the fluid of c=1480 m/s, a longitudinal wave angle axis=12.33°, a transversal wave angle axis of 12.33°, and a flow angle of 77.67°, extracted from FIG. 60.

The alternative set-up configurations for FIGS. 59 and 60 are shown in FIGS. 45, 46 and 47.

According to one embodiment of the present specification the channel properties are deduced by analysing a receiving signal such as the signals of FIGS. 57 to 60.

The example of FIGS. 59 and 60 illustrates the differences in the receiving signals depending on the presence of longitudinal and transversal waves in the pipe material. The presence of these waves are typical for the selected material and the geometry and can be used for material analysis. Such material analysis based on ultrasonic test waves are used in the application field of Non-Destructive Testing (NDT). This present specification allows the simultaneous analysis of flow and e.g. piping material as the received signal contains the impulse response of the measurement system including the transmission channel and material environment.

The analysis of the receiving signals can be carried out in various ways, such as comparing the receiving signal with a previously received impulse response or direct evaluation of an impulse response, for example for determining a wall thickness.

Although the above description contains much specificity, these should not be construed as limiting the scope of the embodiments but merely providing illustration of the foreseeable embodiments. The method steps may be performed in different order than in the provided embodiments, and the subdivision of the measurement device into processing units and their respective interconnections may be different from the provided embodiments.

In particular, the method steps of storing a digital representation of a signal and performing operations such as selection a signal portion, time reversing a signal and filtering a signal may be interchanged. For example, a signal may be stored in a time inverted form or it may be read out in reverse order to obtain a time inverted signal.

While the present disclosure is explained with respect to a round DN 250 pipe, it can be readily applied to other pipe sizes or even to other pipe shapes. Although the embodiments are explained with respect to clamp-on transducers, wet transducers, which protrude into a pipe or installed in an open channel, may be used as well.

Especially, the above stated advantages of the embodiments should not be construed as limiting the scope of the embodiments but merely to explain possible achievements if the described embodiments are put into practise. Thus, the scope of the embodiments should be determined by the claims and their equivalents, rather than by the examples given.

The embodiments of the present specification can also be described with the following lists of elements being organized into embodiments. The respective combinations of features which are disclosed in the embodiment list are regarded as independent subject matter, respectively, that can also be combined with other features of the application.

Embodiment 1: A method for determining a flow speed of a fluid in a fluid conduit comprising:
  providing the fluid conduit with a fluid that has a predetermined velocity with respect to the fluid conduit,
  applying an impulse signal to a first ultrasonic transducer, the first ultrasonic transducer being mounted to the fluid conduit at a first location,
  receiving a response signal of the impulse signal at a second ultrasonic transducer, the second ultrasonic transducer being located at the fluid conduit at a second location,
  deriving a measuring signal from the response signal, the derivation of the measuring signal comprising selecting a signal portion of the response signal or of a signal derived therefrom and reversing the signal portion with respect to time,
  storing the measuring signal for later use,
  providing the fluid conduit with the fluid, the fluid moving with respect to the fluid conduit,
  applying the measuring signal to one of the first and the second ultrasonic transducers,
  measuring a first response signal of the measuring signal at the other one of the first and the second ultrasonic transducer,
  deriving a flow speed of the fluid from the first response signal,
  wherein the following steps of
  applying an impulse signal to a first ultrasonic transducer, the first ultrasonic transducer being mounted to the fluid conduit at a first location,
  receiving a response signal of the impulse signal at a second ultrasonic transducer, the second ultrasonic transducer being located at the fluid conduit at a second location,
  deriving a measuring signal from the response signal, the derivation of the measuring signal comprising selecting a signal portion of the response signal or of a signal derived therefrom and reversing the signal portion with respect to time,
  storing the measuring signal for later use, are optional or can be left away if the measurement signal has been established earlier.

Embodiment 2: The method according to embodiment 1, comprising
  repeating the steps of applying the measuring signal and measuring the response signal in the reverse direction to obtain a second response signal,
  deriving a flow speed of the fluid from the first response signal and the second response signal.

Embodiment 3: The method according to embodiment 1 or embodiment 2, wherein the signal portion that is used to derive the measuring signal comprises a first portion around a maximum amplitude of the response signal and a trailing signal portion, the trailing signal portion extending in time behind the arrival time of the maximum amplitude.

Embodiment 4: The method according to one of the preceding embodiments, comprising
  repeating the steps of applying an impulse signal and receiving a corresponding response signal multiple times, thereby obtaining a plurality of response signals,
  deriving the measuring signal from an average of the received response signals.

Embodiment 5: The method according to one of the preceding embodiments,
  wherein the derivation of measuring signal comprises digitizing the response signal or a signal derived therefrom with respect to amplitude.

Embodiment 6: The method according to embodiment 5, comprising increasing the bit-resolution of the digitized signal for increasing an amplitude of a response signal to the measuring signal.

Embodiment 7: The method according to embodiment 5, comprising decreasing the bit-resolution of the digitized signal for increasing an amplitude of a response signal to the measuring signal.

Embodiment 8: The method according to one of the embodiments 5 to 7, wherein the bit resolution of the digitized signal with respect to the amplitude is a low bit resolution.

Embodiment 9: The method according to one of the preceding embodiments, comprising processing of at least one of the response signals for determining a change in the wall thickness of the conduit or for determining material characteristics of the conduit walls by determining longitudinal and transversal sound wave characteristics.

Embodiment 10: A device for measuring a flow speed in a travel time ultrasonic flow meter, comprising
  a first connector for a first ultrasonic element,
  a second connector for a second ultrasonic element,
  a transmitting unit for sending an impulse signal to the first connector,
  a receiving unit for receiving a response signal to the impulse signal from the second connector,
  an inverting unit for inverting the response signal with respect to time to obtain an inverted signal,
  a processing unit for deriving a measuring signal from the inverted signal and storing the measuring signal,
  wherein the following elements of
    a transmitting unit for sending an impulse signal to the first connector,
    a receiving unit for receiving a response signal to the impulse signal from the second connector,
    an inverting unit for inverting the response signal with respect to time to obtain an inverted signal,
    a processing unit for deriving a measuring signal from the inverted signal and storing the measuring signal,
  are optional or can be left away if the measurement signal has been established earlier so that it is readily available.

Embodiment 11: The device of embodiment 10, further comprising:
  a D/A converter, the D/A converter being connected to the first connector,
  an A/D converter, the A/D converter being connected to the second connector,
  a computer readable memory for storing the measuring signal.

Embodiment 12: The device of embodiment 10 or embodiment 11, further comprising a selection unit for selecting a portion of the received response signal or a signal derived therefrom, wherein the inverting unit is provided for inverting the selected portion of the response signal with respect to time to obtain the inverted signal.

Embodiment 13: The device of one of embodiments 10 to 12, the device comprising
  a measuring signal generator, the measuring signal generator being connectable to the first connector or to the second connector,
  a transmitting means for sending the measuring signal to the first connector,
  a receiving unit for receiving a response signal of the measuring signal from the second connector,
  a second processing unit for deriving a flow speed from the received response signal.

Embodiment 14: The device according to one of the embodiments 10 to 13, the device comprising:
  a direct digital signal synthesizer, the direct digital signal synthesizer comprising the ADC,
  a frequency control register, a reference oscillator, a numerically controlled oscillator and a reconstruction low pass filter, the ADC being connectable to the first and the second connector over the reconstruction low pass filter.

Embodiment 15: The device according to one of the embodiments 10 to 14, the device comprising:
  a first ultrasonic transducer, the first ultrasonic transducer being connected to the first connector,
  a second ultrasonic transducer, the second ultrasonic transducer being connected to the second connector.

Embodiment 16: The device according to one of the embodiments 10 to 15, comprising a portion of a pipe, the first ultrasonic transducer being mounted to the pipe portion at a first location, and the second ultrasonic transducer being mounted to the pipe portion at a second location.

Embodiment 17: A computer readable program code comprising computer readable instructions for executing the method according to one the embodiments 1 to 9.

Embodiment 18: A computer readable memory, the computer readable memory comprising the computer readable program code of embodiment 17.

Embodiment 19: An application specific electronic component, which is operable to execute the method according to one of the embodiments 1 to 9.

Embodiment 20: A method for determining whether a test device is measuring a flow speed of a fluid in a fluid conduit according to one of embodiments 1 to 5, comprising:
  providing the fluid conduit with a fluid that has a predetermined velocity with respect to the fluid conduit,
  applying a test impulse signal to a first ultrasonic transducer of the test device, the first ultrasonic transducer being mounted to the fluid conduit at a first location,
  receiving a test response signal of the test impulse signal at a second ultrasonic transducer of the test device, the second ultrasonic transducer being mounted to the fluid conduit at a second location,
  deriving a test measuring signal from the response signal, the derivation of the test measuring signal comprising reversing the signal with respect to time,
  comparing the test measuring signal with a measuring signal that is emitted at the other one of the first and the second ultrasonic transducer,
  wherein the test device is using a method to determine a flow speed of a fluid in a fluid conduit according to one of embodiments 1 to 5, if the test measuring signal and the measuring signal are similar.

Embodiment 21: A device for measuring a flow speed in a travel time ultrasonic flow meter, comprising
  a first connector for a first ultrasonic element,
  a second connector for a second ultrasonic element,
  a transmitting unit for sending an impulse signal to the first connector,
  a receiving unit for receiving a response signal to the impulse signal from the second connector,
  an inverting unit for inverting the selected portion of the response signal with respect to time to obtain an inverted signal,
  a processing unit for deriving a measuring signal from the inverted signal and storing the measuring signal in the computer readable memory,
  wherein using the device for determining a flow speed of a fluid in a fluid conduit by:
    providing the fluid conduit with a fluid that has a velocity with respect to the fluid conduit,
    applying a measuring signal to one of the first and the second ultrasonic elements, measuring a first response signal of the measuring signal at the other one of the first and the second ultrasonic elements, deriving a flow speed of the fluid from the first response signal, wherein when applying a test impulse signal to a first ultrasonic element of the test device, receiving a test response signal of the test impulse signal at a second ultrasonic element of the test device, the second ultrasonic element being mounted to the fluid conduit at a second location, deriving a test measuring signal from the response signal, the derivation of the test measuring signal comprising reversing the signal with respect to time, wherein the test measuring signal and a measuring signal that is emitted at the first or the second ultrasonic element are similar.

| Reference | |
| --- | --- |
| 10 | flow meter arrangement |
| 11 | upstream piezoelectric element |
| 12 | Pipe |
| 13 | downstream piezoelectric element |
| 14 | direction of average flow |
| 15 | first computation unit |
| 16 | second computation unit |
| 17 | signal path |
| 20 | signal path |
| 22 | piezoelectric element |
| 23 | piezoelectric element |
| 31-52 | piezoelectric elements |
| 60, 60' | flow measurement device |
| 61 | first connector |
| 62 | second connector |
| 63 | multiplexer |
| 64 | DAC |
| 65 | ADC |
| 66 | demultiplexer |
| 67 | signal selection unit |
| 68 | signal inversion unit |
| 69 | bandpass filter |
| 70 | memory |
| 71 | velocity computation unit |
| 72 | impulse signal generator |
| 73 | measuring signal generator |
| 74 | command line |
| 75 | command line |
| 76 | DDS |
| 77 | reference oscillator |
| 78 | frequency controller register |
| 79 | numerically controlled oscillator |
| 80 | low pass filter |

What is claimed is:

1. A method for determining a flow speed of a fluid in a fluid conduit with a travel time ultrasonic flow meter, the method comprising:

providing the fluid conduit with a fluid that has a predetermined velocity with respect to the fluid conduit, applying an impulse signal to a first ultrasonic transducer, the first ultrasonic transducer being mounted to the fluid conduit at a first location, receiving a response signal of the impulse signal at a second ultrasonic transducer, the second ultrasonic transducer being located at the fluid conduit at a second location provided upstream or downstream of the first ultrasonic transducer, deriving a measuring signal from the response signal, the derivation of the measuring signal comprising selecting a signal portion of the response signal or of a signal derived therefrom and reversing the signal portion with respect to time, thereby obtaining an inverted version of the response signal with respect to time, the selected signal portion comprising a first portion around a maximum amplitude of the response signal and a trailing signal portion, the trailing signal portion extending in time behind the arrival time of the maximum amplitude, storing the measuring signal for later use, applying the measuring signal to one of the first and the second ultrasonic transducers, the measuring signal comprising a reversed signal portion with respect to time of the response signal of the impulse signal or of a signal derived therefrom, measuring a first response signal of the measuring signal at the other one of the first and the second ultrasonic transducer, deriving a time of flight from the first response signal, and deriving a flow speed of the fluid from the time of flight.

2. The method of claim 1 further comprising:

repeating the steps of applying the measuring signal and measuring the response signal in the reverse direction to obtain a second response signal, deriving a flow speed of the fluid from the first response signal and the second response signal.

3. The method of claim 1 further comprising:

repeating the steps of applying an impulse signal and receiving a corresponding response signal multiple times, thereby obtaining a plurality of response signals, deriving the measuring signal from an average of the received response signals.

4. The method of claim 1 further comprising increasing the bit-resolution of the digitized signal for increasing an amplitude of a response signal to the measuring signal.

5. The method of claim 1 further comprising decreasing the bit-resolution of the digitized signal for increasing an amplitude of a response signal to the measuring signal.

6. The method of claim 1 wherein the bit resolution of the digitized signal with respect to the amplitude is a low bit resolution.

7. The method of claim 1 further comprising processing of at least one of the response signals for determining a change in the wall thickness of the conduit or for determining material characteristics of the conduit walls by determining longitudinal and transversal sound wave characteristics.

8. A device for measuring a flow speed in a travel time ultrasonic flow meter further comprising:

a first connector for a first ultrasonic element, a second connector for a second ultrasonic element, a transmitting unit for sending an impulse signal to the first connector, a computer readable memory for storing a measuring signal, a receiving unit for receiving a response signal to the impulse signal from the second connector, a selection unit for selecting a portion of the received response signal or a signal derived therefrom, an inverting unit for inverting the response signal with respect to time to obtain an inverted signal, wherein the inverting unit is provided for inverting the selected portion of the response signal with respect to time to obtain the inverted signal, one or more processing unit for deriving a measuring signal from the inverted signal and storing the measuring signal, a measuring signal generator, the measuring signal generator being connectable to the first connector or to the second connector, a transmitting means for sending the measuring signal to the first connector, and a receiving unit for receiving a response signal of the measuring signal from the second connector, wherein the one or more processing unit further derives a time of flight from the received response signal and a flow speed from the time of flight.

9. The device of claim 8 further comprising a direct digital signal synthesizer, the direct digital signal synthesizer further comprising the A/D converter, a frequency control register, a reference oscillator, a numerically controlled oscillator and a reconstruction low pass filter, the A/D converter being connectable to the first and the second connector over the reconstruction low pass filter.

10. The device of claim 8 further comprising:
a first ultrasonic transducer, the first ultrasonic transducer being connected to the first connector, and
a second ultrasonic transducer, the second ultrasonic transducer being connected to the second connector.

11. The device of claim 8 further comprising a portion of a pipe, the first ultrasonic transducer being mounted to the pipe portion at a first location, and the second ultrasonic transducer being mounted to the pipe portion at a second location.

12. A computer readable program code comprising computer readable instructions for executing the method of claim 1.

13. A computer readable memory, the computer readable memory comprising the computer readable program code of claim 12.

14. An application specific electronic component, which is operable to execute the method of claim 1.

15. A device for measuring a flow speed in a travel time ultrasonic flow meter comprising:
a first connector for a first ultrasonic element,
a second connector for a second ultrasonic element,
a transmitting unit for sending an impulse signal to the first connector,
a receiving unit for receiving a response signal to the impulse signal from the second connector,
an inverting unit for inverting the response signal with respect to time to obtain an inverted signal, the inverting compromising reversing an order of recorded samples of the received response signal,
a processing unit for deriving a measuring signal from the inverted signal and storing the measuring signal,
a selection unit for selecting a portion of a received response signal or a signal derived therefrom,
a measuring signal generator for generating a measuring signal comprising a reversed signal portion with respect to time of a response signal of an impulse signal or of a signal derived therefrom, the measuring signal generator being connectable to the first connector or to the second connector,
a D/A converter, the D/A converter being connected to the first connector,
an A/D converter, the A/D converter being connected to the second connector,
a computer readable memory for storing the measuring signal,
a transmitting means for sending the measuring signal to the first connector,
a receiving unit for receiving a response signal of the measuring signal from the second connector,
a processing unit for deriving a flow speed from the received response signal, and
a direct digital signal synthesizer, the direct digital signal synthesizer comprising the A/D converter, a frequency control register, a reference oscillator, a numerically controlled oscillator and a reconstruction low pass filter, the A/D converter being connectable to the first and the second connector over the reconstruction low pass filter.

16. The device of claim 15 further comprising:
a first ultrasonic transducer, the first ultrasonic transducer being connected to the first connector, and
a second ultrasonic transducer, the second ultrasonic transducer being connected to the second connector.

17. The device of claim 15 further comprising a portion of a pipe, the first ultrasonic transducer being mounted to the pipe portion at a first location, and the second ultrasonic transducer being mounted to the pipe portion at a second location.

* * * * *